(12) United States Patent  
Fujiuchi et al.

(10) Patent No.: US 9,341,765 B2  
(45) Date of Patent: May 17, 2016

(54) LIGHT-SOURCE DEVICE

(71) Applicants: Akiko Fujiuchi, Chiyoda-ku (JP); Daisuke Ohama, Chiyoda-ku (JP); Toshiaki Shoji, Chiyoda-ku (JP)

(72) Inventors: Akiko Fujiuchi, Chiyoda-ku (JP); Daisuke Ohama, Chiyoda-ku (JP); Toshiaki Shoji, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 7 days.

(21) Appl. No.: 14/367,021

(22) PCT Filed: Dec. 13, 2012

(86) PCT No.: PCT/JP2012/082338  
§ 371 (c)(1),  
(2) Date: Jun. 19, 2014

(87) PCT Pub. No.: WO2013/118388  
PCT Pub. Date: Aug. 15, 2013

(65) Prior Publication Data  
US 2014/0355303 A1    Dec. 4, 2014

(30) Foreign Application Priority Data

Feb. 7, 2012   (JP) ................................. 2012-024228  
Jun. 21, 2012  (JP) ................................. 2012-140063

(51) Int. Cl.  
  *G02B 6/00*     (2006.01)  
  *F21V 8/00*     (2006.01)  
  (Continued)

(52) U.S. Cl.  
  CPC ............ *G02B 6/0085* (2013.01); *G02B 6/0073* (2013.01); *G02B 6/0088* (2013.01);  
  (Continued)

(58) Field of Classification Search  
  CPC ... G02B 6/0085; G02B 6/0088; G02B 6/0073  
  See application file for complete search history.

(56) References Cited

U.S. PATENT DOCUMENTS

2002/0136502 A1* 9/2002 Bachl .................. G02B 6/0021  
  385/88  
2006/0056789 A1* 3/2006 Saito .................... G02B 6/0018  
  385/140

(Continued)

FOREIGN PATENT DOCUMENTS

JP    60-173252 A    9/1985  
JP     9-16843 A    1/1997

(Continued)

OTHER PUBLICATIONS

International Search Report issued Feb. 26, 2013, in PCT/JP2012/082338, filed Dec. 13, 2012.

(Continued)

*Primary Examiner* — Anne Hines  
(74) *Attorney, Agent, or Firm* — Oblon, McClelland, Maier & Neustadt, L.L.P.

(57) ABSTRACT

A light source device includes: a light-emitting part; a light guide including in its center a columnar part whose central axis direction is a lengthwise direction, that guides light input into an end face from the light-emitting part, and outputs light from a side face of the columnar part; a light guide holder that covers an end of the light guide except for at least part of the end face; and a support part, including a through-hole that penetrates from one face to another face formed therein, that holds an end of the light guide holder on a side of a first opening on the one face of the through-hole so as to allow sliding in the lengthwise direction, and light is input into the light guide via a second opening on the other face of the through-hole.

16 Claims, 54 Drawing Sheets

(51) Int. Cl.
  *H04N 1/028* (2006.01)
  *H04N 1/10* (2006.01)
  *F21Y 101/02* (2006.01)

(52) U.S. Cl.
  CPC ......... *H04N1/0282* (2013.01); *H04N 1/02815* (2013.01); *H04N 1/02835* (2013.01); *H04N 1/02845* (2013.01); *H04N 1/02855* (2013.01); *F21Y 2101/02* (2013.01); *H04N 1/1013* (2013.01)

(56) References Cited

U.S. PATENT DOCUMENTS

| | | |
|---|---|---|
| 2006/0098247 A1 | 5/2006 | Sawada |
| 2009/0237747 A1 | 9/2009 | Sawada et al. |
| 2012/0140296 A1 | 6/2012 | Sawada et al. |

FOREIGN PATENT DOCUMENTS

| | | |
|---|---|---|
| JP | 11-55476 | 2/1999 |
| JP | 2000-098379 A | 4/2000 |
| JP | 2002-135533 | 5/2002 |
| JP | 2004-266313 | 9/2004 |
| JP | 2004-279663 | 10/2004 |
| JP | 2006-85975 | 3/2006 |
| JP | 2007-201845 | 8/2007 |
| JP | 2007-318406 | 12/2007 |
| JP | 2008-28617 | 2/2008 |
| JP | 2010-21983 | 1/2010 |
| JP | 2010-103742 | 5/2010 |
| JP | 2010-283436 | 12/2010 |
| JP | 2011-49808 | 3/2011 |
| JP | 2011-61411 | 3/2011 |
| JP | 2011-176786 | 9/2011 |
| JP | 2011-211464 | 10/2011 |
| JP | 2011-223389 | 11/2011 |

OTHER PUBLICATIONS

Office Action issued Sep. 1, 2015 in Japanese Patent Application No. 2012-024228 (with English language translation).

Japanese Office Action issued Mar. 1, 2016 in Japanese Application No. 2012-024228 (no. English translation), 2 pages.

* cited by examiner

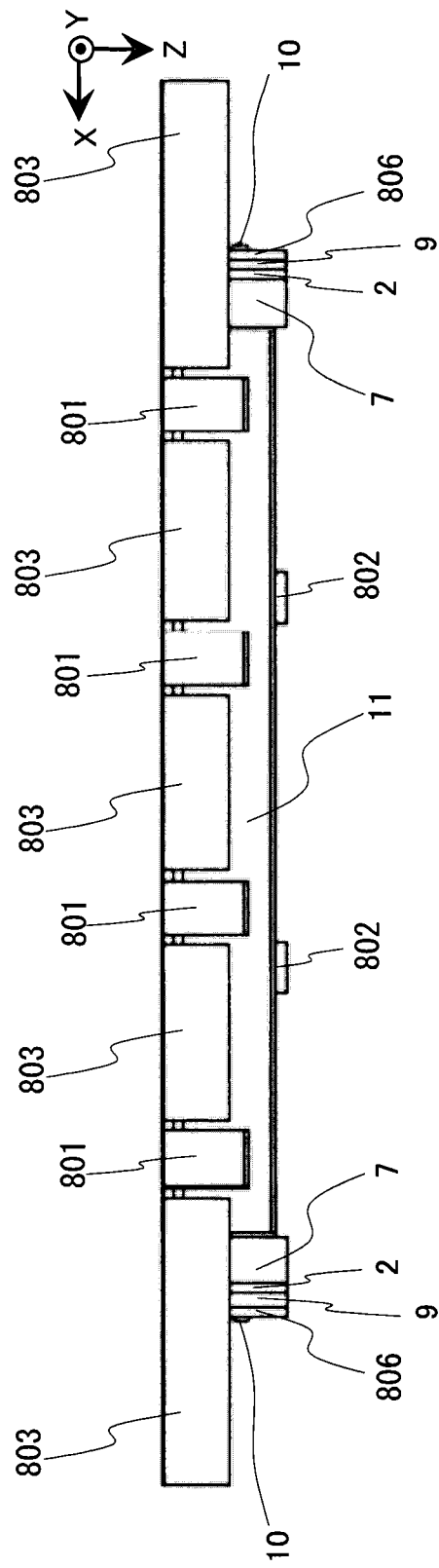
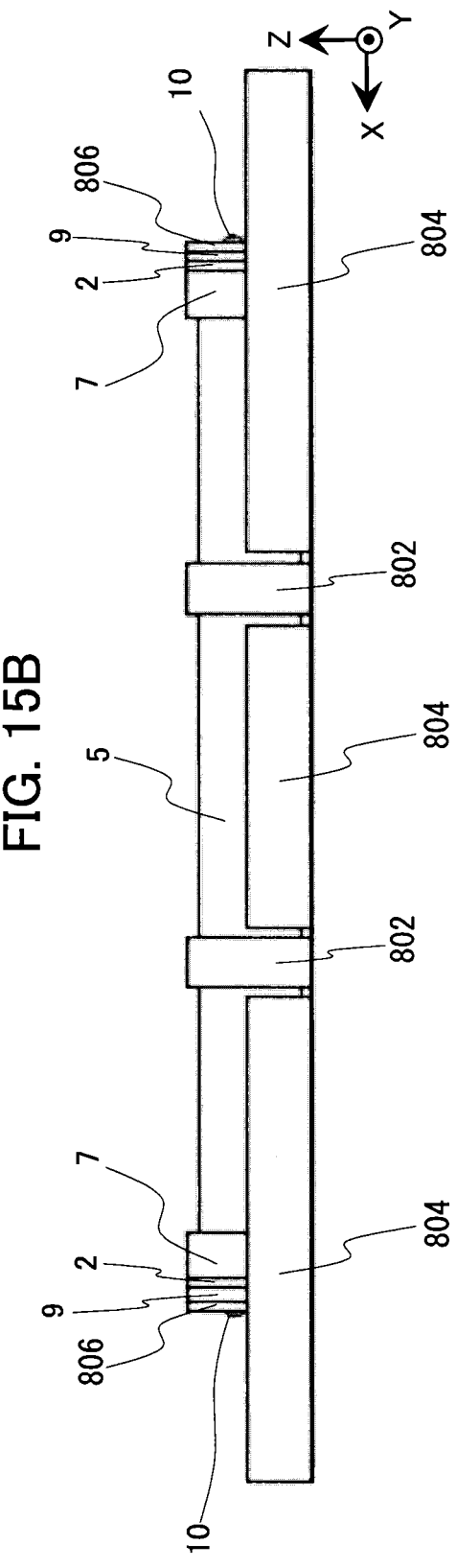

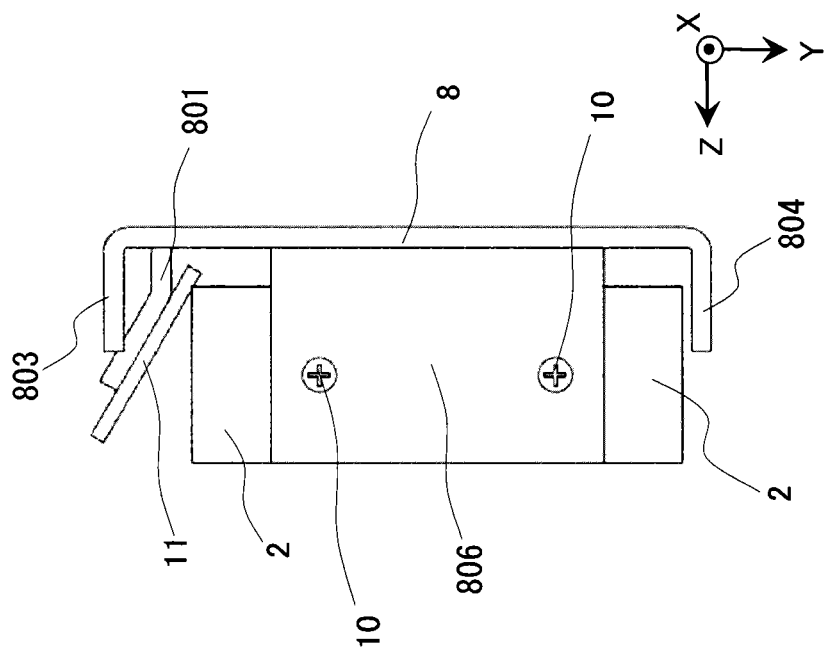
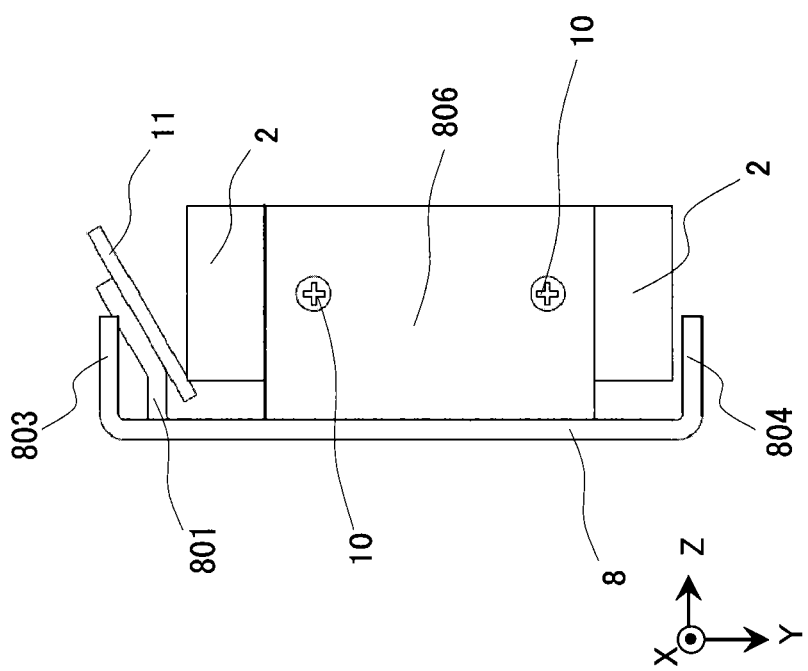

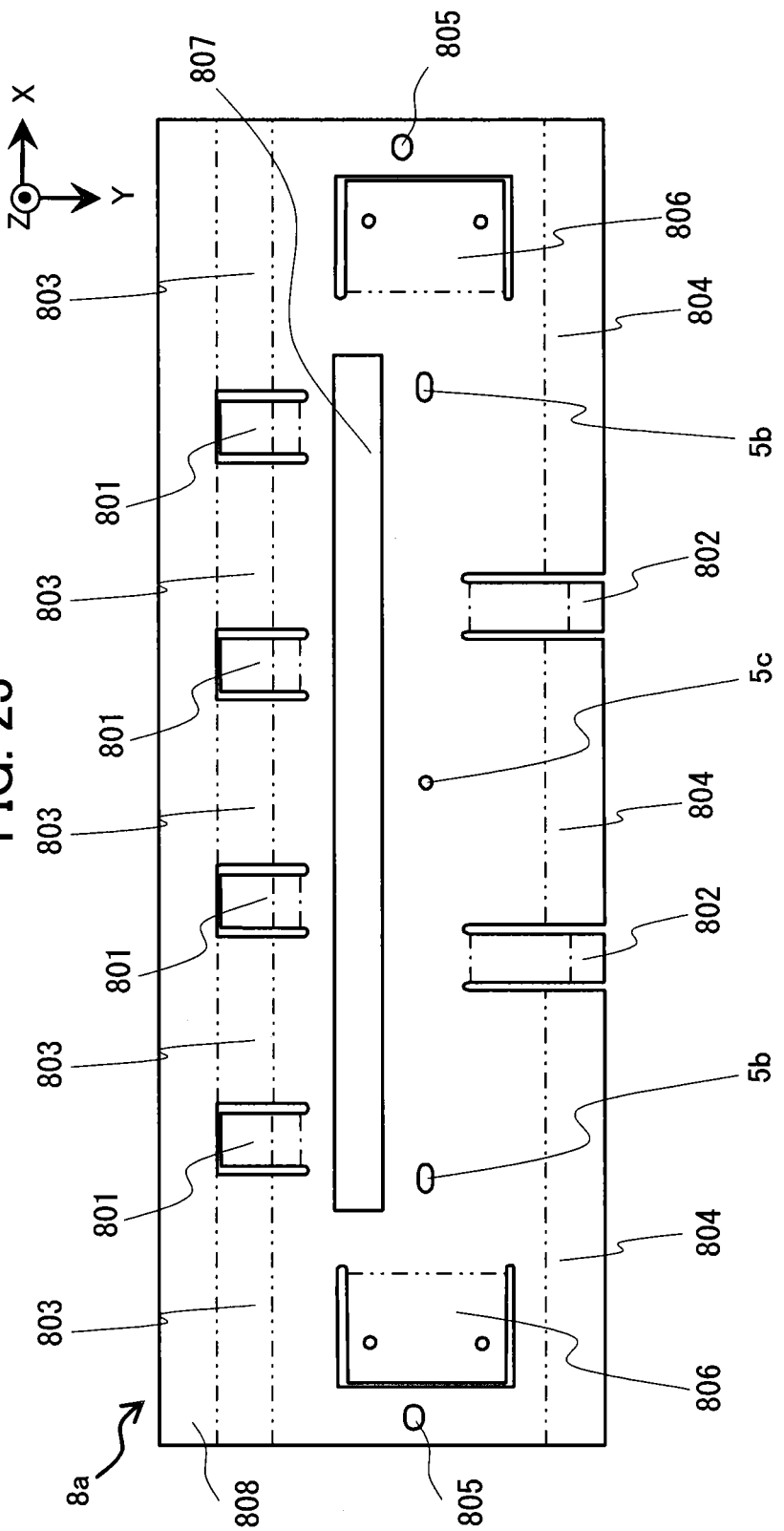

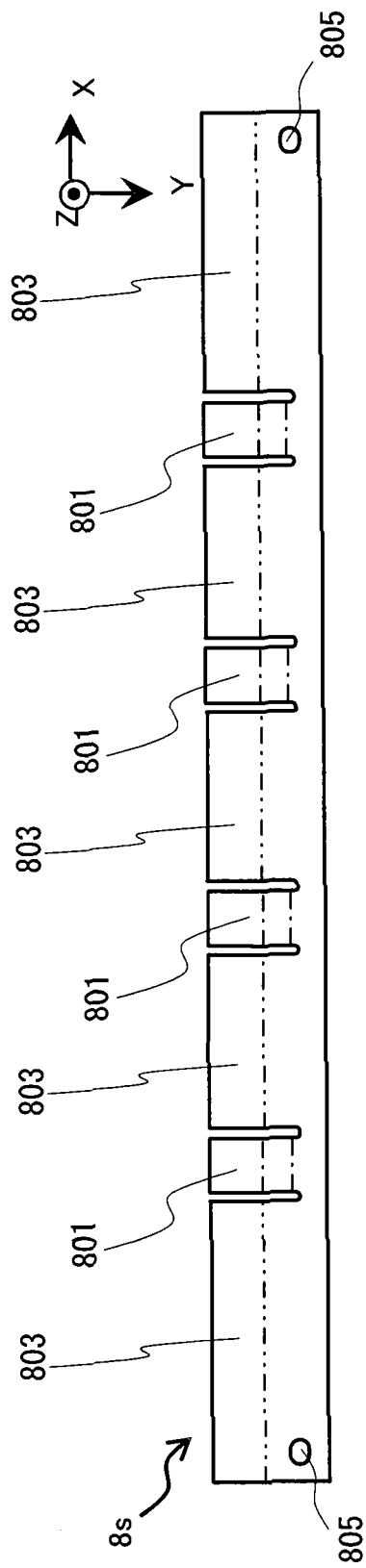
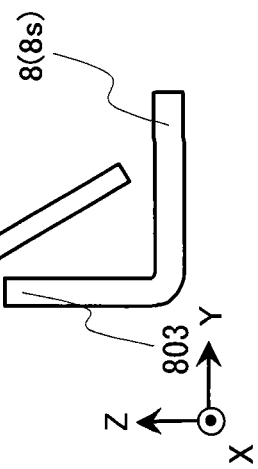
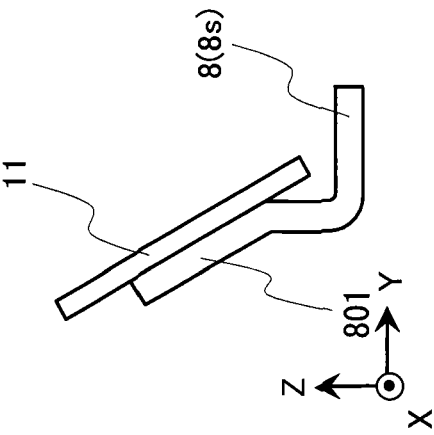

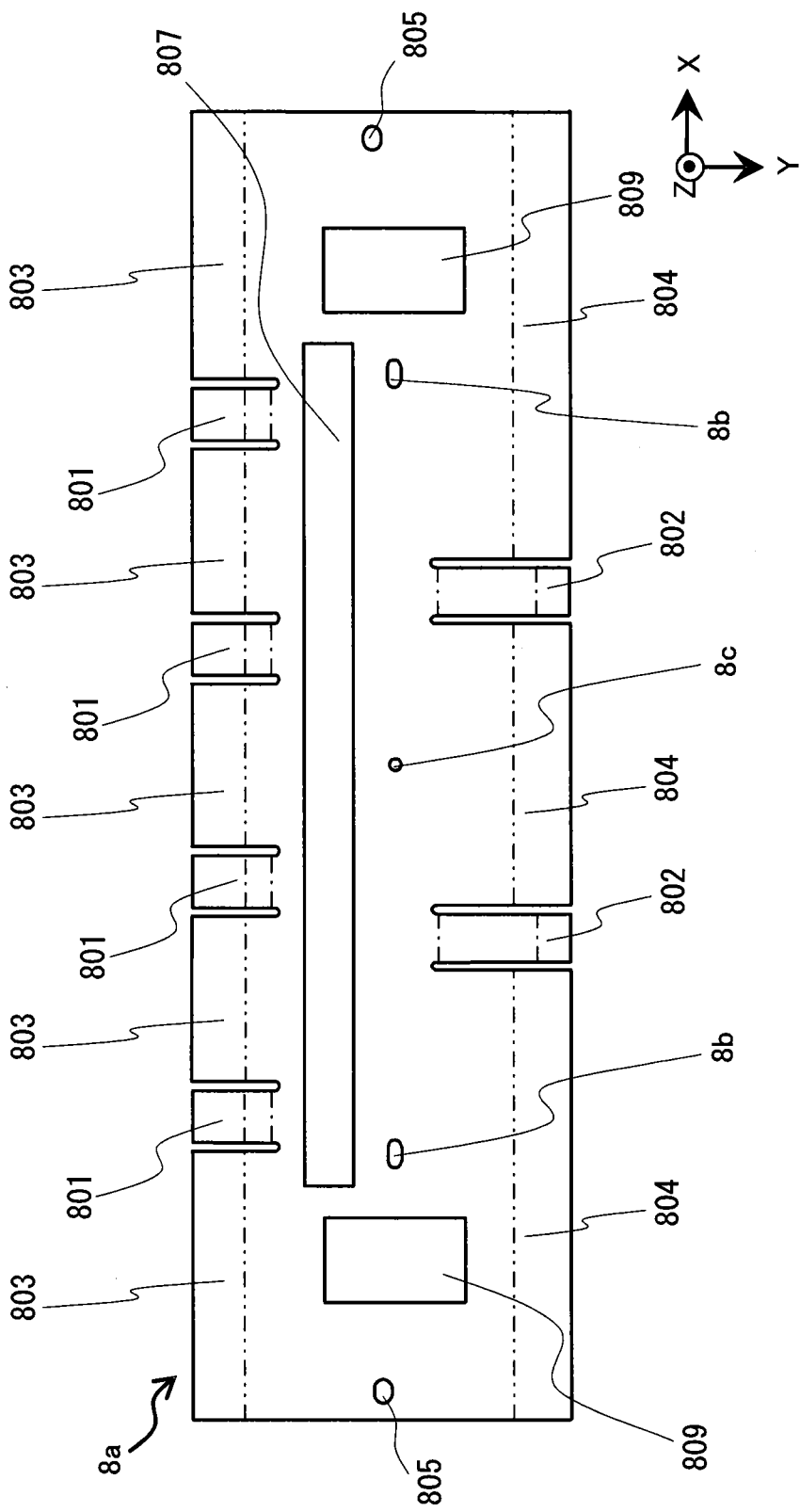

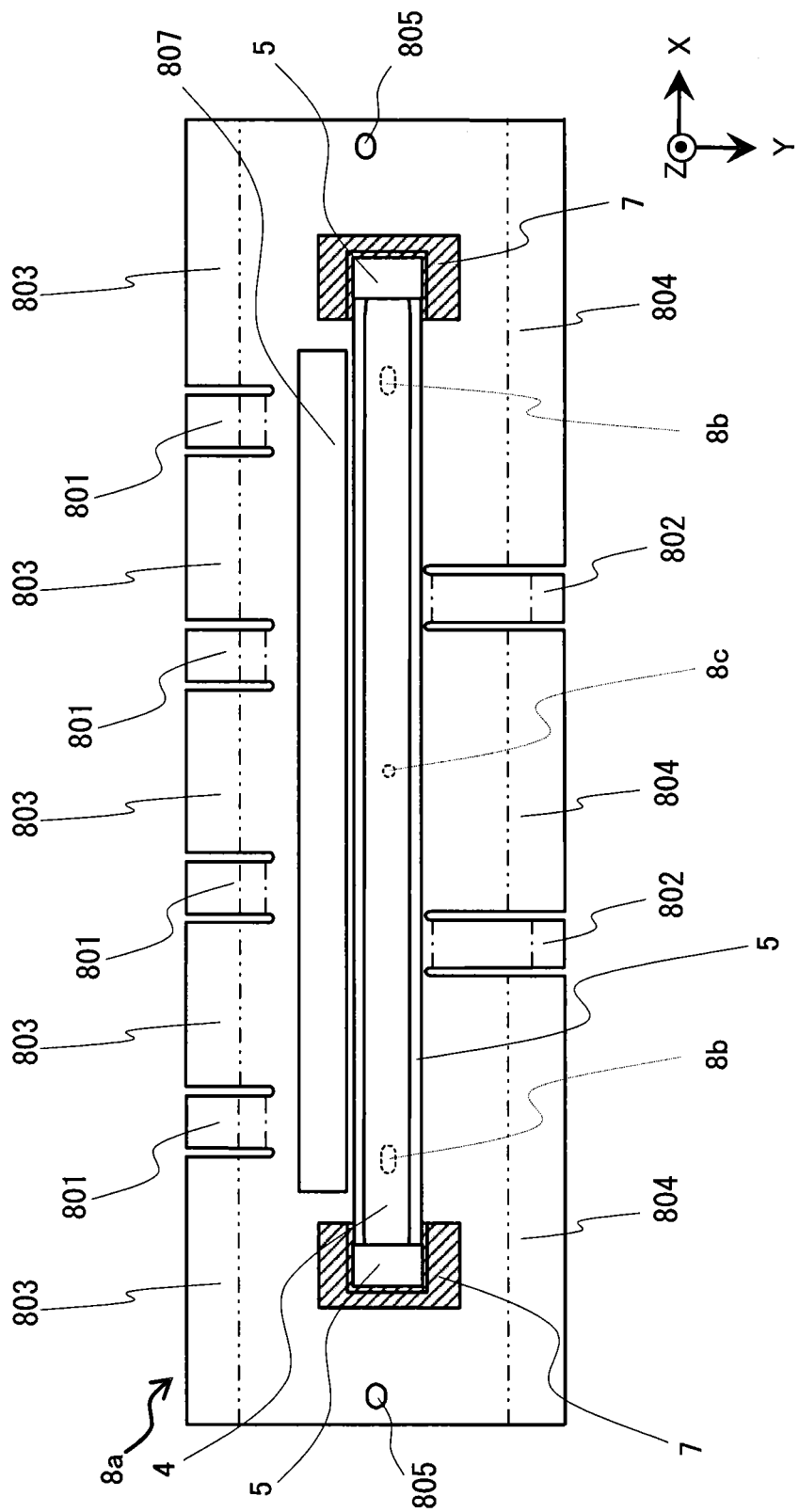

LIGHT-SOURCE DEVICE

TECHNICAL FIELD

The present disclosure relates to a light source device that uses a light guide.

BACKGROUND ART

Conventionally, among light source devices used for illumination in an image scanning device, there exist configurations in which a light source such as LEDs are placed at the ends of a transparent light guide extending in the main scanning direction of the image scanning device, cause light to be input, and cause light to be output from a side face of the light guide into which the light is input (for example, see Patent Literature 1 to 4). These are referred to as sidelight-type light source devices.

In the scanning device of Patent Literature 1, the light guide includes a columnar part into which light from a light-emitting element is input from the ends, and includes a convex part that projects out approximately perpendicular to the lengthwise direction of the columnar part near the ends of the columnar part. A holder includes an engaging part that engages with the convex part. The engaging part engages with the convex part therebetween in the lengthwise direction of the light guide, such that the convex part is movable with respect to engaging part in the case in which the relative positions of the light guide and a frame change due to temperature changes.

In a light source device as described in Patent Literature 2, optical filters are placed opposite the end faces of the light guide. Also, in the light source device as described in Patent Literature 3 and 4, countermeasures are provided against expansion and contraction due to temperature changes near the light guide. Note that there are configurations that place light sources at both end faces of the light guide, as described in Patent Literature 2 and 3, and configurations that place a light guide at one end face of the light guide, as described in Patent Literature 4.

The light source devices described in Patent Literature 5 to 9 are other examples of a light source device that places a light source at one end face of a light guide. With respect to a light guide as described in Patent Literature 5, there are also light guides whose ends are curved, as described in Patent Literature 6 to 9. Additionally, as described in FIG. 10 of Patent Literature 9, there is also a configuration in which both ends of the light guide are curved, and light sources are placed at both end faces of the curved light guide.

As another light source device used for illumination in an image scanning device, there is a configuration in which light sources such as a plurality of light-emitting diodes (LEDs) are arranged in the main scanning direction of the image scanning device (for example, see Patent Literature 10, 11, and 12). Patent Literature 10 and 11 describe configurations in which light emitted from the LEDs is guided by a light guide member, and radiated onto a reflector. Also, Patent Literature 12 describes a configuration in which light output from the LEDs is radiated onto a reflector. These are referred to as LED array-type light source devices.

Patent Literature 10, 11, and 12 also describe a reflector (a first mirror) constituting an image-forming optical system of an image scanning device. Particularly, FIG. 5 of Patent Literature 11 discloses a reflector (first mirror) supported by a carriage of an image scanning device.

Patent Literature 13 and 14 describe a reflector (first mirror) supported by a carriage of an image scanning device. In Patent Literature 13 and 14, both ends of the reflector (first mirror) are supported.

CITATION LIST

Patent Literatures

Patent Literature 1: Unexamined Japanese Patent Application Kokai Publication No. 2010-283436
Patent Literature 2: Unexamined Japanese Patent Application Kokai Publication No. 2008-28617
Patent Literature 3: Unexamined Japanese Patent Application Kokai Publication No. 2010-103742
Patent Literature 4: Unexamined Japanese Patent Application Kokai Publication No. 2011-61411
Patent Literature 5: Unexamined Japanese Patent Application Kokai Publication No. 2006-85975
Patent Literature 6: Unexamined Japanese Patent Application Kokai Publication No. 2010-21983
Patent Literature 7: Unexamined Japanese Patent Application Kokai Publication No. 2007-201845
Patent Literature 8: Unexamined Japanese Patent Application Kokai Publication No. 2004-266313
Patent Literature 9: Unexamined Japanese Patent Application Kokai Publication No. 1111-55476
Patent Literature 10: Unexamined Japanese Patent Application Kokai Publication No. 2011-211464
Patent Literature 11: Unexamined Japanese Patent Application Kokai Publication No. 2011-49808
Patent Literature 12: Unexamined Japanese Patent Application Kokai Publication No. 2007-318406
Patent Literature 13: Unexamined Japanese Patent Application Kokai Publication No. 2002-135533
Patent Literature 14: Unexamined Japanese Patent Application Kokai Publication No. 2004-279663

SUMMARY OF INVENTION

Technical Problem

With linear light source devices used in image scanning devices and the like, as the image scanning devices become faster and higher in resolution, there is demand for brighter light sources and a supply of light that is uniform in both the lengthwise direction and the height direction. As a means of supplying uniform light in the lengthwise direction, there is used a light source that places light emitters so as to face opposite the end faces of a columnar light guide, referred to as the sidelight type.

In the illumination device described in Patent Literature 1, since the holder is affixed to the frame by interlocking pins on the holder and positioning holes formed in the walls of the frame, if the light guide stretches due to temperature changes, the degree of interlocking with the holder of the light guide changes. For this reason, there is a problem in that the amount of light radiated from the light source onto a document changes depending on temperature.

In a sidelight-type light source device, since the relative positions of components such as the light guide vary according to thermal expansion, and the optical characteristics vary, countermeasures like the following are implemented in conventional light source devices. In Patent Literature 2, this problem is resolved by holding the light guide, the optical filters, and the light-emitting elements at suitable distances with a holder. Also, Patent Literature 4 discloses a structure equipped with an elastic body. In Patent Literature 5, a structure equipped with a cap that holds the ends of the light guide inside a case is used.

However, conventional countermeasures that minimize the variance in the relative positions of components constituting the light source device, such as the light guide, are problematic in that the structure of the light source device becomes complicated.

The present disclosure, being devised in light of circumstances like the above, has as an object to minimize temperature-dependent changes in the illumination characteristics of a light source device.

Solution to Problem

A light source device according to a first aspect of the present disclosure is equipped with: a light guide having a columnar shape whose central axis direction is a lengthwise direction; an end holder into which an end in the lengthwise direction of the light guide is inserted, and in which is formed a through-hole that slidably holds the light guide; a light-emitting part disposed at the position of the through-hole, facing opposite an end face in the lengthwise direction of the light guide; a light guide cover in which is formed a long groove into which a midsection of the light guide is disposed along the lengthwise direction; and a housing that holds the end holder and the light guide holder. On the light guide cover and the housing, at opposing faces at which the light guide cover and the housing abut, an engaging part that restricts arbitrary planar movement in the opposing face direction of the light guide cover is formed in a center part of the light guide cover, and a restricting part that allows movement of the light guide cover in the lengthwise direction but restricts movement in a direction orthogonal to the lengthwise direction is formed at both ends in the lengthwise direction of the light guide cover.

A light source device according to a second aspect of the present disclosure is equipped with: a light-emitting part; a light guide having a columnar part whose central axis direction is a lengthwise direction, that guides light input into an end face from the light-emitting part in a lengthwise direction of the columnar part, and outputs light from a side face of the columnar part; a light guide holder that covers an end of the light guide except for at least part of the end face; and a support part, having a through-hole that penetrates from one face to another face formed therein, that holds an end of the light guide holder on a side of a first opening on the one face of the through-hole so as to allow sliding in the lengthwise direction, or alternatively, the end of the light guide holder stretches in the lengthwise direction inside the first opening or above the first opening, and light from the light-emitting part is input into the light guide via a second opening on the other face of the through-hole, or alternatively, the light-emitting part is disposed in the second opening, and the support part supports an optical filter between the first opening and the second opening while maintaining a designated spacing with the light-emitting part.

Advantageous Effects of Invention

According to the present disclosure, it is possible to minimize temperature-dependent changes in the illumination characteristics of a light source device.

BRIEF DESCRIPTION OF DRAWINGS

FIG. 15A is a side view of a light source device as seen from the direction of the arrow A in FIG. 14;

FIG. 15B is a side view of a light source device as seen from the direction of the arrow B in FIG. 14;

FIG. 16A is a side view of a light source device as seen from the direction of the arrow C in FIG. 14;

FIG. 16B is a side view of a light source device as seen from the direction of the arrow D in FIG. 14;

FIG. 23 is a development view of a planar member that forms the housing of a light source device according to Modification 2.1 of Embodiment 2;

FIG. 28A is a development view of a planar member that forms the housing of a light source device according to Modification 2.5;

FIG. 28B is a diagram that corresponds to the cross-section along the line G-H in FIG. 14 of a light source device according to Modification 2.5;

FIG. 28C is a diagram that corresponds to the cross-section along the line I-J in FIG. 14 of a light source device according to Modification 2.5;

FIG. 33 is a development view of a planar member in a different configuration of a light source device according to Embodiment 3;

FIG. 35 is a development view of a planar member that forms the housing of a light source device according to Modification 3.1 of Embodiment 3;

DESCRIPTION OF EMBODIMENTS

Embodiment 1.

Figure 1:
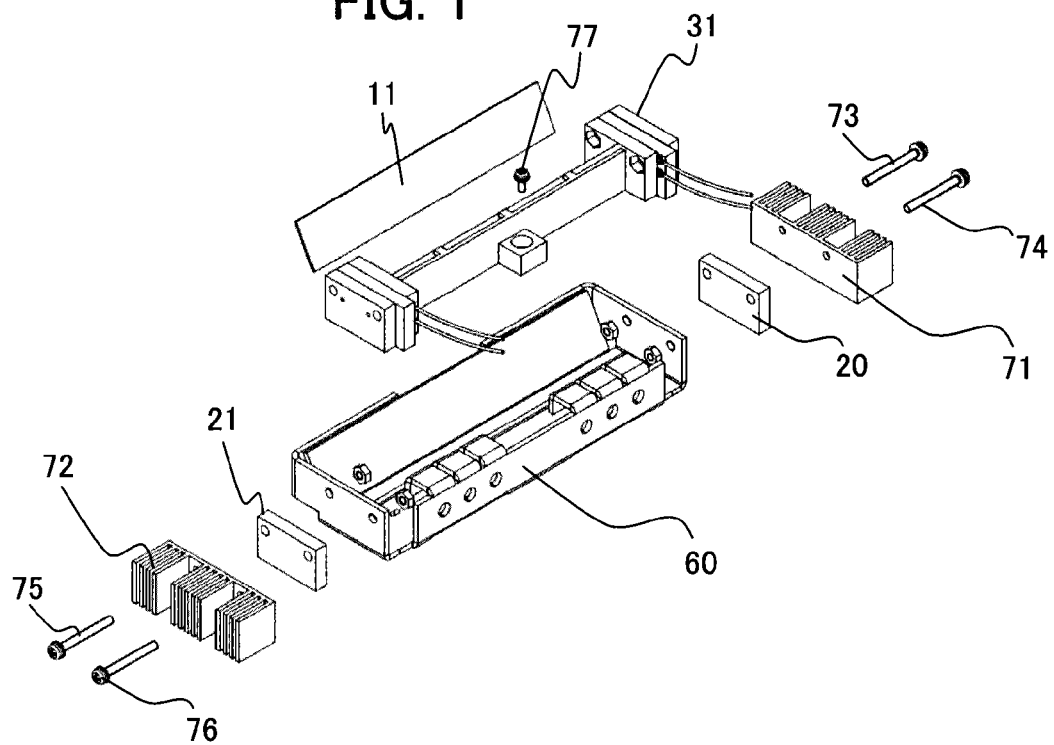
FIG. 1 is an exploded view illustrating a configuration of a light source device according to Embodiment 1 of the present disclosure.

FIG. 1 is an exploded view illustrating a configuration of a light source device according to Embodiment 1 of the present disclosure. The light source device is equipped with a light source part 31, a reflector 11, a housing 60, heat transfer bodies 20 and 21, heatsink fins 71 and 72, and the like. The light source part 31 and the reflector 11 are housed in the housing 60, while the heat transfer bodies 20 and 21 and the heatsink fins 71 and 72 are attached to both lengthwise ends of the housing 60 with screws 73, 74, 75, and 76.

Figure 2:
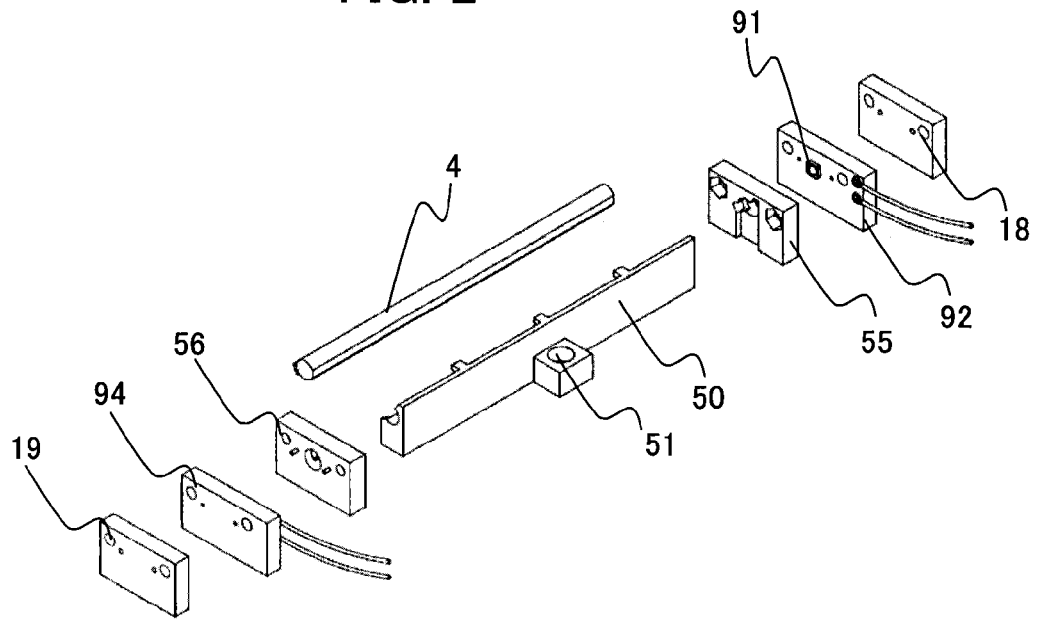
FIG. 2 is an exploded view illustrating a light source part of a light source device according to Embodiment 1.

FIG. 2 is an exploded view illustrating a light source part of a light source device according to Embodiment 1. The light source part 31 comprises a light guide 4, a light guide cover 50, end holders 55 and 56, light emitter mounting substrates 92 and 94, and heat transfer bodies 18 and 19. The light guide 4 is made of a transparent resin and formed in a columnar shape whose central axis direction is the lengthwise direction. Hereinafter, the central axis of the light guide 4 is designated the lengthwise direction of the light source device, while the direction orthogonal to the central axis is designated the widthwise direction. In the embodiments, the long-edge direction of the housing 60 corresponds to the lengthwise direction, while the short-edge direction of the housing 60 corresponds to the widthwise direction.

The light guide cover 50 is formed with a white resin, highly reflective metal, or the like, and a long groove is formed along the lengthwise direction. The midsection of the light guide 4 is placed into this long groove to hold the light guide 4 in the lengthwise direction. The open side of this long groove forms an output area that outputs light from the light guide 4.

Figure 3:
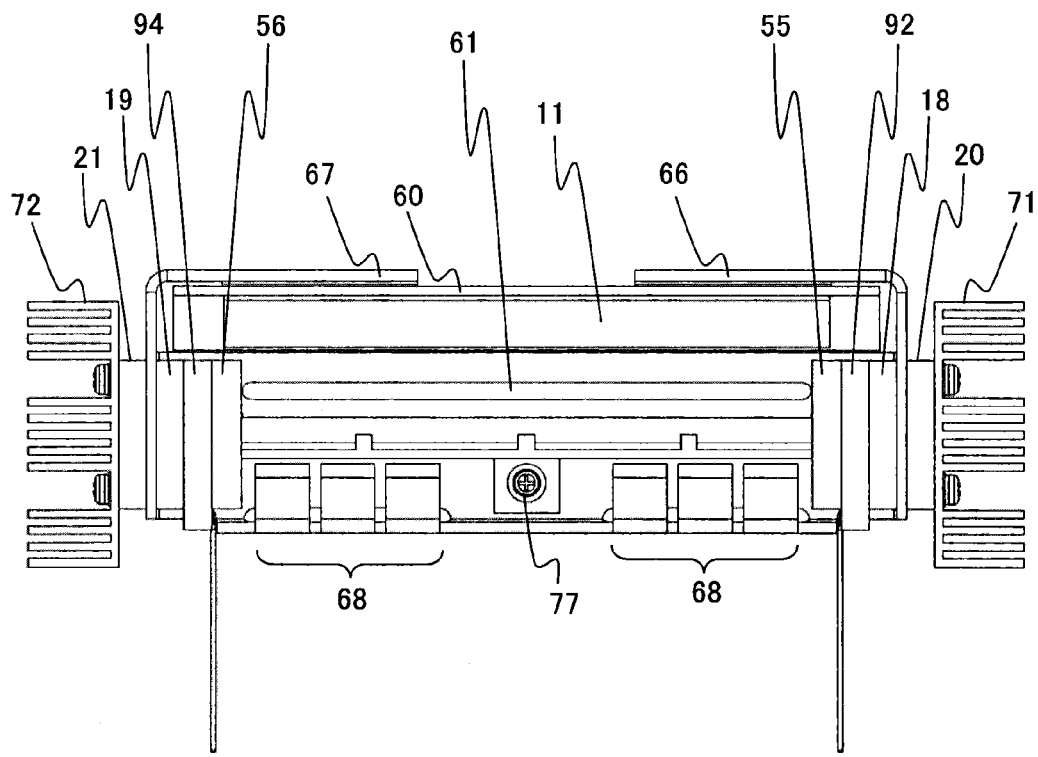
FIG. 3 is a plan view as seen from the light output direction of a light source device according to Embodiment 1.
Figure 4:
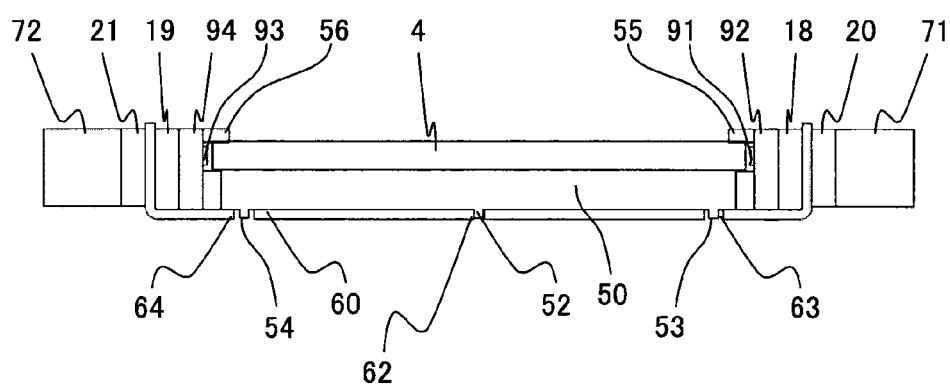
FIG. 4 is a cross-section view as seen in the widthwise direction of a light source device according to Embodiment 1.

FIG. 3 is a plan view as seen from the light output direction of a light source device according to Embodiment 1. FIG. 4 is a cross-section view as seen in the widthwise direction of a light source device according to Embodiment 1. The end holders 55 and 56 respectively hold the ends of the light guide 4 and the light emitter mounting substrates 92 and 94, and suppress the output of unintentional light from the light emitters 91 and 93 (see FIG. 4).

Since the light source part 31 is symmetrical in the lengthwise direction, the side on one end of the light guide 4 will be described, while the signs for the side of the other end will be indicated in parenthesis. A lengthwise end of the light guide 4 is inserted into the end holder 55 (56), in which is formed a through-hole that slidably holds the light guide 4. An end that includes the end face on one side of the light guide 4 is inserted into the end face on one side of the end holder 55 (56), and the light emitter mounting substrate 92 (94) affixed with the light emitter 91 (93) is placed on the end face on the opposite side of the end holder 55 (56) so that the light emitter 91 (93) and the end face of the light guide 4 face opposite each other. Wavelength characteristics may also be adjusted by placing a thin optical device with wavelength-converting properties, such as a filter, between the light emitter 91 (93) and the light guide 4.

In the end holders 55 and 56, the location corresponding to the open side of the columnar side face of the light guide 4 in the long groove of the light guide cover 50 preferably projects out farther towards the light guide 4 than other locations around the through-hole.

The light emitter 91 (93) is a light source element such as an LED light source that inputs light from an end face on one side of the light guide 4. The light emitter 91 (93) is affixed by soldering or the like to the light emitter mounting substrate 92 (94), and is current-drive by the light emitter mounting substrate 92 (94) to emit light. Light input into the end face of the light guide 4 from the light emitter 91 (93) is guided in the lengthwise direction of the light guide 4, and output from the side face of the light guide 4 on the open side of the long groove in the light guide cover 50.

Figure 5A:
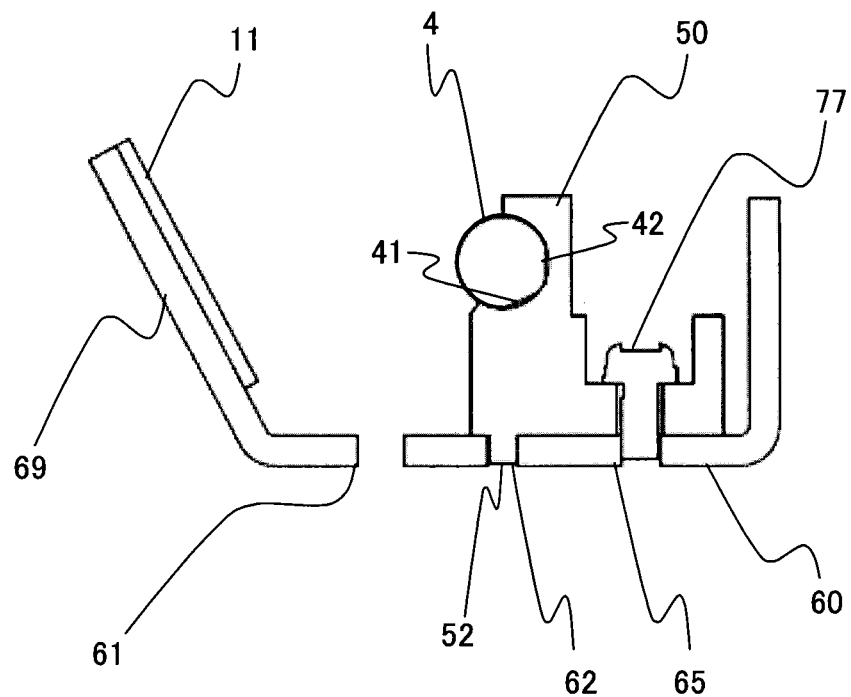
FIG. 5A is a cross-section view as seen in the lengthwise direction of the center of a light source device according to Embodiment 1.
Figure 5B:
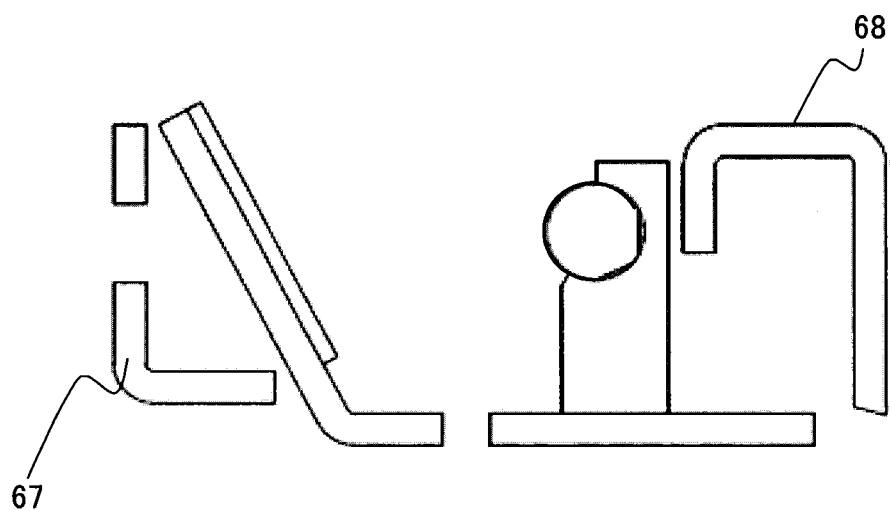
FIG. 5B is a cross-section view as seen in the lengthwise direction of the positions of wings and fins of a light source device according to Embodiment 1.

FIG. 5A is a cross-section view as seen in the lengthwise direction of the center of a light source device according to Embodiment 1. FIG. 5B is a cross-section view as seen in the lengthwise direction of the positions of wings and fins of a light source device according to Embodiment 1. The light guide 4 has an approximately circular cross-section, and the side-face shape is cylindrical and includes a reflective area 41 and a reflective area 42 in two locations extending along the entire lengthwise direction. The side-face shape of the light guide 4 is not limited to a cylinder, and the end face of the light guide 4 is not limited to a circle.

The reflector 11, laid parallel to the light guide 4 in the lengthwise direction, reflects secondary light output from the light guide 4, and irradiates in the direction of a document receptacle. The reflector 11 comprises a vapor-deposited metal face or the like, and is a thin plate or sheet extending in the lengthwise direction. The reflector 11 is kept at a suitable distance and angle with respect to the light guide 4 and the document receptacle by being affixed to a reflector installation face 69 of the housing 60 by adhesive bonding or the like.

The light guide cover 50 holds the light guide 4 at a suitable position with respect to the reflector 11 and the housing 60. The light guide cover 50 reflects bleeding light from the side face or the back face of the reflective area 41 and the reflective area 42 towards the light guide 4, and suppresses the output of unintentional light from other than an output area 43 and an output area 44 (see FIG. 8). The light guide cover 50 includes a screw hole 51 formed in the lengthwise center and on the side opposite the reflector 11 in the widthwise direction (the side of the fins 68 of the housing 60), and is affixed to the housing 60 by a screw 77. In the bottom face (opposing face) abutting the housing 60, the light guide cover 50 is equipped with a pin (projection) 52 formed in the center part (lengthwise center) of the light guide cover, and a pin (projection) 53 and a pin (projection) 54 formed at both ends in the lengthwise direction.

Figure 6:
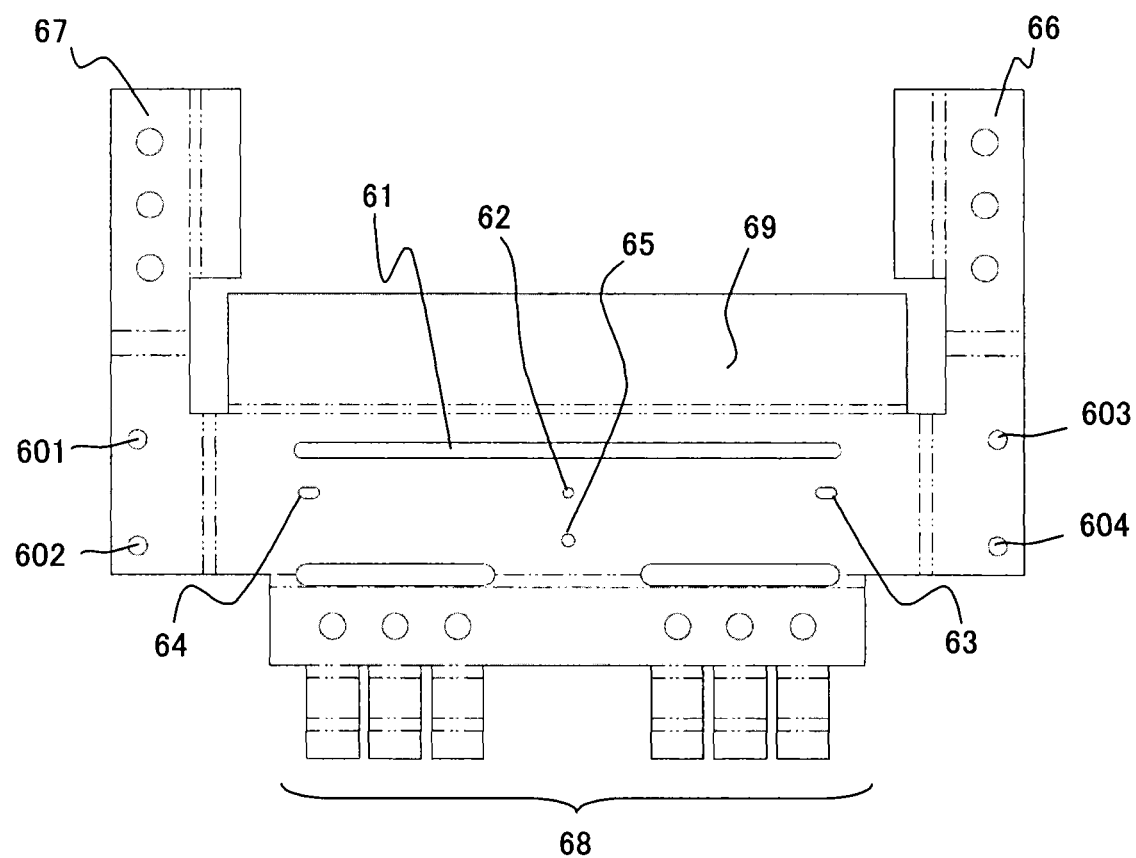
FIG. 6 is a development view of a housing according to Embodiment 1.

FIG. 6 is a development view of a housing according to Embodiment 1. The housing 60 is formed by sheet metal with good heat dissipation, such as aluminum, and is formed into a box shape by being bent inwards along the two-dot chain lines in FIG. 6. Namely, by bending, there is a formed a floor having a rectangular shape, a long-edge wall and fins 68 bent out of the page in FIG. 6 on the long edge on one side of the floor, as well as a sloped face (reflector installation face 69) bent in the same direction at a designated angle from the short-edge direction of the floor on the long edge on the other side of the floor, to which the reflector 11 is affixed. On the short edges of the floor, there are formed short-edge walls bent in the same direction, and heatsinks (wings 66 and 67), continuous with the short-edge walls, bent in the long-edge direction, and extending in the long-edge direction facing the opposite side of the long-edge wall with respect to the reflector installation face 69.

Note that the heatsinks (wings 66 and 67) may also be continuous with the long-edge wall side of the short-edge walls, bent in the long-edge direction, and extending in the long-edge direction facing the opposite side of the reflector installation face 69 with respect to the long-edge wall.

The housing 60 is equipped with a bottom face, a wing 66 and a wing 67, fins 68, and a reflector installation face 69. On the bottom face of the housing 60, a holding hole (interlocking hole) 62 and a screw hole 65 are formed in the lengthwise center, and a holding hole 63 and a holding hole 64 are formed at both lengthwise ends. The holding hole 63 and the holding hole 64 are long holes elongated in the lengthwise direction. Additionally, on the bottom face there is formed an aperture 61, which is a hole extending along the lengthwise direction. On the short-edge walls of the housing 60, screw holes 601, 602, 603, and 604 are formed.

The light guide cover 50 is affixed to the bottom face of the housing 60 by aligning the screw hole 65 and the screw hole 51 (see FIG. 1), and penetrating the screw hole 51 and the screw hole 65 with the screw 77. The pin 52 is inserted into the holding hole 62, while the pins 53 and 54 are respectively inserted into the holding holes 63 and 64. The end holder 55 (56), the heat transfer body 18 (19), the heat transfer body 20 (21), and the heatsink fins 71 (72) are affixed to a short-edge wall of the housing 60 by screws 73 and 74 (75 and 76) through screw holes 601 and 602 (603 and 604). Subsequently, the reflector 11 is affixed to the reflector installation face 69.

The aperture 61 is a hole formed along the lengthwise direction positioned in the widthwise center part of the bottom face of the housing 60, and conveys light, which has been scattered and reflected by the object to be scanned from among the light radiated onto the object to be scanned, to an imager (a lens and image sensor), and suppresses all other unwanted light.

The holding hole 62 is a round hole formed in the bottom face of the housing 60, and positioned in the center of the lengthwise direction and between the aperture 61 and the fins 68 in the widthwise direction. The pin 52 is inserted into the holding hole 62 when the screw hole 65 and the screw hole 51 are aligned and the light guide cover 50 is attached to the bottom face. By inserting the pin 52 of the light guide cover 50 into the holding hole 62, arbitrary parallel movement in the bottom-face direction of the light guide cover is restricted. The pin 52 and the holding hole 62 constitute an engaging part.

The configuration of the interlocking part is not limited to the pin 52 and the holding hole 62. A projection may be formed on the bottom face of the housing 60, and a holding hole may be formed in the light guide cover 50. In addition, it is also possible to take a configuration in which holes are formed in both, and a pin passing through these holes is inserted from the bottom-face side of the housing 60, for example. Furthermore, one hole may be threaded, and bolted from the other hole.

The holding hole 63 (64) is a long hole elongated in the lengthwise direction, formed in the bottom face of the housing 60, and positioned at one end in the lengthwise direction and between the aperture 61 and the side of the fins 68 in the widthwise direction. The pin 53 (54) is inserted into the holding hole 63 (64) when the screw hole 65 and the screw hole 51 are aligned and the light guide cover 50 is attached to the bottom face. By inserting the pin 53 of the light guide cover 50 into the holding hole 63, movement of the light guide holder in the lengthwise direction is possible on the bottom face of the housing 60, while movement in the widthwise direction (the direction orthogonal to the lengthwise direction) is restricted. The pin 53 (54) and the holding hole 63 (64) constitute a restricting part.

The configuration of the restricting part is not limited to the pin 53 (54) and the holding hole 63 (64). A projection may be formed on the bottom face of the housing 60, and a long hole in the lengthwise direction may be formed in the light guide cover 50. In addition, it is also possible to take a configuration in which a round hole is formed in one and a long hole in the other, and a pin (rivet) is inserted into the round hole from the long hole side. Furthermore, the round hole may be threaded, and bolted from the side of the other long hole.

The wings 66 and 67 are positioned farther outward than the reflector 11 with respect to aperture 61, and extend the housing side face in the lengthwise direction. The wings 66 and 67 dissipate heat transferred from the light emitters 91 and 93 and the light emitter mounting substrates 92 and 94. The fins 68 are arranged on the housing side face at a position on the side opposite the reflector 11 with respect to the aperture 61. The fins 68 dissipate heat transferred from the light emitters 91 and 93 and the light emitter mounting substrates 92 and 94.

The light guide cover 50 takes a suitable position at the following four points on the housing 60. Namely, the pin 52 is inserted into the holding hole 62, while the pin 53 and the pin 54 are respectively inserted into the holding hole 63 and the holding hole 64. In addition, the screw hole 51 and the screw hole 65 are affixed by the screw 77. The light guide cover 50 is shorter than the total length of the light guide 4. The end faces of the light guide cover 50 face the end faces of the end holder 55 and the end holder 56, and the gap length thereof is greater than the amount of expansion due to temperature change of the light guide cover 50. As discussed earlier, since the holding hole 63 and the holding hole 64 are long holes, and the pin 53 and pin 54 are not affixed in the lengthwise direction, the light guide 4 is held in the widthwise direction without the light guide cover 50 bowing, even in the case in which the light guide cover 50 stretches due to temperature changes.

The heat transfer bodies 18, 19, 20, and 21 are formed of sheet silicone, for example, have high adhesiveness and thermal conductivity, and work to transfer heat. The heatsink fins 71 and 72 are fabricated by extrusion molding or the like from a metal with high thermal conductivity, such as aluminum. Heat from the light emitter 91 (93) and the light emitter mounting substrate 92 (94) is dissipated via the thermal conduction path of the heat transfer body 18 (19), the housing 60, the heat transfer body 20 ((21), and the heatsink fins 71 (72).

The housing 60 has a role of allowing heat from the light emitters 91 and 93 to diffuse. Heat from the light emitter 91 (93) is transferred to the light emitter mounting substrate 92 (94) from the junction plane of the light emitter 91 (93) and the light emitter mounting substrate 92 (94), transferred to the heat transfer body 18 from the junction plane of the light emitter mounting substrate 92 and the heat transfer body 18, transferred into the housing 60 from the junction plane of the heat transfer body 18 and the housing 60, and dissipated via a path that dissipates heat from the wing 66, the wing 67, and the fins 68 of the housing 60, as well as a path from the housing 60 to the heat transfer body 20 that dissipates heat from the heat transfer body 20 via the heatsink fins 71, and a path from the housing 60 to the heat transfer body 21 that dissipates heat from the heat transfer body 21 via the heatsink fins 72.

Figure 7A:
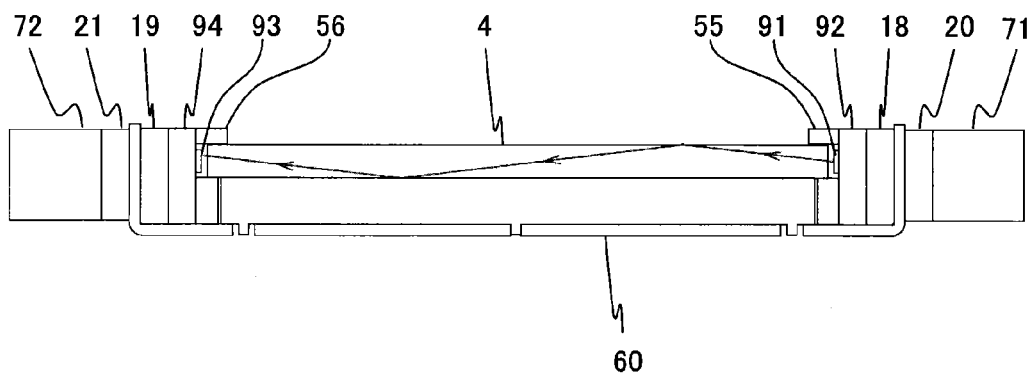
FIG. 7A is a diagram illustrating a light path in the lengthwise direction of a light source device according to Embodiment 1.
Figure 7B:
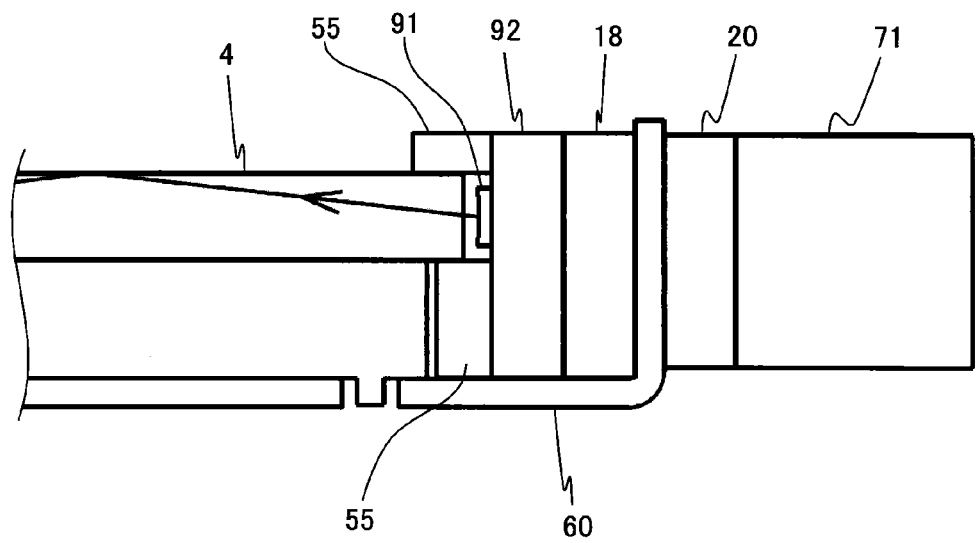
FIG. 7B is an enlarged view of the ends in FIG. 7A.
Figure 8:
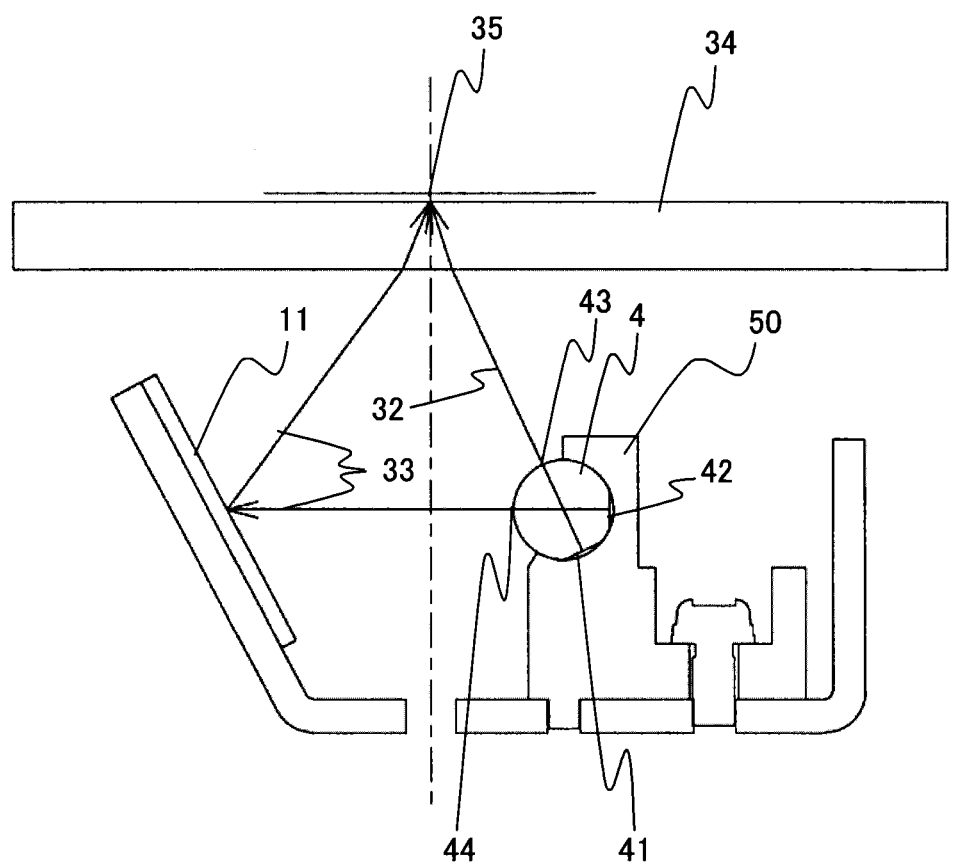
FIG. 8 is a diagram illustrating a light path in the widthwise direction of a light source device according to Embodiment 1.

FIG. 7A is a diagram illustrating a light path in the lengthwise direction of a light source device according to Embodiment 1. FIG. 7B is an enlarged view of the ends in FIG. 7A. FIG. 8 is a diagram illustrating a light path in the widthwise direction of a light source device according to Embodiment 1. As indicated by the arrow in FIG. 7, light input into the light guide 4 from the light emitter 91 (93) proceeds while being repeatedly reflected off the side face of the light guide 4, and part of the light is incident on the reflective area 41 and the reflective area 42 having a white printed pattern or uneven shape formed along the lengthwise direction of the light guide 4. As illustrated in FIG. 8, light incident on the reflective area 41 is scattered and reflected, and radiated in the direction of an irradiated part 35 of the document receptacle 34 as a band of primary light 32 having width in the lengthwise direction from the output area 43 (the portion on the surface of the light guide 4) facing opposite the reflective area 41.

Since the end holders 55 and 56 form a shape in which a portion corresponding to the open side of the groove in the light guide cover 50 projects farther outward towards the light guide 4 compared to other portions, non-uniform light at the ends of the light guide 4 is not output from the light guide 4.

Meanwhile, as illustrated in FIG. 8, light incident on the reflective area 42 is output by reflection towards the reflector 11 as a band of secondary light 33 that is wide in the lengthwise direction from the output area 44 (the surface of the light guide 4 on the reflector 11 side) facing opposite the reflective area 42. The secondary light 33 output towards the reflector 11 is reflected by the reflector 11, and radiated in the direction of the irradiated part 35 of the document receptacle 34 as a band of secondary light 149 having width in the lengthwise direction. The arrows proceeding from the reflective area 41 and the reflective area 42 of the light guide 4 to the document receptacle 34 illustrated in FIG. 8 respectively indicated the primary light paths along which light reflected from the reflective area 41 and the reflective area 42 irradiates the object to be scanned.

Figure 9A:
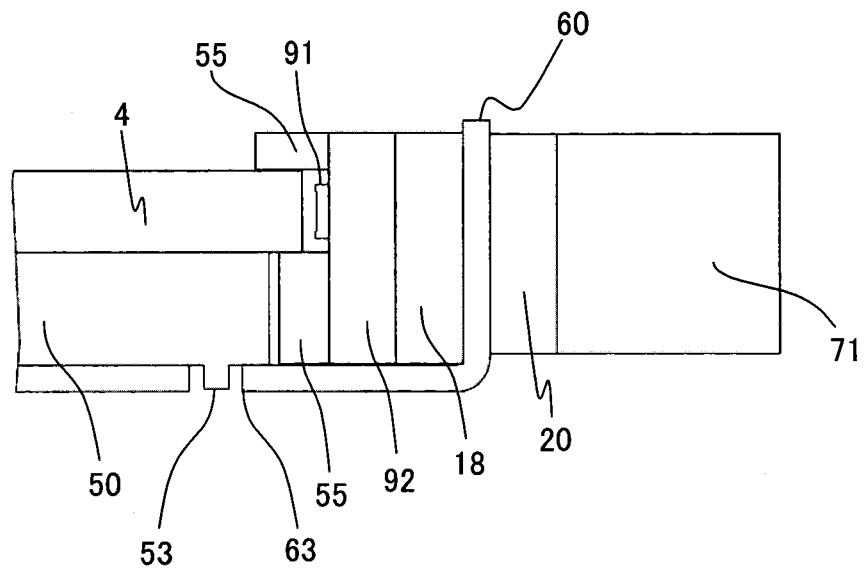
FIG. 9A is a cross-section view as seen in the widthwise direction near a light emitter of a light source device according to Embodiment 1.
Figure 9B:
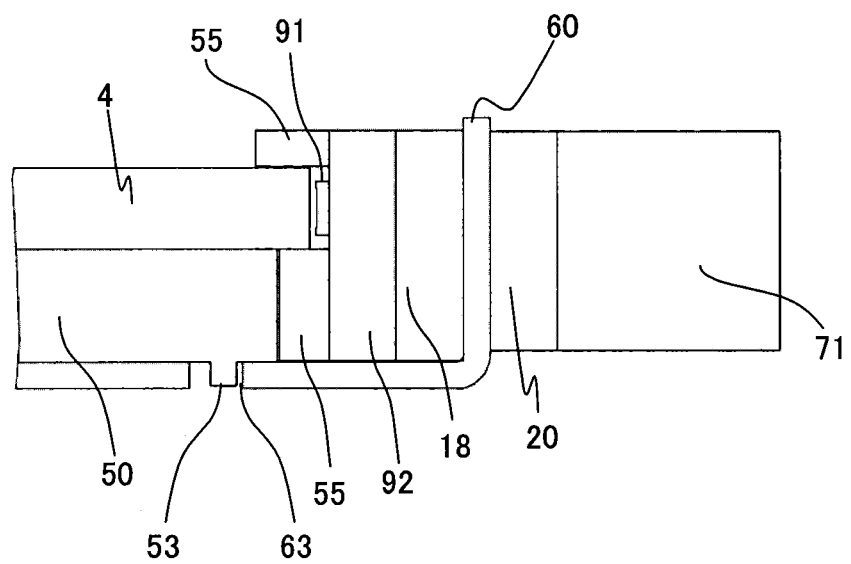
FIG. 9B is a cross-section view illustrating an expanded state of the light guide and the light guide cover in FIG. 9A.

FIG. 9A is a cross-section view as seen in the widthwise direction near a light emitter of a light source device according to Embodiment 1. FIG. 9B is a cross-section view illustrating an expanded state of the light guide and the light guide cover in FIG. 9A. FIG. 9A is a cross-section view at normal temperature, while FIG. 9B is a cross-section view at high temperature. At both normal temperature and high temperature, the distances of the housing 60, the heat transfer body 18, the light emitter mounting substrate 92, the light emitter 91, and the end holder 55 are nearly constant. The degree of interlocking between the light guide 4 and the end holder 55, as well as the relative positions of the light guide cover 50 and the end holder 55, vary according to temperature changes. At high temperature, the light guide 4 and the end holder 55 expand, and the spacing between the light guide 4 and the light emitter 91, as well as the spacing between the light guide cover 50 and the end holder 55, narrow compared to normal temperature.

Since the holding holes 63 and 64 of the housing 60 have a margin corresponding to the amount of temperature-related stretching of the light guide cover 50 in the lengthwise direction, and since the light guide cover is able to stretch in the lengthwise direction, the light guide 4 and the light guide cover 50 do not vary in the height direction and the widthwise direction. In other words, a configuration whose illumination characteristics do not change is obtained. Also, since the end holder 55 (56) is affixed to the housing 60 in the lengthwise direction by the screws 73 and 74 (75 and 76), the heat dissipation effects do not change. In other words, there is obtained a light source device whose illumination characteristics and heat dissipation characteristics do not change according to stretching of the light guide 4 due to temperature changes.

Hereinafter, in Embodiments 2 to 4, the central axis of the columnar part of the light guide 4 is likewise designated the lengthwise direction of the light source device, while the direction orthogonal to the central axis is designated the widthwise direction.

In the case of using a light source device in an image scanning device (image forming device), the lengthwise direction of the lengthwise direction is anticipated to be the main scanning direction of the image scanning device, while the widthwise direction is anticipated to be the sub scanning direction. In Embodiments 2 to 4, three axes labeled X, Y, and Z are indicated in FIGS. 10 to 56. Of these, the X axis represents the lengthwise direction (long-edge direction, main scanning direction). The Y axis represents the widthwise direction (short-edge direction, sub scanning direction). Meanwhile, the Z axis represents the thickness direction (height direction, illumination depth direction) of the light source device and the reflector support structure. Note that in the drawings, the same signs are given to the same or similar parts.

Embodiment 2.

Figure 10:
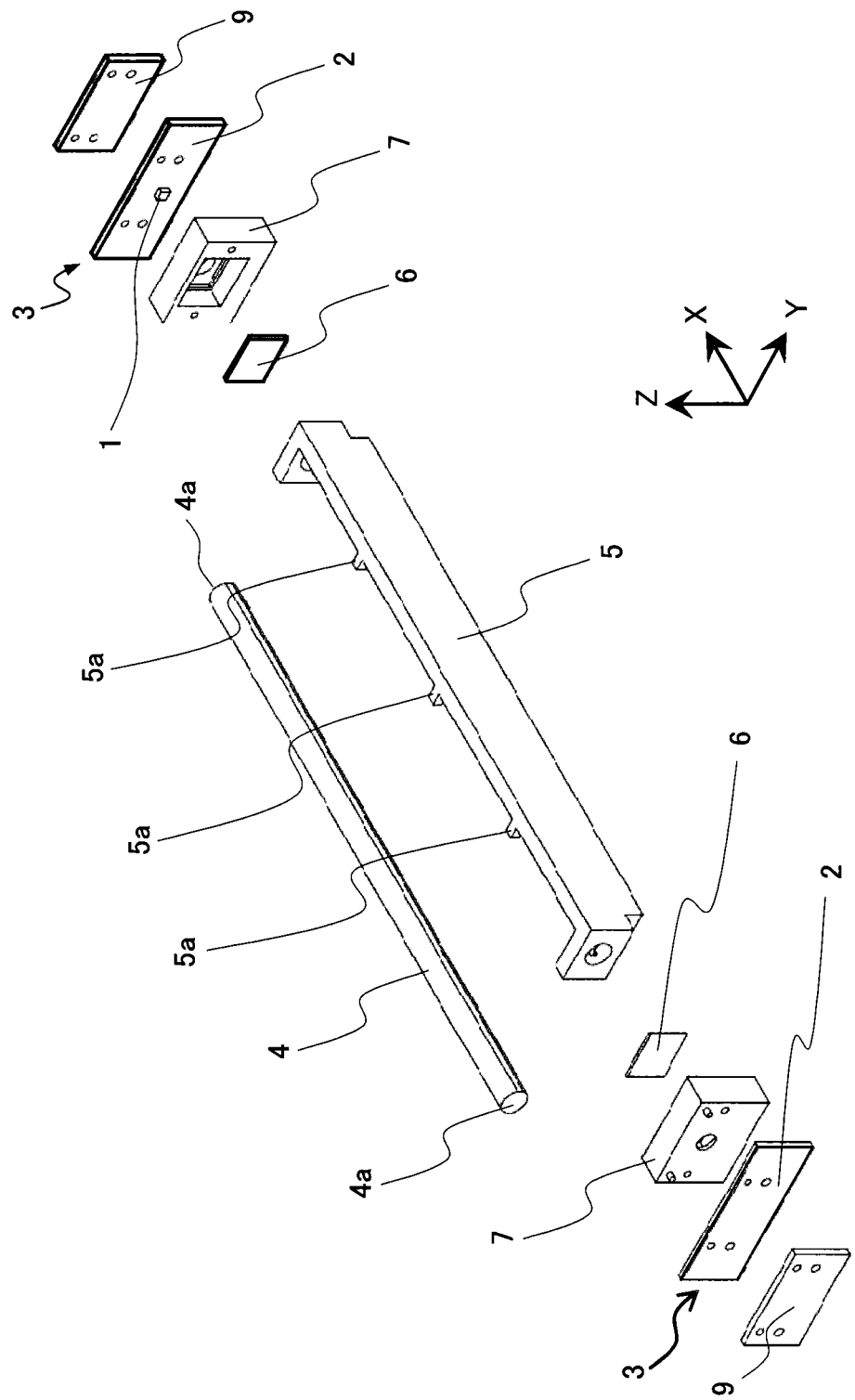
FIG. 10 is an exploded perspective view of a light guide and nearby in a light source device according to Embodiment 2 of the present disclosure.
Figure 11:
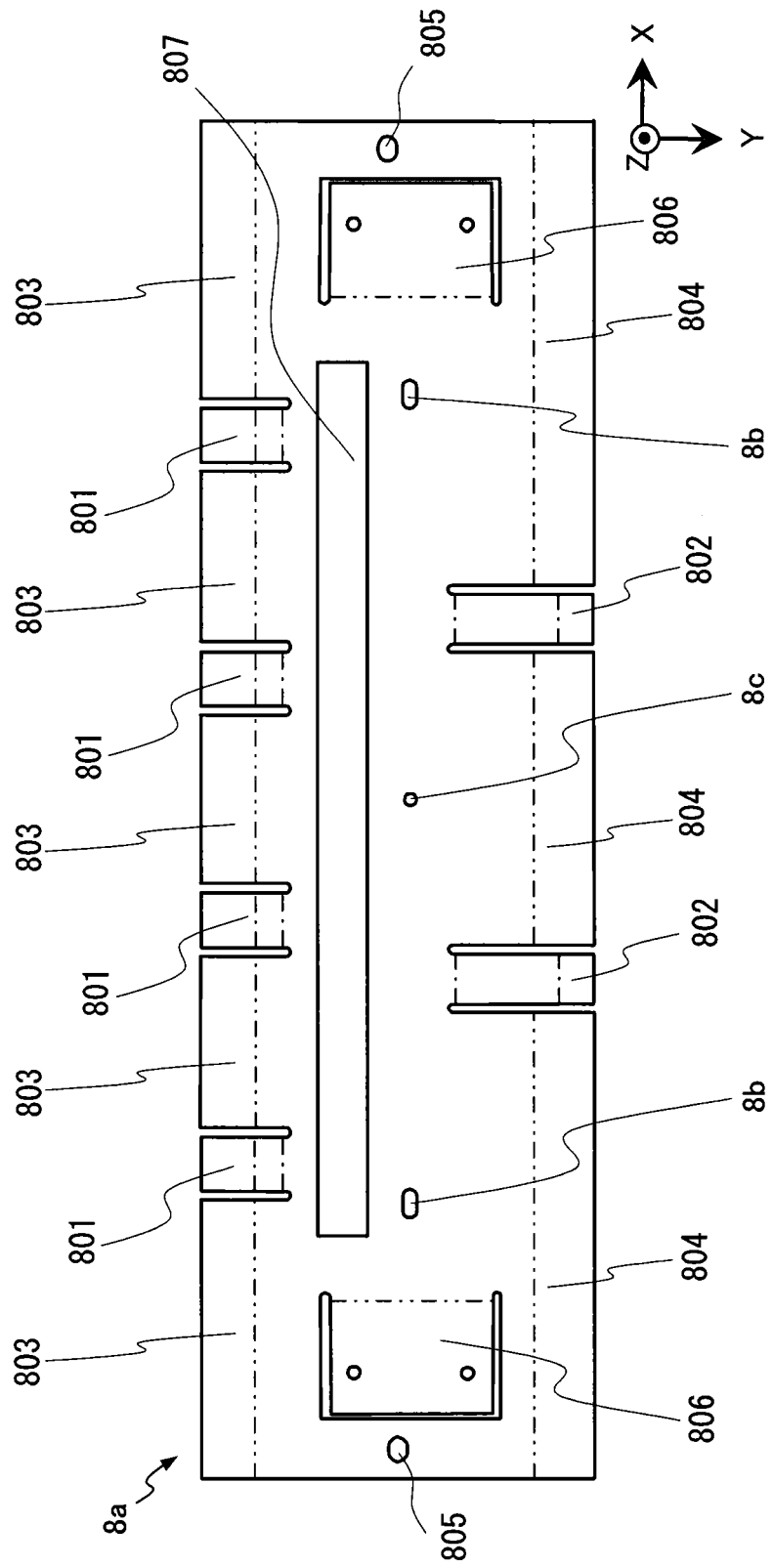
FIG. 11 is a development view of a planar member that forms the housing of a light source device according to Embodiment 2.
Figure 12:
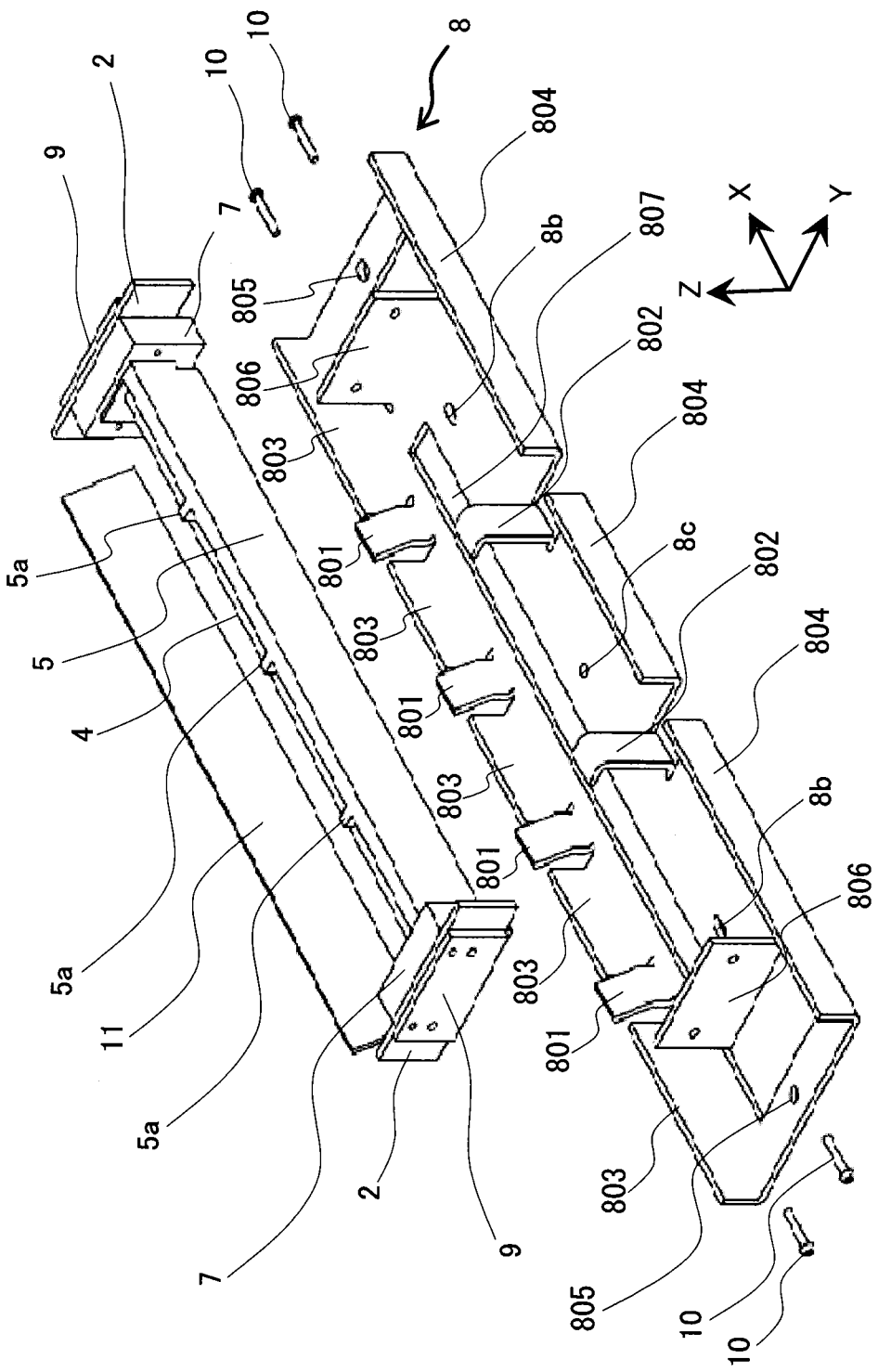
FIG. 12 is an exploded perspective view of a light source device according to Embodiment 2.

FIG. 10 is an exploded perspective view of a light guide and nearby in a light source device according to Embodiment 2 of the present disclosure. FIG. 11 is a development view of a planar member that forms the housing of a light source device according to Embodiment 2. FIG. 12 is an exploded perspective view of a light source device according to Embodiment 2. The light source device comprises light-emitting parts 3, a light guide 4, a light guide holder 5, optical filters 6, support parts 7, and a reflector 11, which are housed in a housing 8. As illustrated in FIG. 10, the light-emitting parts 3 comprise a light-emitting element 1 and a substrate 2.

The light-emitting elements 1 are light sources such as LEDs that produce light at visible or non-visible wavelengths, or both. The light-emitting elements 1 are mounted on one face of the substrates 2. Light from the light-emitting elements 1 is transmitted through the optical filters 6 and input into the end faces 4a of the light guide 4. The light guide 4 is a columnar shape whose central axis direction is the lengthwise direction. The light guide 4 guides light input from the end faces 4a in the lengthwise direction, and outputs light from a side face of the columnar shape. The light guide 4 is preferably made of a transparent resin.

As illustrated in FIG. 10, holes are formed in both lengthwise ends of the light guide holder 5. These holes cover the circumference of the end faces 4a of the light guide 4. The light guide holder 5 covers the ends of the light guide 4, including the end faces 4a, except for at least one part of the end faces 4a of the light guide 4 (a portion necessary to input light from the light-emitting elements 1) and the side face of the portion that outputs light. The portion of the light guide holder 5 that faces opposite the light guide 4 preferably has a color with good reflectivity, such as white, but is not limited thereto. The light guide holder 5 locks the light guide 4 with light guide locking parts 5a. Note that Embodiment 2 anticipates the case of using resin with the same or approximately the same expansion ratio for the light guide 4 and the light guide holder 5.

In the support parts 7, there is formed a through-hole that penetrates from a first opening formed in one face to a second opening formed in the other face. The support parts 7 hold the ends of the light guide holder 5 on the side of the first opening so as to allow sliding in the lengthwise direction. The portion of the ends of the light guide holder 5 that cover the ends of the light guide 4 are inserted into the first opening of the support parts 7.

The optical filters 6 are filters that convert the wavelength characteristics of light, and are formed using glass, a PET resin sheet, or the like as a base material. The optical filters 6 filter light from the light-emitting parts 3 (light-emitting elements 1), or alternatively, generate excited light from the light from the light-emitting parts 3 (light-emitting elements 1). Light transmitted through the optical filters 6 may also be complex light that includes excited light and light at unconverted wavelengths. For example, the optical filters 6 obtain excitation light using a phosphor or the like, or remove unwanted wavelengths like a band-pass filter. The optical filters 6 are affixed to the support parts 7 by adhesive bonding or the like. In the case in which the light from the light-emitting elements 1 include secondary optical wavelengths other than the target wavelengths of the light source device, it is necessary to insert the optical filters 6 that block the unwanted wavelength band in the light path.

Heat transfer bodies 9 transfer heat from the substrates 2 to the housing 8. The heat transfer bodies 9 include grease-like materials in addition to sheets, and are formed from a thermally conducting compound or the like, for example. The support parts 7 are placed between the substrates 2 and the heat transfer bodies 9, and fastened to the housing 8 with screws 10. Note that the screws 10 are omitted from illustration in the drawings. Screw holes for the screws 10 are drilled into the support parts 7, the substrates 2, and the heat transfer bodies 9 (in the case of sheets). The screw holes in the substrates 2 and the heat transfer bodies 9 may also be simple, unthreaded through-holes. The heat transfer bodies 9 may also be omitted.

The reflector 11, laid parallel to the light guide 4 in the lengthwise direction, reflects part of the light output from the light guide 4 (secondary light), and radiates the light in the direction of the document receptacle of the image scanning device (not illustrated). An object to be scanned by the image scanning device, such as a document or banknote, is placed on or in the document receptacle. The reflector 11 comprises a vapor-deposited metal face or the like, and is a thin plate or sheet extending in the lengthwise direction of the light guide 4.

Figure 13:
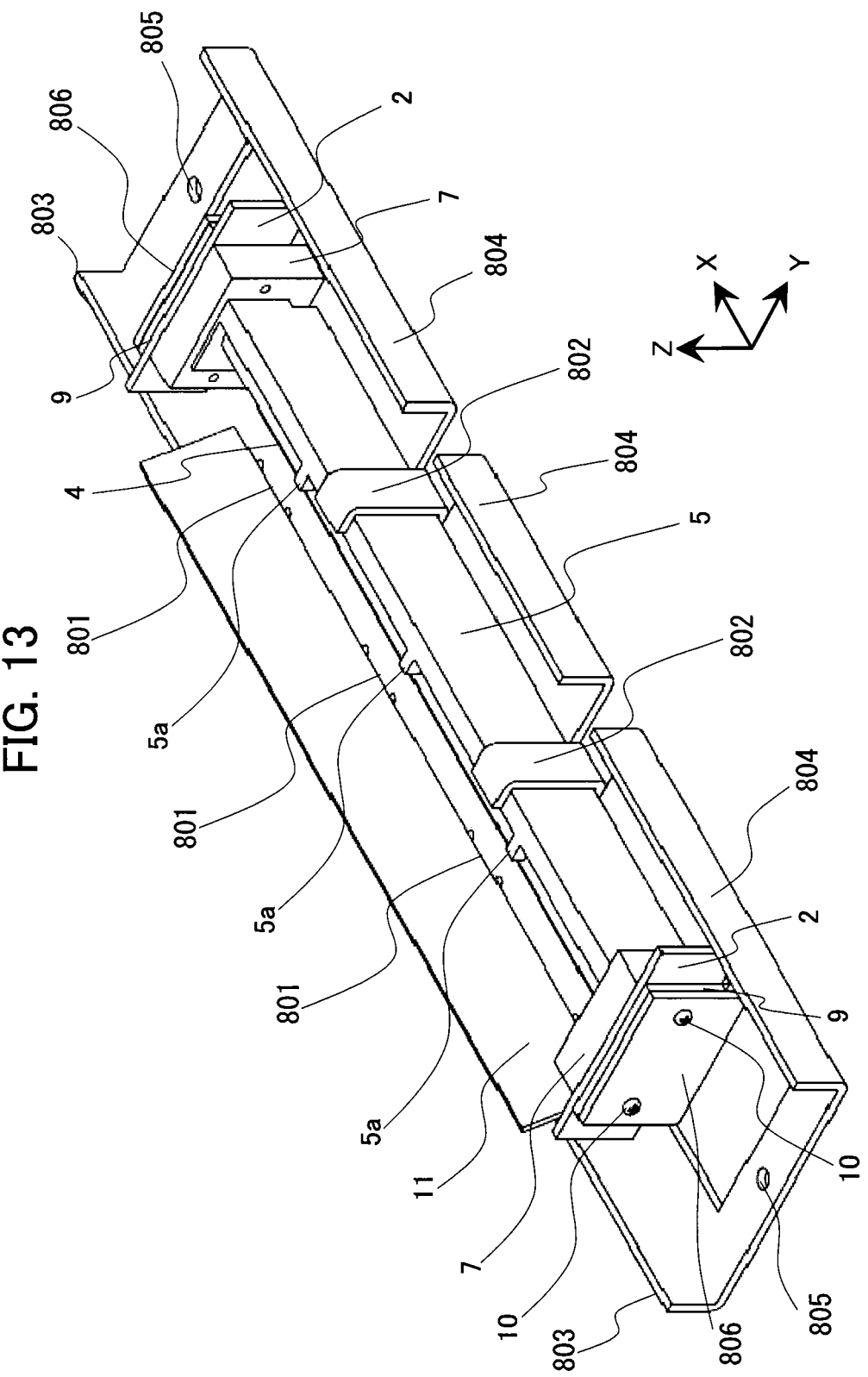
FIG. 13 is a perspective view of a light source device according to Embodiment 2.

FIG. 13 is a perspective view of a light source device according to Embodiment 2. FIG. 13 illustrates a state in which the light-emitting parts 3, the light guide 4, the light guide holder 5, the optical filters 6, the support parts 7, the heat transfer bodies 9, the reflector 11, and the like have been assembled in the housing 8.

Figure 14:
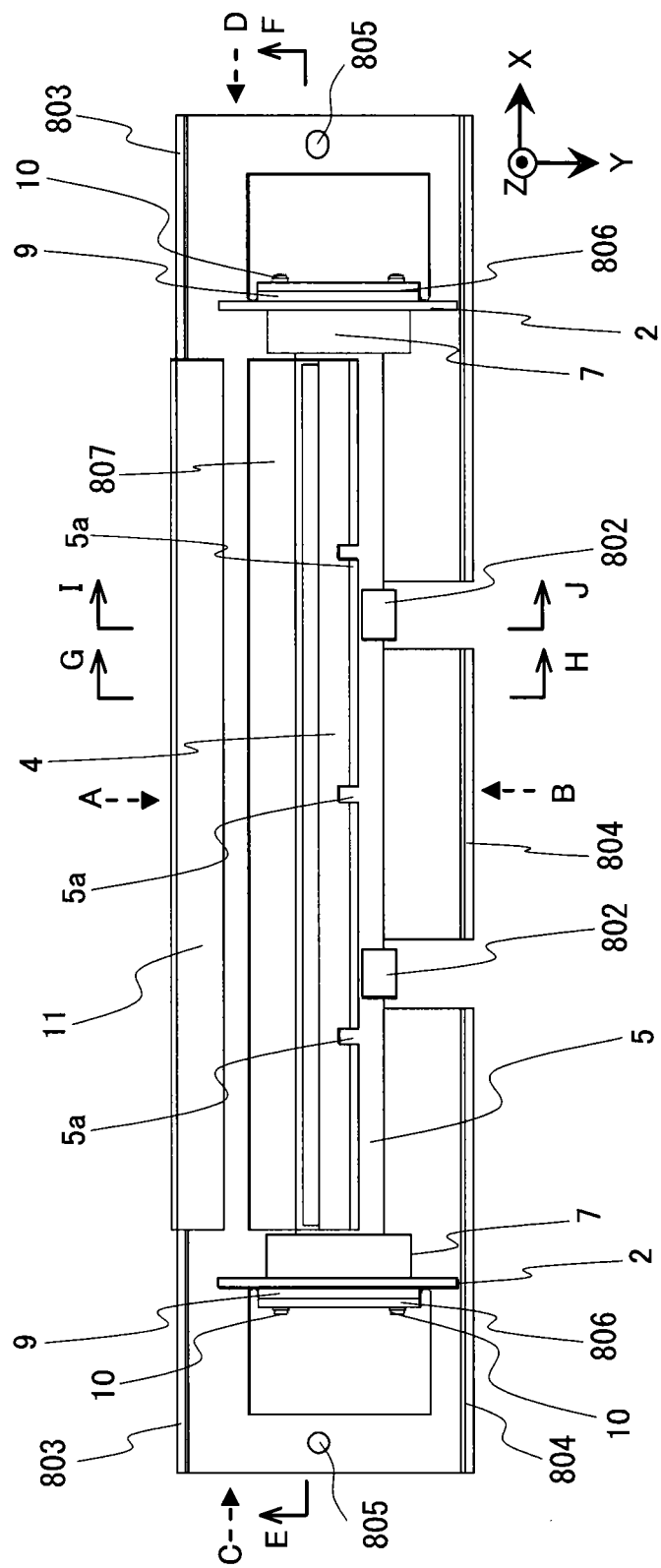
FIG. 14 is a plan view (top view) of a light source device according to Embodiment 2.

FIG. 14 is a plan view of a light source device according to Embodiment 2. FIG. 14 illustrates the projection direction expressed by the subsequent side views, and the position of cross-sections expressed by the cross-section views. FIG. 15A is a side view of a light source device as seen from the direction of the arrow A in FIG. 14. FIG. 15B is a side view of a light source device as seen from the direction of the arrow B in FIG. 14. FIG. 16A is a side view of a light source device as seen from the direction of the arrow C in FIG. 14. FIG. 16B is a side view of a light source device as seen from the direction of the arrow D in FIG. 14.

The housing 8 supports the light guide holder 5 and the support parts 7. The housing 8 is preferably formed from a planar member 8a, and formed by sheet metal processing. The housing 8 indirectly supports the light guide 4 and the optical filters 6. It may also be said that the substrates 2 are indirectly supported by the housing 8 in the case in which the substrates 2 are not contacting the housing 8.

Reflector support parts 801 are portions that support the reflector 11. The reflector support parts 801 comprise multiple intermittent portions along the lengthwise direction. The reflector support parts 801 are sloped with respect to the bottom face of the housing 8, and thus are also designated sloped faces 801. The reflector 11 is kept at a suitable distance and angle with respect to the light guide 4 and the document receptacle by being affixed to the reflector support parts 801 by adhesive bonding or the like.

Light guide holder affixing parts 802 are portions that press in the widthwise direction to support the light guide holder 5. A plurality of light guide holder affixing parts 802 are intermittently formed along the main scanning direction (lengthwise direction). The light guide holder affixing parts 802 may also be singular. With the light guide holder affixing parts 802 and the bottom face of the housing 8 (the floor having a rectangular shape), the housing 8 holds the light guide holder 5 therebetween.

Planar ends on the reflector 11 side and planar ends 804 on the light guide holder 5 side are formed on the housing 8 along the long edge (lengthwise direction). Fastening parts 806 are portions to which the light guide holder 5, the light-emitting parts 3, and the heat transfer bodies 9 are fastened by the screws 10. Screw holes that allow the passage of the screws 10 are formed in the fastening parts 806.

FIG. 11 illustrates a pre-bending planar member 8a of the housing 8 of a light source device according to Embodiment 2. The housing 8 is formed by a sheet metal with good heat dissipation, such as aluminum. The planar member 8a is provided with cut-outs or openings (holes) for forming long holes 8b, an interlocking hole 8c, the reflector support parts 801 (planar ends 803), light guide holder affixing parts 802 (planar ends 804), screw holes 805, the fastening parts 806, and a reflected light passage hole 807. Bending the planar member 8a along the one-dot chain lines and two-dot chain lines illustrated in FIG. 11 yields the housing 8 of a light source device according to Embodiment 2. Specifically, the planar member 8a illustrated in FIG. 11 is bent in valley folds along the two-dot chain lines. Similarly, the planar member 8a illustrated in FIG. 11 is bent in valley folds along the one-dot chain lines, but in the portions corresponding to the reflector support parts 801, the one-dot chain lines on the outermost periphery of the planar member 8a are bent in mountain folds in order to support the reflector 11. Since the expressions "valley folds" and "mountain folds" are relative expressions with respect to the face (front face) of the planar member 8a illustrated in FIG. 11, the folding directions of the valley folds and mountain folds are reversed in the case of viewing the reverse face (back face) of the face (front face) of the planar member 8a illustrated in FIG. 11.

To describe in further detail, by bending the planar member 8a inwards (in the direction coming out of the page of the drawing) along the two-dot chain lines illustrated in FIG. 11, there is formed a box-shaped housing (housing 8) whose cross-section in the sub scanning direction (short-edge direction) is U-shaped. Namely, by bending the planar member 8a, there are formed a floor (bottom face) having a rectangular shape, and long-edge walls (planar ends 803, planar ends 804) bent inwards on the long edge of the floor. Also, there are formed reflector support parts 801 bent inwards at a designated angle from the widthwise direction of the floor on the long edge on one side of the floor, and short-edge walls (fastening parts 806) bent inwards on the short edges of the floor. Note that heatsinks continuous with the short-edge walls, bent in the lengthwise direction, and extending in the lengthwise direction facing in the direction opposite the long-edge walls with respect to the sloped faces 801 (reflector support parts 801) may also be formed (see Embodiment 1).

In the planar member 8a, there are formed a screw holes 805, a reflected light passage hole 807, long holes 8b elongated in the lengthwise direction (X direction) and a round interlocking hole 8c. The screw holes 805 are holes that allow the passage of screws for attaching the housing 8 of the light source device to the image scanning device body (or alternatively, a carriage of the image scanning device). Note that the portion near the screw holes 805 and the screw holes 805 may be eliminated, and the fastening parts 806 may be provided as side faces along the widthwise direction of the lengthwise ends of the housing 8.

The reflected light passage hole 807 is an aperture allowing passage of reflected light from light radiated onto the object to be scanned by the image scanning device (such as a document or banknote). Note that the transport direction of the object to be scanned is the widthwise direction of the light source device (the sub scanning direction of the image scanning device, simply designated the sub scanning direction). The main scanning direction and the sub scanning direction intersect each other, and most typically are orthogonal.

Projections formed on the light guide holder 5 are inserted into the long holes 8b and the interlocking hole 8c. By interlocking the long holes 8b and the interlocking hole 8c with the projections on the light guide holder 5, movement in the direction of the junction plane of the light guide holder 5 with the housing 8 is restricted. Hereinafter, a detailed structure of a light source device will be described.

Figure 17:
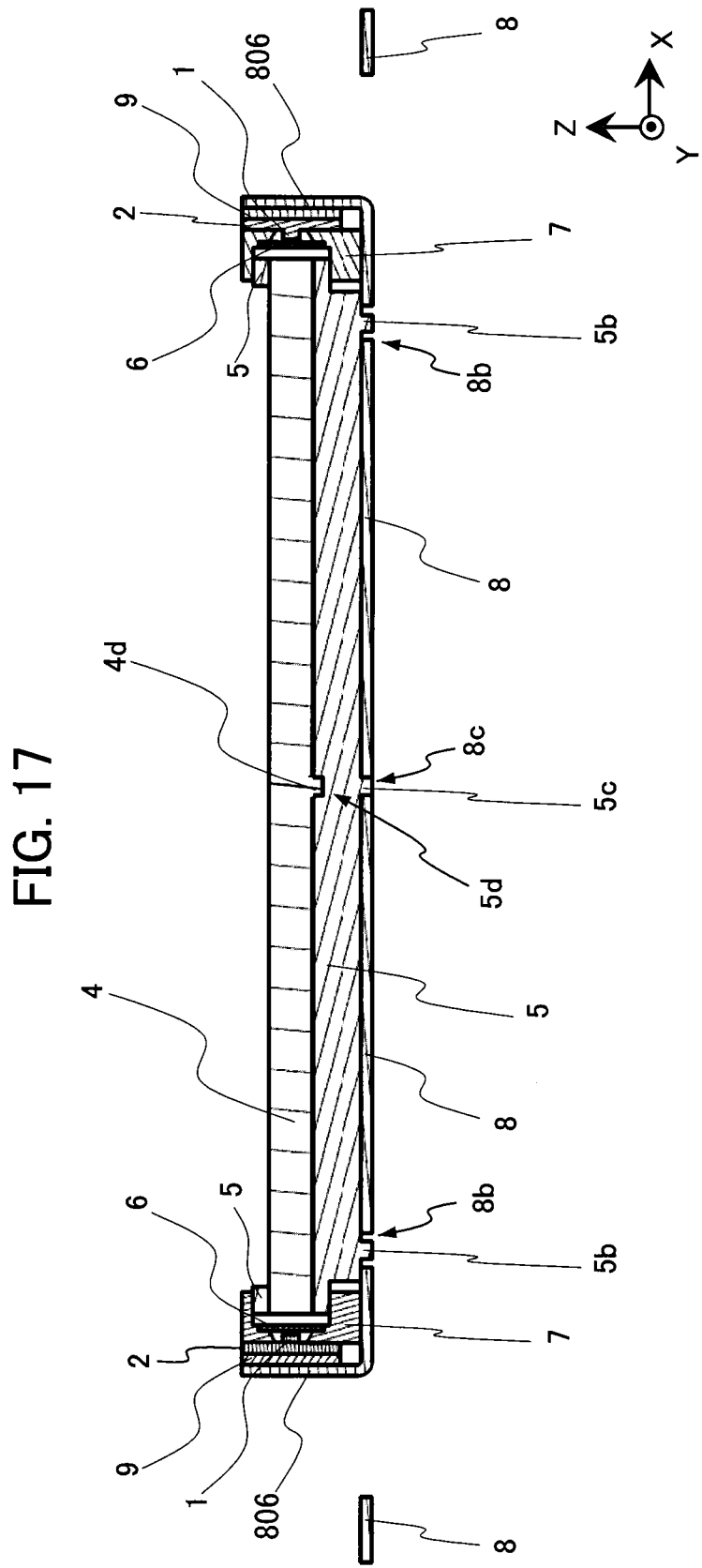
FIG. 17 is a cross-section view of a light source device according to Embodiment 2.

FIG. 17 is a cross-section view of a light source device according to Embodiment 2. FIG. 17 illustrates the cross-section along the line E-F in FIG. 14. On the underside near the center of the light guide 4 (the bottom face side of the housing 8), a projecting part 4d is formed. The light guide holder 5 is equipped with first projecting parts 5b respectively formed at both ends in the lengthwise direction, and a second projecting part 5c formed near the center in the lengthwise direction. In the light guide holder 5, there is formed an interlocking hole 5d at the position of the projecting part 4d when the light guide 4 is engaged. The projecting part 4d of the light guide 4 is inserted into the interlocking hole 5d.

With the light guide 4 of a light source device according to Embodiment 2, the projecting part 4d is inserted into and interlocked with the interlocking hole 5d of the light guide holder 5, and both ends are respectively placed inside the holes at both ends of the light guide holder 5. Movement of the light guide 4 in the lengthwise direction near the center of the light guide 4 is restricted by the light guide holder 5 (interlocking hole 5d) due to the projecting part 4d. However, since both ends of the light guide 4 are inserted into the holes of the light guide holder 5 and slidably supported, stretching of the light guide 4 in the lengthwise direction in accordance with temperature changes is not limited by the light guide holder 5.

In addition, the light guide locking part 5a is a member that does not affix lengthwise expansion and contraction of the light guide 4, but restricts lengthwise bowing and sagging of the light guide 4, and is a member that keeps the light guide 4 from disengaging from the light guide holder 5. Since it is sufficient for the light guide 4 and the light guide holder 5 to have a mutually interlocking mechanism, the relationship between the projecting part 4d and the interlocking hole 5d may be reversed, such that an interlocking hole is formed in the light guide 4, and a projecting part is formed on the light guide holder 5.

As a result of inserting the second projecting part 5c into the interlocking hole 8c of the housing 8, planar movement of the light guide holder 5 in an arbitrary direction is restricted on the junction plane of the light guide holder 5 and the housing 8. In addition, although the first projecting parts 5b are inserted into the long holes 8b and both ends of the light guide holder 5 are restricted from planar movement in the widthwise direction (Y direction) planar movement is possible in the lengthwise direction (X direction) on the junction plane within the range of the long holes 8b. As a result, stretching of the light guide holder 5 in the lengthwise direction due to temperature changes is not limited by the housing 8.

The second projecting part 5c and the interlocking hole 8c constitute an engaging part. In addition, the first projecting parts 5b and the long holes 8b constitute restricting parts. The configuration of the engaging part is not limited to the second projecting part 5c and the interlocking hole 8c, nor is the configuration of the restricting parts limited to the first projecting parts 5b and the long holes 8b, similarly to Embodiment 1. Since it is sufficient for the light guide holder 5 and the housing 8 to have a mutually interlocking mechanism, the relationship between the second projecting part 5c and the interlocking hole 8c may be reversed, such that an interlocking hole is formed in the light guide holder 5, and a second projecting part is formed on the housing 8. This applies in the same way to the relationship between the first projecting parts 5b and the long holes 8b.

As illustrated in FIG. 10, two pins are formed on the reverse face (second opening side) of the face into which the light guide holder 5 is inserted into the support parts 7 (first opening side). Additionally, in correspondence with these pins, pin holes are formed in each of the substrates 2 and the heat transfer bodies 9. The substrates 2 and the heat transfer bodies 9 are aligned, the pins of the support parts 7 are passed into the pin holes, and the substrates 2, the heat transfer bodies 9, and the support parts 7 are affixed to the fastening parts 806 of the housing 8 with the screws 10. By interlocking the two pins and pin holes, the light-emitting elements 1 are positioned facing the end faces 4a at the position of the second opening. Also, the heat transfer bodies 9 are positioned with respect to the substrates 2. Hereinafter, a method of affixing the light guide holder 5 and the support parts 7 to the housing 8 will be described.

First, as illustrated in FIG. 12, the light guide 4 is made to engage with the light guide holder 5, and both ends of the light guide holder are inserted into the first opening of the support parts 7. The optical filters 6 are held between the end faces 4a of the light guide 4 and the light-emitting elements 1, while the substrates 2 and the heat transfer bodies 9 are provisionally joined to the support parts 7. In this state, the second projecting part 5c of the light guide holder 5 is inserted and interlocked with the interlocking hole 8c of the housing 8. At this point, the first projecting parts 5b of the light guide holder 5 are simultaneously inserted into the long holes 8b of the housing 8. The first projecting parts 5b are able to move in the lengthwise direction within the range of the long holes 8b. Consequently, the position of the light guide holder 5 in the lengthwise direction may be kept in a state along the main scanning direction of the light source device.

Subsequently, the screws 10 are used to affix the support parts 7 to the fastening parts 806 of the housing 8. At this point, the substrates 2 and the heat transfer bodies 9 are also fastened to the support parts 7 by the screws 10. The heat transfer bodies 9 are formed with sheet-like silicone sheets or the like that work to transfer heat, and have high adhesiveness and thermal conductivity. As discussed earlier, the heat transfer bodies 9 are placed between the substrates 2 and the fastening parts 806. The housing 8 has a role of allowing heat from the light-emitting parts 3 (light-emitting elements 1, substrates 2) to diffuse. Heat produced from the light-emitting parts 3 passes through the substrates 2 and is transferred to the fastening parts 806 via the heat transfer bodies 9. From the fastening parts 806, heat is diffused throughout the entire housing 8. Heat produced in the substrates 2 is efficiently transferred to the housing 8 (fastening parts 806) via the heat transfer bodies 9, and exhausted by convection, radiation, and conduction to the image scanning device body and the like.

FIGS. 13 to 16 illustrate a light source device after affixing the light guide holder 5 and the support parts 7 to the housing 8. Note that the fastening parts 806 fastening the light-emitting parts 3 (substrates 2) may be referred to as that which fastens, either directly or via the heat transfer bodies 9, to the portion of the housing 8 (planar member 8a) that is bent in the lengthwise direction. In FIGS. 13 to 16, the planar ends 803 and the planar ends 804 are lower than the height of the light guide holder 5, the support parts 7, and the reflector 11 in the thickness direction (Z direction). The dimensions of the housing 8 (planar member 8a) may also be changed so that the planar ends 803 and the planar ends 804 are higher than the light guide holder 5, the support parts 7, and the reflector 11.

As illustrated in FIGS. 13 to 17, the light guide holder 5 covers the light guide 4 throughout the lengthwise direction, except for at least side faces 4b (light output parts 4b) from which the light guide 4 outputs light. As illustrated in FIG. 17, the light guide holder 5 includes two first projecting parts 5b, and is placed onto the housing 8 extending in the lengthwise direction. The housing 8 includes two long holes 8b formed in the lengthwise direction, and the first projecting parts 5b are inserted into the long holes 8b. The light guide holder 5 includes a second projecting part 5c, and the housing 8 includes an interlocking hole 8c formed on the reverse side of the side of the light-emitting parts 3 in the lengthwise direction with respect to the long holes 8b. The second projecting part 5c is inserted into the interlocking hole 8c. Since the second projecting part 5c is formed in the center part of the light guide 4 in the lengthwise direction, the light guide 4 expands and contracts from the center part of the light guide 4 as a point of origin, even in the case in which the light guide 4 and the light guide holder 5 expand or contract according to surrounding temperature changes. Particularly, the second projecting part 5c and the interlocking hole interlocking hole 5d of the light guide holder 5 may be placed so as to be included in the same cross-section in the sub scanning direction (widthwise direction).

In the case of using materials with close expansion ratios for the light guide 4 and the light guide holder 5 as assumed above, by forming the second projecting part 5c in the center part of the light guide 4 in the lengthwise direction, the light guide 4 does not project out from the light guide holder 5. Even in the case in which the expansion ratio of the light guide 4 is greater than the expansion ratio of the light guide holder 5, by forming the second projecting part 5c in the center part of the light guide 4 in the lengthwise direction, it is easy to adjust the size in the lengthwise direction so that the light guide 4 does not project out from the light guide holder 5. In this case, it is necessary to set the thickness of the holes covering the circumference of the end faces 4a of the light guide 4 on the light guide holder 5 formed at both ends in the lengthwise direction so that the light guide 4 does not slip out of the holes (light guide holder 5). Even in the case of the light guide 4 slipping out of the holes (light guide holder 5), there is no problem if the orientation of the light guide 4 may be maintained by the interlocking state between the light guide 4 and the light guide holder 5 or the light guide locking part 5a.

Even in the case of setting the light guide 4 to dimensions such that the light guide 4 (the end faces 4a of the light guide 4) project out from the light guide holder 5 due to expansion of the light guide 308, the second projecting part 5c is formed in the center part of the light guide 4 in the lengthwise direction, and thus the length of the light guide 4 projecting out from the light guide holder 5 becomes the same length at both ends of the light guide holder 5. Accordingly, taking the length of a projecting light guide 4 into account, the positional relationship between the light guide holder 5 and the support parts 7 (the positions of the optical filters 6 inside the support parts 7) may be set so that the light guide 4 and the support parts 7 (optical filters 6) do not contact.

Figure 18:
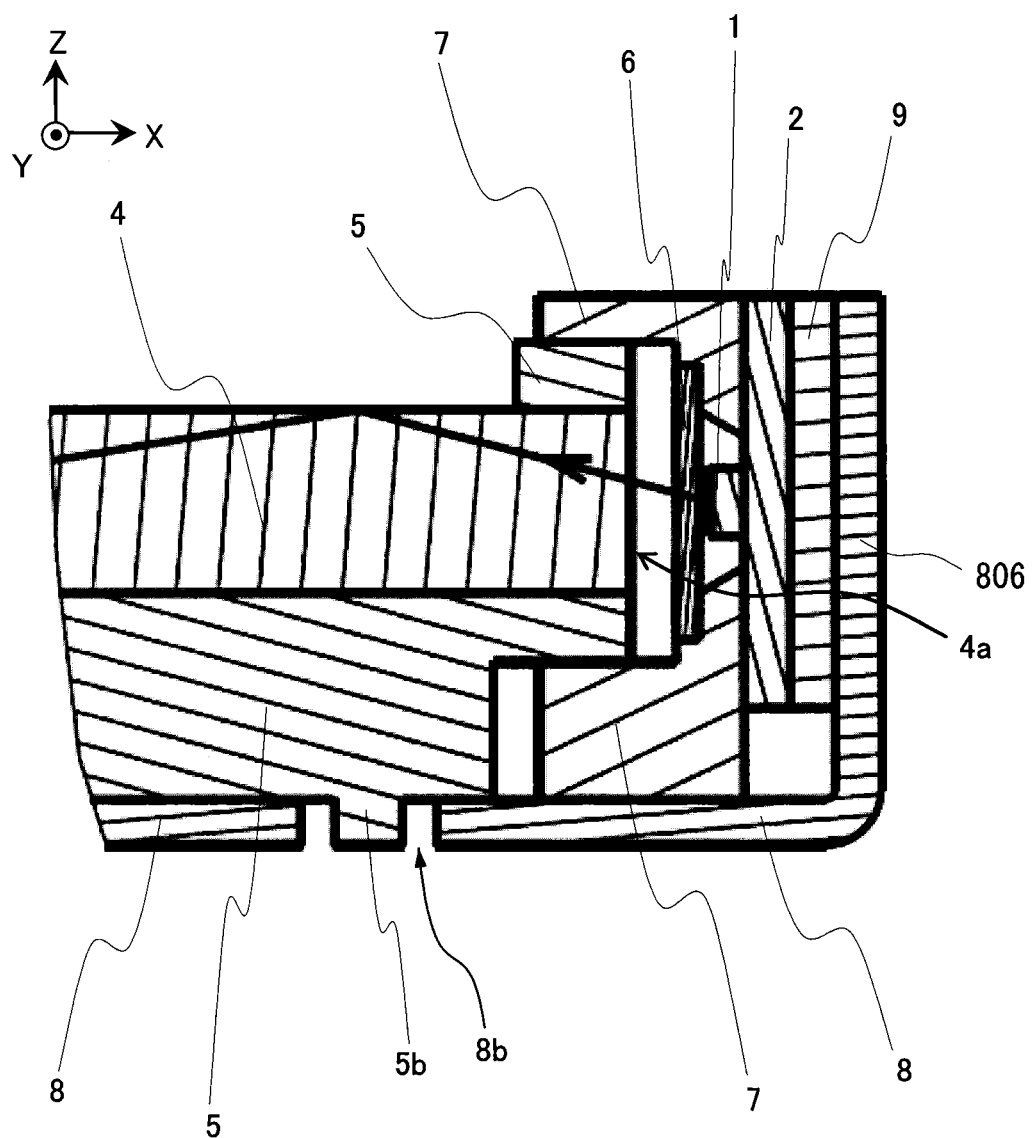
FIG. 18 is a cross-section view near a light-emitting part as seen in the widthwise direction of a light source device according to Embodiment 2.

FIG. 18 is a cross-section view near a light-emitting part as seen in the widthwise direction of a light source device according to Embodiment 2. FIG. 18 illustrates the cross-section along the line E-F in FIG. 14. A light source device according to Embodiment 2 places light-emitting elements 1 (light-emitting parts 3) in the second opening of the support parts 7. A state is then reached in which the optical filters 6 between the first opening and the second opening of the support parts 7 are supported while maintaining a designated spacing with the light-emitting elements 1 (light-emitting parts 3).

Although Embodiment 2 describes an example in which the light-emitting parts 3 and the support parts 7 are formed at both end faces of the light guide 4, a light-emitting part 3 and a support part 7 may also be formed at one end face of the light guide 4. In this case, the second opening may be sealed on the end of the light guide 4 without a light-emitting part 3, and a support part 7 lacking a light-emitting part 3 may be placed. Also, a reflecting member may be formed instead of an optical filter 6 inside a support part 7 (including the end face of the light guide 4) in this state.

Figure 19:
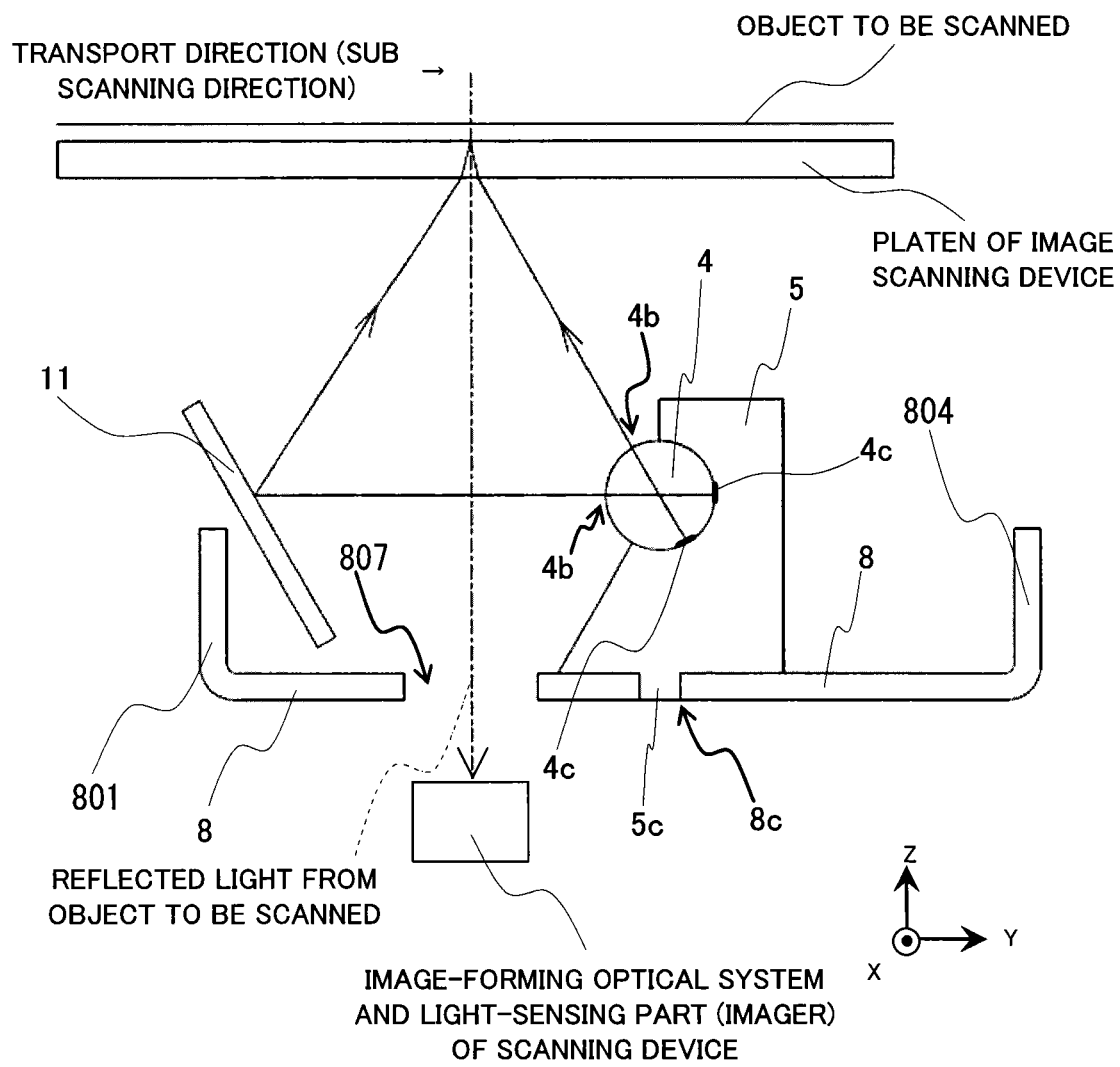
FIG. 19 is a cross-section view as seen in the lengthwise direction of a light source device according to Embodiment 2.

FIG. 19 is a cross-section view as seen in the lengthwise direction of a light source device according to Embodiment 2. FIG. 19 illustrates the cross-section along the line G-H in FIG. 14. At least one line of a light scattering pattern 4c is continuously or intermittently formed in the light guide 4 throughout the main scanning direction. In this specification, the case of two lines of light scattering patterns will be described. Note that the light output parts 4b are portions that face opposite the light scattering patterns 4c in the light guide 4. Accordingly, in the case in which two lines of light scattering patterns 4c are formed, the light output parts 4b are likewise arranged in two lines in the main scanning direction. Depending on the positional relationship between the two lines of light scattering patterns 4c, some or all of the areas of the two lines of light output parts 4b may overlap. The light scattering patterns 4c are formed in a portion that at least corresponds to an effective scanning area in the main scanning direction of the image scanning device. Hereinafter, behavior and action of a light source device according to Embodiment 2 will be described.

The light source device is used for illumination of an image scanning device. FIG. 19 illustrates a scanning device platen (document receptacle) and an object to be scanned by the image scanning device. The light-emitting parts 3 are light source elements (light-emitting elements 1) such as LED light sources that input light from the end faces 4a of the light guide 4, are affixed to the substrates 2 by soldering or the like, and emit light as a result of being current-driven via traces or wiring on the substrates 2. In the present Embodiment 2, the illustration of traces or wiring inside and outside the substrates 2 is omitted from the drawings. As illustrated in FIG. 18, of the light emitted from the light-emitting elements 1 (light-emitting parts 3), light at a specific wavelength is selected (or light at a specific wavelength is blocked) by the optical filters 6, and light is input into the light guide 4 from light input parts 4a (end faces 4a). Alternatively, excitation light produced by the optical filters 6 (which may also be complex light that also includes light with unconverted wavelengths) is input into the light guide 4 from the end faces 4a. Light from the light-emitting elements 1 input via the optical filters 6 is guided in the lengthwise direction while reflecting off the side faces inside the light guide 4. The solid arrow in FIG. 18 illustrates an example of a light path of light emitted from a light-emitting element 1.

The light guide 4 is formed with a transparent resin in a columnar shape whose axis direction is the lengthwise direction, has a cylindrical side-face shape, and includes two lines of light scattering patterns 4c that extend throughout the lengthwise direction. When light guided while reflecting off the interior of the light guide 4 hits the light scattering patterns 4c formed in the light guide 4, the light is output from the light output parts 4b on the side face of the light guide 4 that face opposite the light scattering patterns 4c. Light output from other than the light output parts 4b is reflected off the light guide holder 5 and re-input into the interior of the light guide 4. Note that the light scattering patterns 4c may be printed onto the light guide 4, or be prism patterns that make the surface of the light guide 4 uneven. The shape of the light scattering patterns 4c obviously may be varied in the main scanning direction. As discussed earlier, the side-face shape of the light guide 4 is not limited to a cylinder, and the end face of the light guide 4 is not limited to a circle.

As illustrated in FIG. 19, in a cross-section orthogonal to the central axis of the light guide 4, light (primary light) output from the light output part 4b closer to the platen proceeds diagonally with respect to the sub scanning direction (Y direction), and irradiates the object to be scanned via the platen (transparent plate) of the scanning device. Light (secondary light) output from the other light output part 4b proceeds approximately parallel to, or at a shallow angle with respect to the light output from the first light output part 4b, with respect to the sub scanning direction, is reflected by the reflector 11, and irradiates the object to be scanned via the platen (transparent plate) of the scanning device. The reflector 11, laid parallel to the light guide 4 in the lengthwise direction, reflects secondary light output from the light guide 4, and irradiates in the direction of the object to be scanned. The reflector 11 has a surface comprising a mirror face such as vapor-deposited metal face, and is a thin plate or sheet extending in the lengthwise direction (X direction). The reflector 11 keeps a suitable distance and angle with respect to the light guide 4, the platen (transparent plate) of the scanning device, and the object to be scanned. Although light is differentiated into "primary light" and "secondary light" depending on the light path, this does not denote a superiority or inferiority in various parameters of the light, such as intensity or brightness.

Light output from the light guide 4 and radiated onto the object to be scanned reflects off the object to be scanned, and via the reflected light passage hole 807, is formed into an image through the image-forming optical system of the scanning device, and converted into data by a light sensor. The image-forming optical system may be a reducing optical system, an erecting life-size optical system, an off-axial optical system, a telecentric (bi-telecentric) optical system or the like, but is not limited to any of these. Note that the platen of the scanning device is not required. In the case in which a platen exists, it is necessary to decide on the placement of the light output parts 4b and the light scattering patterns 4c of the light source device while accounting for the refractive index of the platen. Additionally, sub scanning of the object to be scanned may be taken to be transporting the object to be scanned itself (movement in the sub scanning direction), or transporting a carriage (image scanning device) mounted with the light source device (movement in the sub scanning direction).

In the case in which the image-forming optical system implemented in a light source device according to Embodiment 2 is an erecting life-size optical system, instead of the reflected light passage hole 807 extending in the main scanning direction, a rod lens holding part that holds a rod lens (rod lens array) may be placed. In this case, the one-dot chain line illustrated in FIG. 19 becomes the optical axis of the rod lens. Furthermore, a sensor substrate (in the case in which the reflected light passage hole 807 does not hold a rod lens, a substrate with a light-sensing part (sensor) formed thereon at one of the focal points of the rod lens) may be placed on the bottom of the rod lens holding part, and this sensor substrate may be configured to be directly or indirectly held by the housing 8. In this case, the housing 8 also doubles as the housing of the image scanning device.

Figure 20A:
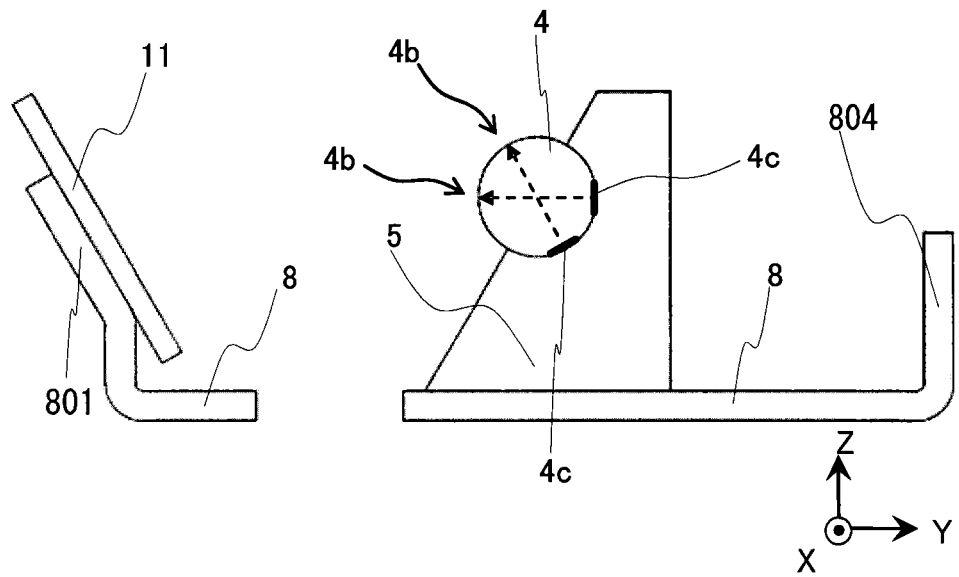
FIG. 20A is a cross-section view along the line G-H in FIG. 14.
Figure 20B:
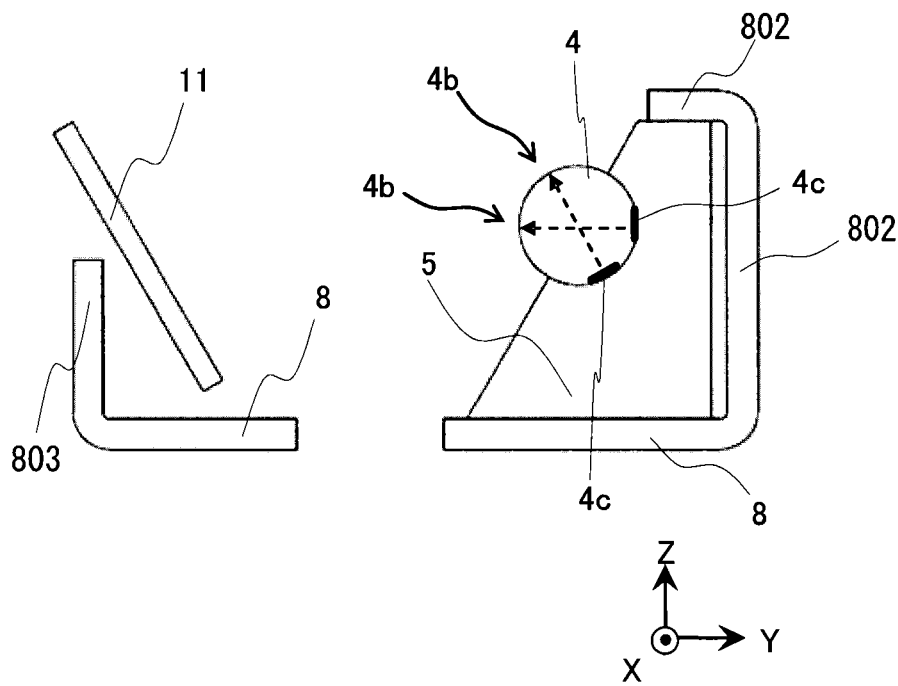
FIG. 20B is a cross-section view along the line I-J in FIG. 14.

FIG. 20A is a cross-section view along the line G-H in FIG. 14. FIG. 20B is a cross-section view along the line I-J in FIG. 14. The reflector support parts 801 are a plurality of members that are placed on the reverse face of the reflector 11 opposite the face that reflects light output from the side faces 4b of the light guide 4, arranged along the main scanning direction with a designated interval spaced therebetween, and support the reflector 11. The reflector support parts 801 are formed by respectively bending one end of the housing 8 along the main scanning direction. The multiple reflector support parts 801 are obtained by bending part of the planar member 8a that constitutes housing 8, and are thus integral with the housing 8, and may be referred to as members that stand off the bottom face of the housing 8 at an angle with respect to the sub scanning direction. The reflector support parts 801 may also be referred to as members that include a portion whose flat face in the main scanning direction is curved in the sub scanning direction.

Since multiple reflector support parts 801 are formed on a light source device (reflector support structure) according to Embodiment 2, by adjusting the placement and sloping angle of each reflector support part 801 individually, it is possible easily obtain installation precision of the reflector 11 in the main scanning direction and the sub scanning direction. In other words, it becomes possible to avoid worsened installation precision of the reflector 11 due to bowing or sagging of a single plate in the main scanning direction and the sub scanning direction that is produced in the case of using a single plate as the support part for the reflector 11. In addition, since the reflector 11 is supported by a plurality of reflector support parts 801 arranged intermittently along the main scanning direction, it is possible to minimize sagging due to the weight of the reflector 11 itself, which may occur in the case of supporting the reflector 11 only at the ends of the reflector 11. The plurality of reflector support parts 801 include a portion curved with respect to the sub scanning direction besides the base end portion having an angle with respect to the housing 8. In other words, the housing 8 is bent in two locations.

As discussed earlier, of the ends along the long edge of the planar member 8a on the reflector 11 side, the portions other than the plurality of reflector support parts 801 form a plurality of planar ends 803 that are respectively continuous with the bottom face. Because of the bent planar ends 803, the strength of the housing 8 is raised, and bowing or sagging is less likely. In addition, by making the length of the planar ends 803 in the main scanning direction (X direction) longer than the length of the reflector support parts 801 in the main scanning direction, it is possible to increase the surface area allowing that formation of screw holes (screw holes having the same function as the screw holes 805) for connecting with (the carriage of) the image scanning device. Moreover, the strength of the planar ends 803 as connection members rises. In addition, the strength of the reflector support structure also rises. The planar ends 803 may also be referred to as members that include a portion whose flat face in the main scanning direction is curved in the sub scanning direction.

As discussed earlier, the light guide holder affixing parts 802 that affix the light guide holder 5 comprise a plurality of members arranged at designated intervals along the lengthwise direction. The light guide holder affixing parts 802 may also be singular. The light guide holder affixing parts 802 are formed by respectively bending the ends along the long edge of the planar member 8a on the light guide holder 5 side in two locations. The plurality of light guide holder affixing parts 802 are obtained by bending the planar member 8a, and are thus integral with the housing 8, similarly to the reflector support parts 801, and may be referred to as members that stand off the bottom face of the housing 8 at an angle with respect to the widthwise direction. The light guide holder affixing parts 802 may also be referred to as members that include a portion whose flat face in the main scanning direction is curved in the sub scanning direction.

As illustrated in FIG. 13, of the ends along the long edge of the planar member 8a on the light guide holder 5 side, the portions other than the plurality of light guide holder affixing parts 802 form a plurality of planar ends 804 that are respectively continuous with the bottom face. Because of the bent planar ends 804, the strength of the housing 8 is raised, and bowing or sagging is less likely. In addition, by making the length of the planar ends 804 in the main scanning direction (X direction) longer than the length of the light guide holder affixing parts 802 in the lengthwise direction, similarly to the planar ends 803, it is possible to increase the surface area allowing that formation of screw holes (screw holes having the same function as the screw holes 805) for connecting with (the carriage of) the image scanning device. Moreover, the strength of the planar ends 804 as connection members rises. In addition, the strength of the reflector support structure also rises. The planar ends 804 may also be referred to as members that include a portion whose flat face in the main scanning direction is curved in the sub scanning direction.

Hereinafter, a detailed configuration of the light guide holder 5 and the support parts 7 of a light source device according to Embodiment 2 will be described with reference to FIGS. 21A to 22C. Specifically, small end deviation of the light guide 4 and the like, irrespective of the temperature characteristics of the light guide 4 constituting a light source device according to Embodiment 2, will be described. Note that the light guide 4, the light guide holder 5, and the support parts 7 are placed while accounting for expansion and contraction in the thickness direction of the light guide 4 and the light guide holder 5 of a light source device according to Embodiment 2. For example, the dimensions of the light guide holder 5 and the support parts 7 are set so that, at the maximum anticipated expansion, the light guide holder 5 does not damage the support parts 7. However, the influence is extremely small compared to expansion and contraction in the lengthwise direction of the light guide 4 and the light guide holder 5.

Figure 21A:
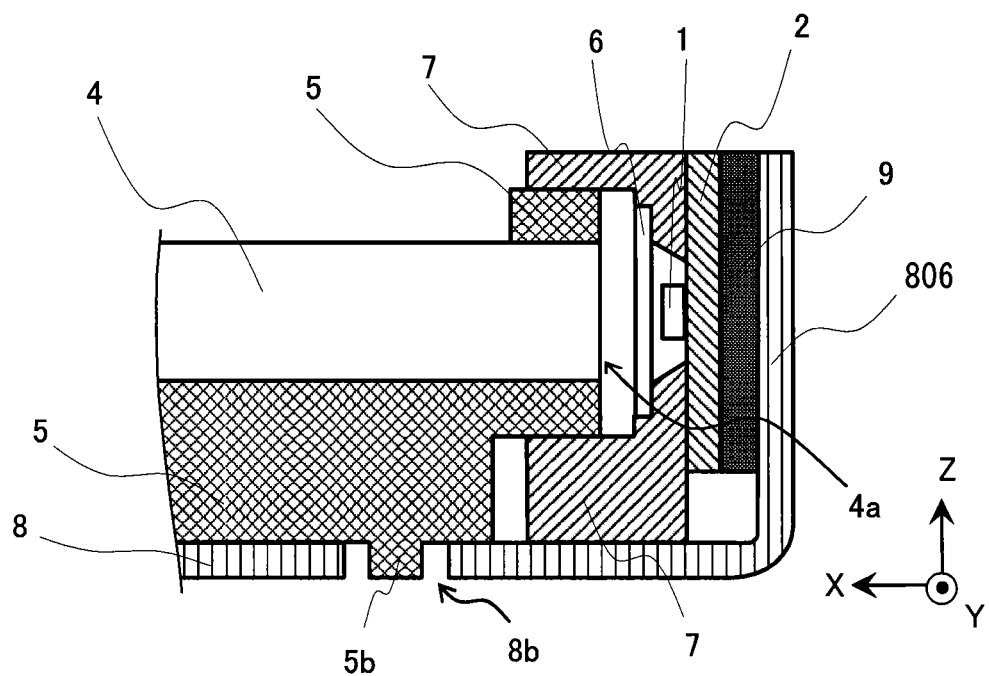
FIG. 21A is a cross-section view near a light-emitting part that corresponds to the cross-section along the line E-F in FIG. 14 of a light source device according to Embodiment 2.
Figure 21B:
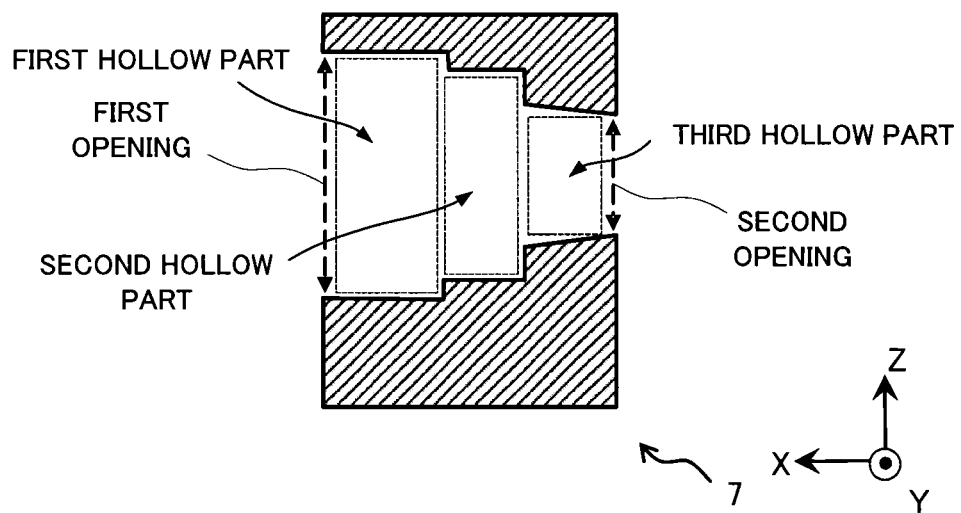
FIG. 21B is a cross-section view of a support part according to Embodiment 2.

FIG. 21A is a cross-section view near a light-emitting part that corresponds to the cross-section along the line E-F in FIG. 14 of a light source device according to Embodiment 2. FIG. 21B is a cross-section view of a support part according to Embodiment 2. The support parts 7 include a communicating first opening (the portion indicated by the dotted arrow in FIG. 21B) and a second opening (the portion indicated by the dotted arrow in FIG. 21B). The support parts 7 hold the ends of the light guide holder 5 on the side of the first opening so as to allow sliding in the lengthwise direction. The light-emitting parts 3 (light-emitting elements 1 and substrates 2)

are placed in the second opening of the support parts 7. The support parts 7 support the optical filters 6 between the first opening and the second opening while maintaining a designated spacing with the light-emitting parts 3. The optical filters 6 are supported by the support parts 7 outside of the range over which the end faces of the light guide move due to sliding of the ends of the light guide holder 5. Note that in FIG. 21, although the light-emitting parts 3, particularly the light-emitting elements 1, are placed in the second opening of the support parts 7, the configuration is required to be limited to this placement. It is sufficient to place the light-emitting parts 3 so that light emitted from the light-emitting elements 1 (light-emitting parts 3) is input into the light guide 4 via the second opening and the first opening of the support parts 7.

As illustrated in FIG. 21B, the support parts 7 have internally formed therein a first hollow part, a second hollow part, and a third hollow part whose diameters successively decrease proceeding from the side of the first opening to the side of the second opening, and support the optical filters 6 inside the second hollow part. Specifically, the optical filters 6 are placed in the step portion produced between the second hollow part and the third hollow part. Note that the depth of the second hollow part is taken to be equal to or greater than the thickness of the optical filters 6.

The light guide holder 5 is formed with a white resin or highly reflective metal or the like, includes a groove configured as a long groove in the lengthwise direction, and holds the light guide 4 in the lengthwise direction as a result of the light guide 4 being placed into this groove. The open side of this groove forms output areas (light output parts 4b) that output light from the light guide 4. The light guide holder 5 holds the light guide 4 at a suitable position with respect to the reflector 11 and the housing 8. The light guide holder 5 reflects light output from a side face other than the light output parts 4b of the light guide 4 or from the back face of the light scattering patterns 4c back inside the light guide 4, and minimizes the output of unintentional light from other than the light output parts 4b.

Figure 22A:
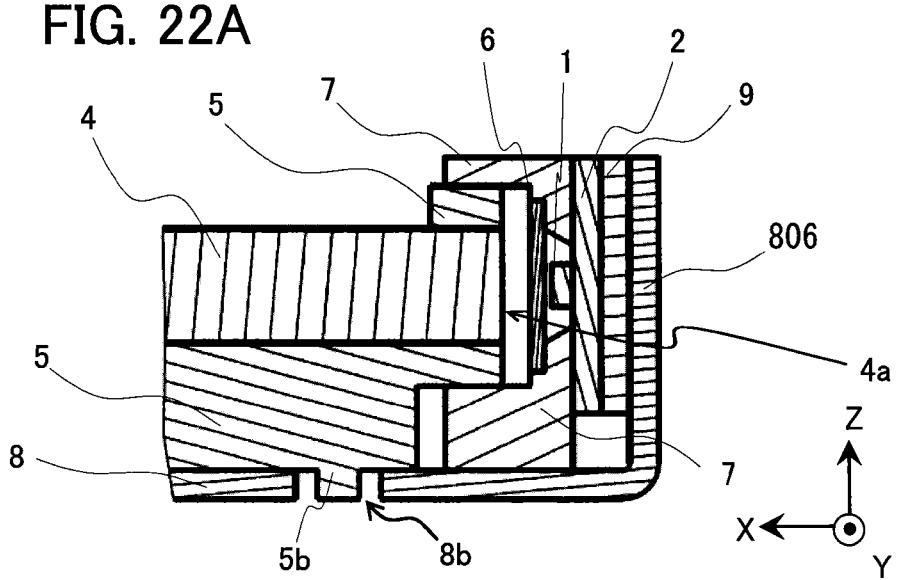
FIG. 22A is a cross-section view near a light-emitting part of a light source device according to Embodiment 2.
Figure 22B:
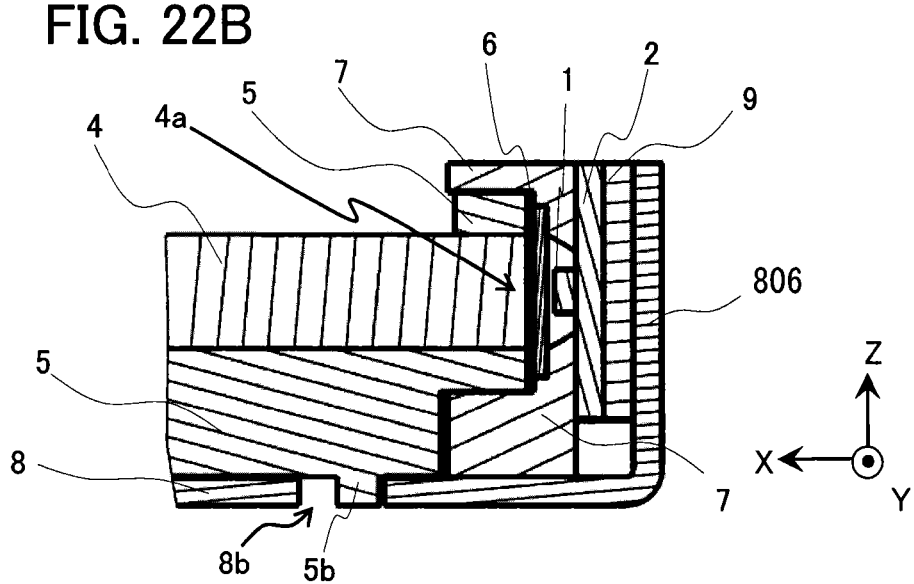
FIG. 22B is a cross-section view near a light-emitting part that illustrates the case of a thermally expanded light guide and light guide holder in a light source device according to Embodiment 2.
Figure 22C:
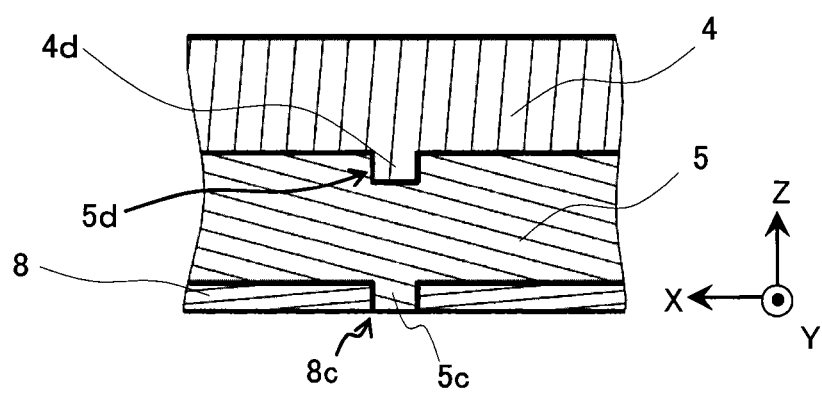
FIG. 22C is a central cross-section view of a light source device according to Embodiment 2.

FIG. 22A is a cross-section view near a light-emitting part of a light source device according to Embodiment 2. FIG. 22B is a cross-section view near a light-emitting part that illustrates the case of a thermally expanded light guide and light guide holder in a light source device according to Embodiment 2. FIG. 22C is a central cross-section view of a light source device according to Embodiment 2. FIG. 22A illustrates the case of the smallest length of the light guide 4 in the lengthwise direction. FIG. 22B illustrates the case of the largest length of the light guide 4 in the lengthwise direction. FIG. 22C illustrates the second projecting part 5c and the interlocking hole 5d of the light guide holder 5 placed at the same position in the lengthwise direction.

At the least, the inner wall shape of the first hollow part allows the portion of the light guide holder 5 inserted into the support parts 7 to contact the support parts 7 and the light guide holder 5 to slide. Alternatively, it is necessary to allow the light guide holder 5 to stretch without having the portion of the light guide holder 5 inserted into the support parts 7 to contact the support parts 7.

As illustrated in FIG. 22B, in the case of maximum expansion of the light guide 4 (light guide holder 5), the light guide holder 5 and the support parts 7 are disposed such that the end faces 4a of the light guide 4 and the end faces of the light guide holder 5 are contacting or about to contact at the step portion produced between the first hollow part and the second hollow part. As a result, the end faces 4a (light input parts 4a) of the light guide 4 and the light-emitting parts 3 (optical filters 6) may be made to not contact. This relationship is the same for the first projecting parts 5b and the long holes 8b. Also, as illustrated in FIGS. 22A and 22B, the light guide holder 5 may include pushing face parts that face opposite the edges of the first opening, and these pushing face parts may be provided so as to restrict the sliding range (movement range) of the light guide holder 5 (FIG. 22B). Note that the pushing face parts may also be made to be about to contact the edges of the first opening when the expansion of the light guide 4 is at maximum. In this case, the pushing face parts become opposing face parts rather than pushing face parts.

The support parts 7 hold the substrates 2, the light guide holder 5, and the optical filters 6, and minimize the emission of unintentional light from the light-emitting parts 3. In a light source device according to Embodiment 2, an end that includes the end face on one side of the light guide holder 5 is inserted into the first opening at the end face on one side of the support parts 7. In addition, the substrates 2 affixed with the light-emitting parts 3 are placed in the second opening at the end face on the other side of the support parts 7 so that the light-emitting elements 1 and the light guide 4 face opposite. The support parts 7 include a face that holds the optical filters 6 and a face that affixes the substrates 2, and keeps the distance between the optical filters 6 and the substrates 2 constant. As discussed earlier, the distance between the end faces of the ends of the light guide holder 5 inserted into the first opening and the optical filters 6 vary due to expansion or contraction of the light guide 4 (light guide holder 5), but the configuration is unaffected by stretching (expansion or contraction) of the light guide 4 (light guide holder 5). Consequently, the light-modulating characteristics of the optical filters 6 stabilize.

In a light source device according to Embodiment 2, the degree of interlocking (degree of insertion) between the light guide 4 and the support parts 7 as well as the relative positions of the light guide holder 5 and the support parts 7 vary. By providing the long holes 8b of the housing 8 with a margin corresponding to the amount of the temperature-dependent stretching of the light guide holder 5 with respect to the lengthwise direction, the light guide holder 5 is able to stretch in the lengthwise direction. Accordingly, the light guide 4 and the light guide holder 5 are not varied in the height direction and the widthwise direction. As a result, change in the illumination characteristics is minimized. Also, since the support parts 7 are affixed to the fastening parts 806 on the housing 8 in the lengthwise direction by the screws 10, the heat dissipation effects also do not change. Furthermore, even if the temperature does change, the distances of the housing 8 (fastening parts 806), the heat transfer bodies 9, the substrates 2, the light-emitting elements 1, the support parts 7, and the optical filters 6 are fixed, and the distance between the light guide 4 and the light guide holder 5 is fixed (in the case of close expansion ratios).

In other words, in a light source device according to Embodiment 2, the portion of light blocked by the light guide holder 5 is fixed, and the effect of suppressing unwanted stray light produced at the ends of the light guide 4 is kept constant. Meanwhile, by also keeping the relative distances of the light-emitting parts 3 and the optical filters 6 constant, the function of converting light from the light-emitting parts 3 is kept constant. As a result of this structure, change does not occur in the illumination characteristics and heat dissipation characteristics due to stretching of the light guide 4 due to temperature changes.

Also, in a light source device according to Embodiment 2, although omitted from illustration in the drawings, the support parts 7 may be configured such that the ends of the light guide holder 5 and the support parts 7 do not contact, and the ends of the light guide holder 5 stretch in the lengthwise direction inside the first opening or above the first opening. Likewise in this case, the support parts 7 support the optical filters 6 outside the range over which the end faces 4a of the light guide 4 move due to stretching of the ends of the light guide holder 5. Stated differently, in a light source device according to Embodiment 2, it may be said that the support parts 7 slidably hold the ends of the light guide holder 5 inside the first hollow part, or alternatively, the ends of the light guide holder 5 stretch in the lengthwise direction inside the first hollow part. The light source device later illustrated in Modification 2.6 is also similar.

The shape of the end faces 4a of the light guide 4 and the cross-sectional shape in the lengthwise direction of the light guide 4 in a light source device according to Embodiment 2 are not limited to a circular cross-section as illustrated in FIGS. 10 to 22, and the cross-section may also be polygonal, gourd-shaped, or cocoon-shaped, and may also be an irregular shape, or alternatively, a combination of these. Likewise, the shape of the portion of the light guide holder 5 inserted into the support parts 7 and inner shape of the portion of the support parts 7 into which the light guide holder 5 is inserted are not limited to a circular cross-section, and the cross-section may also be polygonal, gourd-shape, or cocoon-shaped, and may also be an irregular shape, or alternatively, a combination of these. It is sufficient for the relationship between the light guide holder 5 and the support parts 7 to be such that either the portion of the light guide holder 5 that is inserted into the support parts 7 contacts the support parts 7 and allows the light guide holder 5 to slide, or the portion of the light guide holder 5 that is inserted into the support parts 7 does not contact the support parts 7 and allows the light guide holder 5 to stretch. Even in the case in which the portion of the light guide holder 5 that is inserted into the support parts 7 does not contact the support parts 7, it is necessary to make the majority of light emitted from the light-emitting parts 3 not bleed from the gap between the support parts 7 and the light guide holder 5.

The light guide holder 5 does not only hold the light guide 4, but also works to minimize unintentional light from the light-emitting parts 3 as well as the light guide 4. The light guide holder 5 takes a suitable position with the housing (housing 8) at the following three points on the housing 8. Namely, the three points are the two first projecting parts 5b and the two long holes 8b, and the second projecting part 5c and the interlocking hole 8c. The light guide holder 5 is shorter than the entire length of the housing 8. The end faces of the light guide holder 5 face opposite the end faces of the support parts 7, and the gap length therebetween is wider than the amount of expansion due to the temperature characteristics of the light guide holder 5. As discussed earlier, since the ends of the light guide 4 are held so as to allow sliding in the lengthwise direction, the light guide 4 is held without bowing or displacement in the widthwise direction, even in the case in which the light guide holder 5 stretches due to temperature changes. The light guide holder 5 holds the entire circumference of the ends of the light guide 4, and has an opening that exposes the light output parts 4b at the midsection. The portions of the light guide holder 5 that hold the entire circumference of the light guide 4 at the ends are inserted into the support parts 7.

Hereinafter, modifications of the housing of a light source device according to Embodiment 2 will be described.

Modification 2.1

Figure 24A:
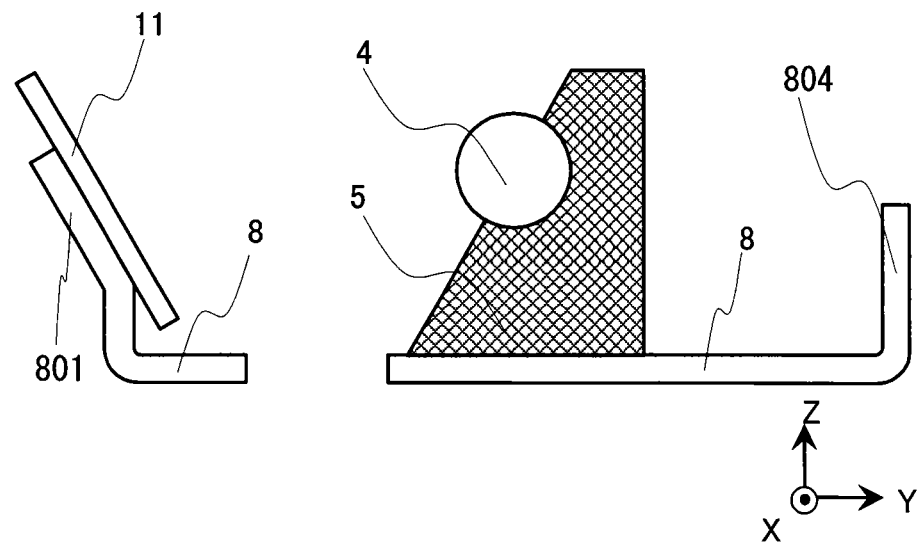
FIG. 24A is a diagram that corresponds to the cross-section along the line G-H in FIG. 14 of a light source device according to Modification 2.1.
Figure 24B:
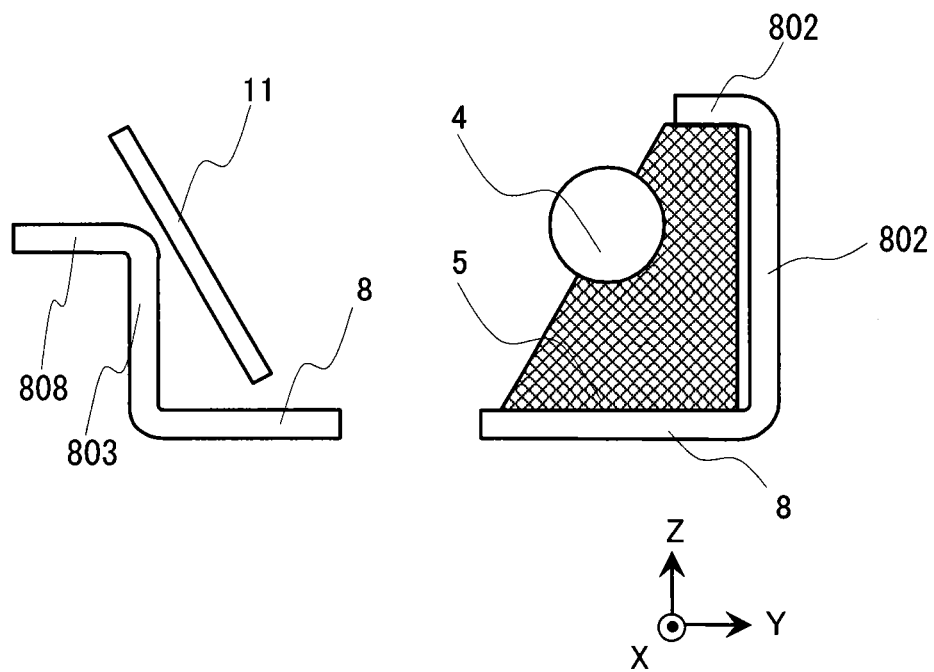
FIG. 24B is a diagram that corresponds to the cross-section along the line I-J in FIG. 14 of a light source device according to Modification 2.1.

FIG. 23 is a development view of a planar member that forms the housing of a light source device according to Modification 2.1 of Embodiment 2. FIG. 24A is a diagram that corresponds to the cross-section along the line G-H in FIG. 14 of a light source device according to Modification 2.1. FIG. 24B is a diagram that corresponds to the cross-section along the line I-J in FIG. 14 of a light source device according to Modification 2.1.

In the housing 8 of a light source device according to Modification 2.1, the tips in the widthwise direction of the plurality of planar ends 803 are connected in the lengthwise direction by an integral end 808, forming an integral body. The rest of the structure is similar to the housing 8 of Embodiment 2 illustrated in FIGS. 20A and 20B. FIG. 24A illustrates an end face corresponding to the cross-section along the line G-H in FIG. 14, and thus the integral end 808 is not represented. Consequently, FIG. 24A is unchanged from FIG. 20A.

In Modification 2.1, the strength of the plurality of planar ends 803 rises because of the integral end 808. In addition, screw holes (screw holes having the same function as the screw holes 805) for connecting with (the carriage of) the image scanning device may be formed on the integral end 808.

Modification 2.2

Figure 25A:
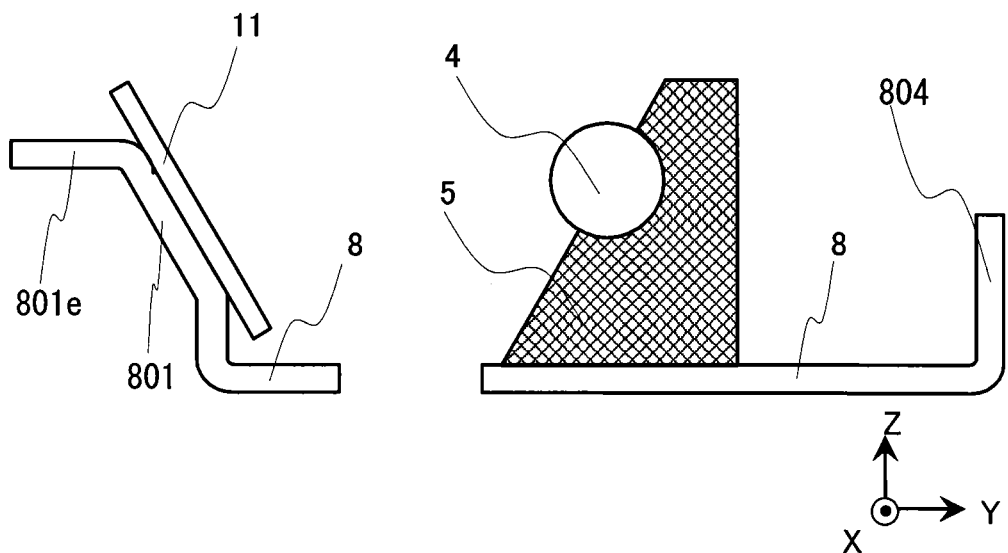
FIG. 25A is a diagram that corresponds to the cross-section along the line G-H in FIG. 14 of a light source device according to Modification 2.2.
Figure 25B:
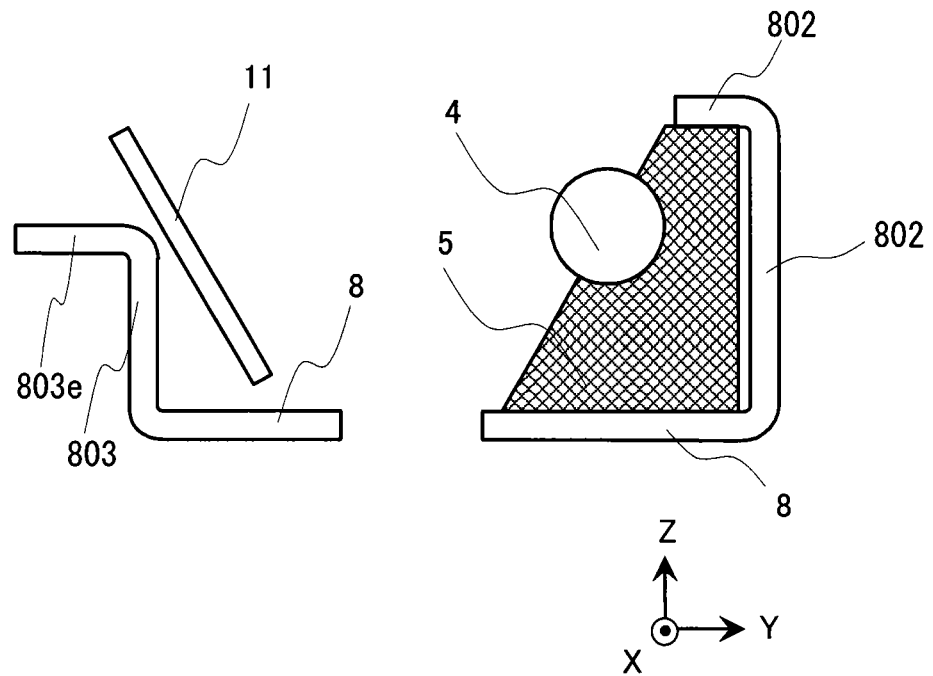
FIG. 25B is a diagram that corresponds to the cross-section along the line I-J in FIG. 14 of a light source device according to Modification 2.2.

FIG. 25A is a diagram that corresponds to the cross-section along the line G-H in FIG. 14 of a light source device according to Modification 2.2. FIG. 25B is a diagram that corresponds to the cross-section along the line I-J in FIG. 14 of a light source device according to Modification 2.2. In the housing 8 of a light source device according to Modification 2.2, the tip portion of the reflector support parts 801 is extended, forming extended reflector support parts 801e having an angle with respect to the face to which the reflector 11 is affixed.

In Modification 2.2, the reflector 11 affixing face of the reflector support parts 801 and the extended reflector support parts 801e are curved, and thus the strength of the reflector support parts 801 rises. In addition, it is possible to give to the extended reflector support parts 801e the excess portion produced in the planar member 8a from the difference in dimensions between the housing 8 and the reflector 11. As illustrated in FIG. 25B, the housing 8 of Modification 2.2 includes extended planar ends 803e in which the tip portion of the planar ends 803 is extended. Since there is a curve between the planar ends 803 and the extended planar ends 803e, the strength of the planar ends 803 rises. Note that screw holes (screw holes having the same function as the screw holes 805) for connecting with (the carriage of) the image scanning device may be formed on the extended reflector support parts 801e or the extended planar ends 803e.

Modification 2.3

Figure 26A:
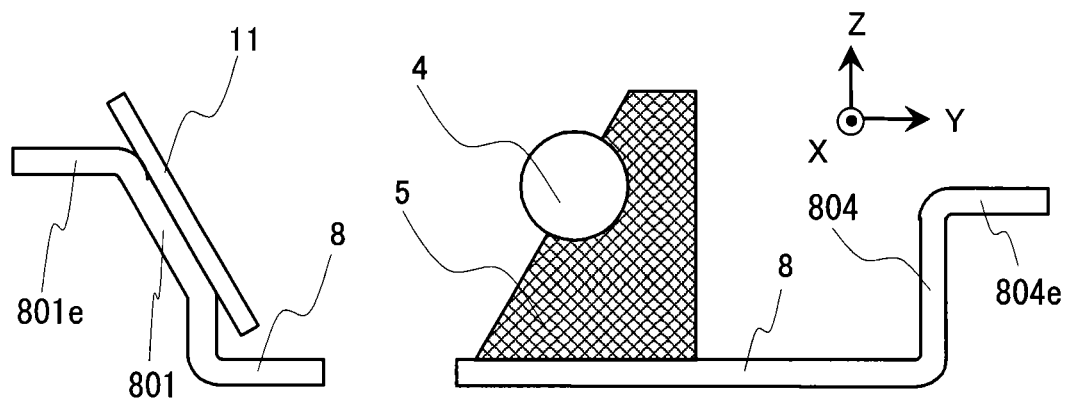
FIG. 26A is a diagram that corresponds to the cross-section along the line G-H in FIG. 14 of a light source device according to Modification 2.3.
Figure 26B:
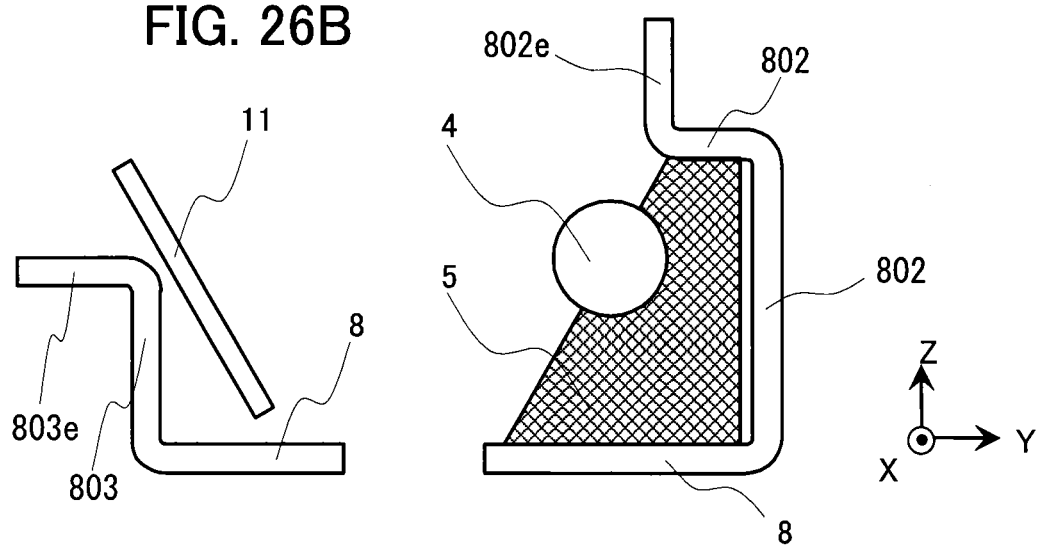
FIG. 26B is a diagram that corresponds to the cross-section along the line I-J in FIG. 14 of a light source device according to Modification 2.3.

FIG. 26A is a diagram that corresponds to the cross-section along the line G-H in FIG. 14 of a light source device according to Modification 2.3. FIG. 26B is a diagram that corresponds to the cross-section along the line I-J in FIG. 14 of a light source device according to Modification 2.3. In the housing 8 of a light source device according to Modification 2.3, extended planar ends 804e extending at an angle from the tip portion in the widthwise direction of the planar ends 804 are formed, in addition to the configuration of Modification 2.2. Also, extended light guide holder affixing parts 802e extending at an angle from the tips in the widthwise direction of the light guide holder affixing parts 802 are formed.

In Modification 2.3, since there is a curve between the planar ends 804 and the extended planar ends 804e, the strength of the planar ends 804 rises. Also, since the extended light guide holder affixing parts 802e are curved away from the light guide holder 5 starting at the tips of the light guide holder affixing parts 802, the strength of the light guide holder affixing parts 802 rises.

Figure 26C:
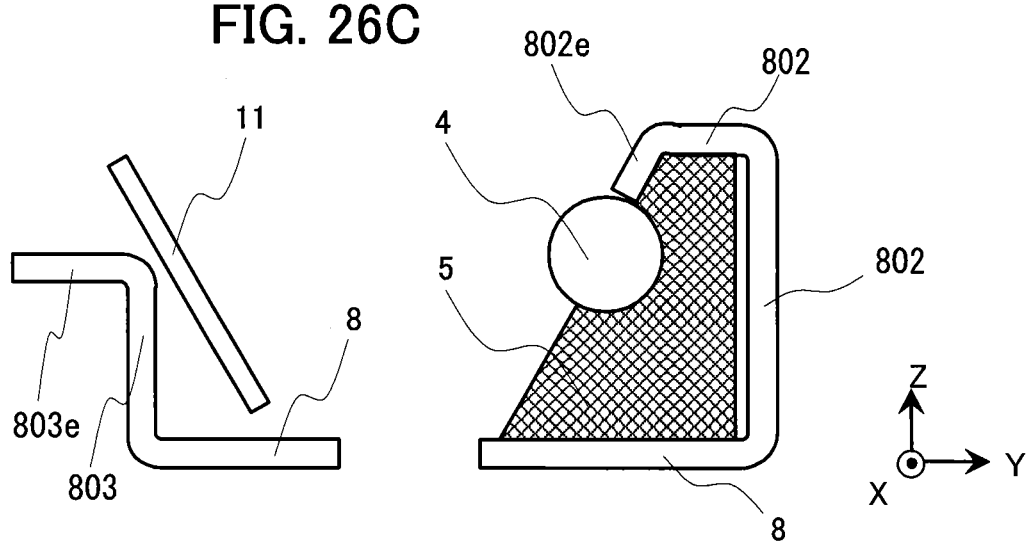
FIG. 26C is a diagram that corresponds to the cross-section along the line I-J in FIG. 14, illustrating a difference example of a light source device according to Modification 2.3.

FIG. 26C is a diagram that corresponds to the cross-section along the line I-J in FIG. 14, illustrating a difference example of a light source device according to Modification 2.3. In the example in FIG. 26C, the extended light guide holder affixing parts 802*e* are curved towards the light guide holder 5 starting at the tips of the light guide holder affixing parts 802. Since the extended light guide holder affixing parts 802*e* are curved towards the light guide holder 5 starting at the tips of the light guide holder affixing parts 802, not only does the strength of the light guide holder affixing parts 802 rise, but the affixing of the light guide holder 5 also becomes more secure.

The difference between FIG. 26B and FIG. 26C is the difference in the curve direction of the extended light guide holder affixing parts 802*e* with respect to the light guide holder affixing parts 802. The extended light guide holder affixing parts 802*e* of Modification 2.3 may be given the excess portion produced in the planar member 8*a* from the difference in dimensions between the housing 8 and the light guide holder 5. Note that screw holes (screw holes having the same function as the screw holes 805) for connecting with (the carriage of) the image scanning device may be formed on the extended planar ends 804*e*, similarly to the extended reflector support parts 801*e* and the extended planar ends 803*e*. Also, the cross-section of the portion of the reflector support parts 801 becomes FIG. 26A for both FIG. 26B and FIG. 26C.

Modification 2.4

Figure 27A:
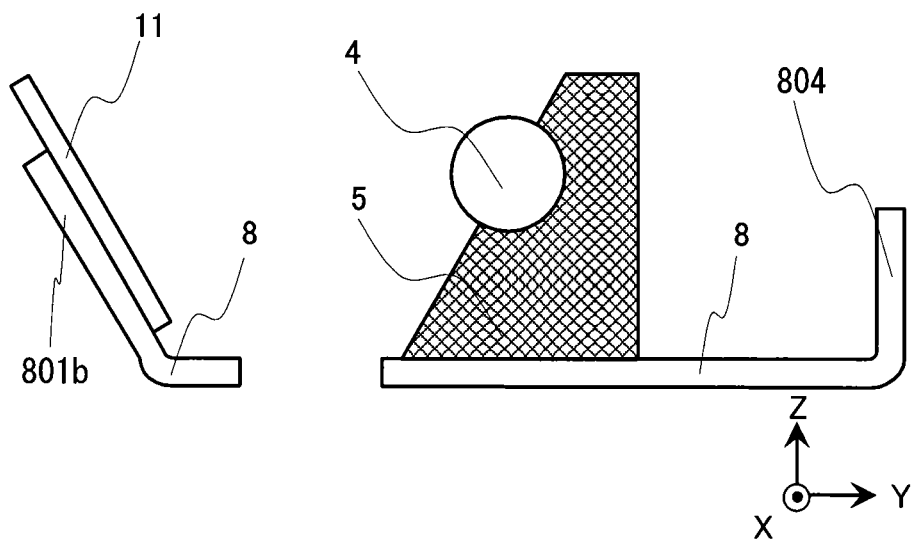
FIG. 27A is a diagram that corresponds to the cross-section along the line G-H in FIG. 14 of a light source device according to Modification 2.4.
Figure 27B:
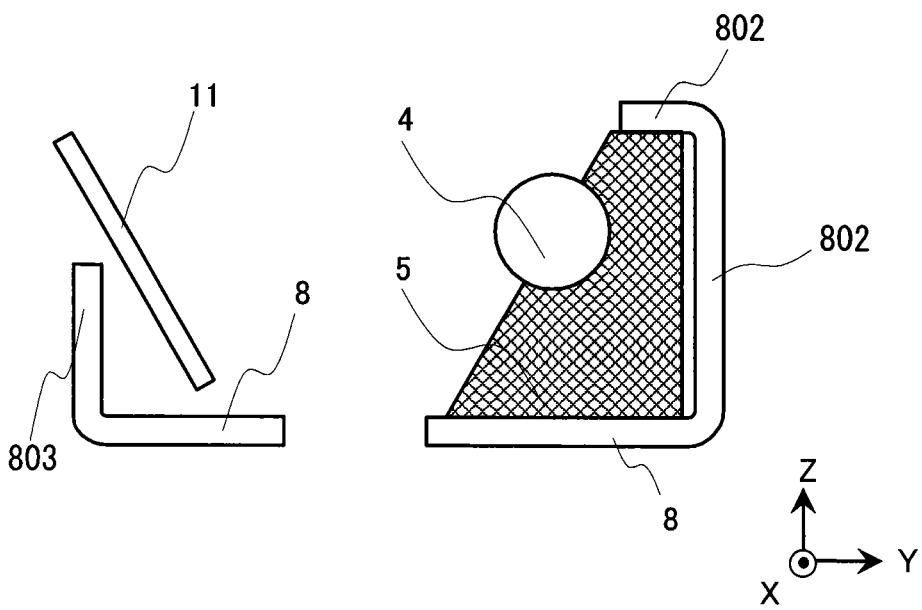
FIG. 27B is a diagram that corresponds to the cross-section along the line I-J in FIG. 14 of a light source device according to Modification 2.4.

FIG. 27A is a diagram that corresponds to the cross-section along the line G-H in FIG. 14 of a light source device according to Modification 2.4. FIG. 27B is a diagram that corresponds to the cross-section along the line I-J in FIG. 14 of a light source device according to Modification 2.4. In Embodiment 2, the reflector support parts 801 are curved in two locations in mutually different directions from the bottom face of the housing 8. Conversely, the reflector support parts 801*b* of Modification 2.4 are formed with a curve in one location from the bottom face of the housing 8.

Since the reflector support parts 801*b* are formed with a curve in one location, it is possible to decrease the steps to process the planar member 8*a* Also, the angles for supporting the reflector 11 may be adjusted all at once. Furthermore, the integral end 808 of Modification 2.1, the extended reflector support parts 801*e* and extended light guide holder affixing parts 802*e* of Modification 2.2, or the extended planar ends 803*e* and the extended planar ends 804*e* of Modification 2.3 may also be added to Modification 2.4.

With a light source device according to Embodiment 2, it is possible to obtain less end deviation in the light guide 4, the light guide holder 5, the support parts 7, and the substrates 2, as well as good illumination efficiency. With a reflector support structure according to Embodiment 2, it is possible to obtain less end deviation of the reflector 11.

Modification 2.5

FIG. 28A is a development view of a planar member that forms the housing of a light source device according to Modification 2.5. FIG. 28B is a diagram that corresponds to the cross-section along the line G-H in FIG. 14 of a light source device according to Modification 2.5. FIG. 28C is a diagram that corresponds to the cross-section along the line I-J in FIG. 14 of a light source device according to Modification 2.5.

The reflector support structure of the light source devices up to Modification 2.4 is an element formed from the planar member 8*a* integrally with the light guide holder affixing parts 802, but in Modification 2.5, the reflector support structure and the light guide holder affixing parts are separated. A reflector support structure according to Modification 2.5 is formed by bending the planar member 8*s* illustrated in FIG. 28A.

The differences between the planar member 8*s* according to Modification 2.5 and the planar member 8*a* are that the structure that supports the light guide holder 5 and the support parts 7 does not exist, and the reflected light passage hole 807 does not exist. The reflected light passage hole 807 may also be formed in the planar member 8*s* of Modification 2.5. In other words, this means that the reflector support structure according to Embodiment 2 may be applied to a structure that supports a reflector (reflecting mirror, concave mirror, convex mirror) in an image-forming optical system of an image scanning device. Note that in this case, the screw holes 805 may also be used to connect to members other than the carriage of an image scanning device.

The plurality of reflector support parts 801 in Modification 2.5 are placed on the face on the reverse side of the reflective face of the reflector 11. The plurality of reflector support parts 801 are integral with the housing 8 that supports the reflector support parts 801. The flat faces in the main scanning direction of the reflector support parts 801 stand at an angle in the sub scanning direction with respect to the housing 8, and are respectively formed by bending one end of the planar member 8*s* along the main scanning direction.

The structure of the housing 8 (planar member 8*s*) according to Modification 2.5 may be said to be only the reflector 11 side of the housing 8 (planar member 8*a*) of Embodiment 2 illustrated in FIGS. 13 and 17, FIG. 19, and FIG. 20. Accordingly, it is possible to add the integral end 808 of Modification 2.1, or alternatively, the extended reflector support parts 801*e* or the extended planar ends 803*e* of Modification 2.2. Also, the reflector support parts 801 may be substituted with the reflector support parts 801*b* of Modification 2.4. Furthermore, after substituting in the reflector support parts 801*b*, the integral end 808, or alternatively, at least one of the extended reflector support parts 801*e* or the extended planar ends 803*e*, may also be added.

Because of this structure, a reflector support structure according to Modification 2.5 may also be carried out as only a reflector support structure for a reflector (first mirror, second mirror, and so on) within an image-forming optical system of an image scanning device. In addition, implementation is also possible as only a support structure for a reflector that reflects the secondary light discussed earlier. Accordingly, in the case of using the reflector support structure of Modification 2.5 as a configuration of a light source device (a light source device used in an image scanning device), the source of light reflected by the reflector 11 may also be a rod-shaped light source or an array light source disposed opposite the reflector 11 and extending in the main scanning direction. In this case, the rod rod-shaped light source includes one that comprises the light-emitting parts 3 as well as the columnar light guide 4 that guides light from the light-emitting parts 3 input from the end faces 4*a* in the lengthwise direction, and outputs the light from the side faces 4*b*. Furthermore, a rod-shaped light source in a light source device according to Embodiment 2 may also be an electric-discharge lamp. The electric discharge lamp may be a typical one, such as an electric discharge lamp based on glow discharge such as a neon tube, or an electric discharge lamp based on arc discharge such as a fluorescent lamp or a xenon lamp (Xe lamp).

An array light source in a light source device according to Embodiment 2 may be one in which the light-emitting parts 3 (light-emitting elements 1) are plurally arranged in the main scanning direction and emit light (secondary light) in the sub scanning direction, or one in which the light-emitting parts 3 (light-emitting elements 1) are plurally arranged in the main scanning direction, and emit light (secondary light) in the sub scanning direction with a light guide member or a reflective member. Also, an array light source may emit primary light rather than secondary light, or emit both. Furthermore, in order to obtain both primary light and secondary light, an array light source arranged in separate columns may also be adopted. In other words, an array light source arranged for primary light and an array light source arranged for secondary light may become arranged in two columns along the main scanning direction. The two columns referred to herein include a staggered layout.

Modification 2.6

Figure 29A:
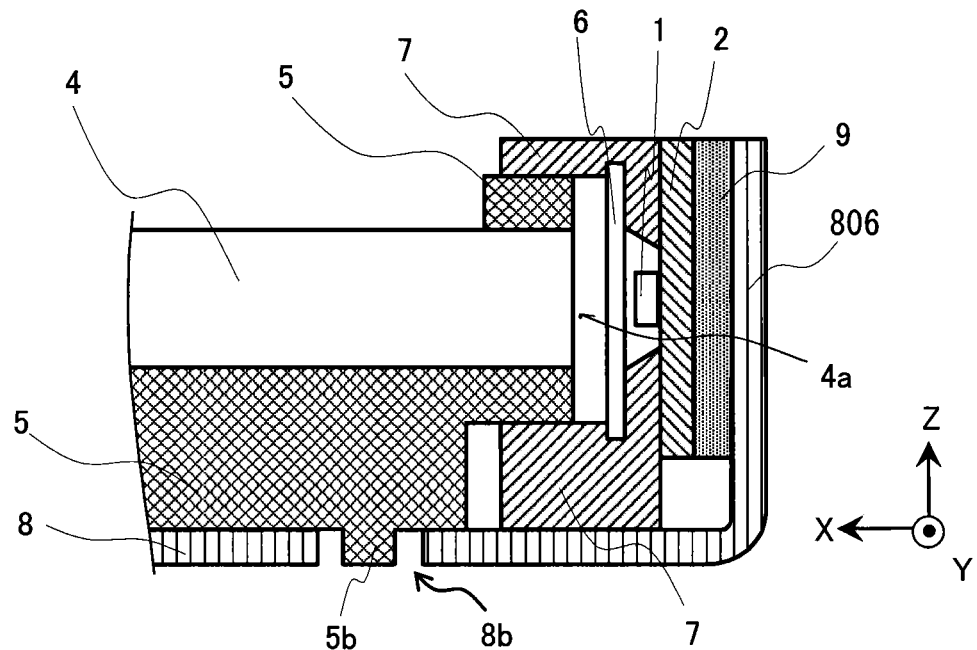
FIG. 29A is a cross-section view near a light-emitting part of a light source device according to Modification 2.6.
Figure 29B:
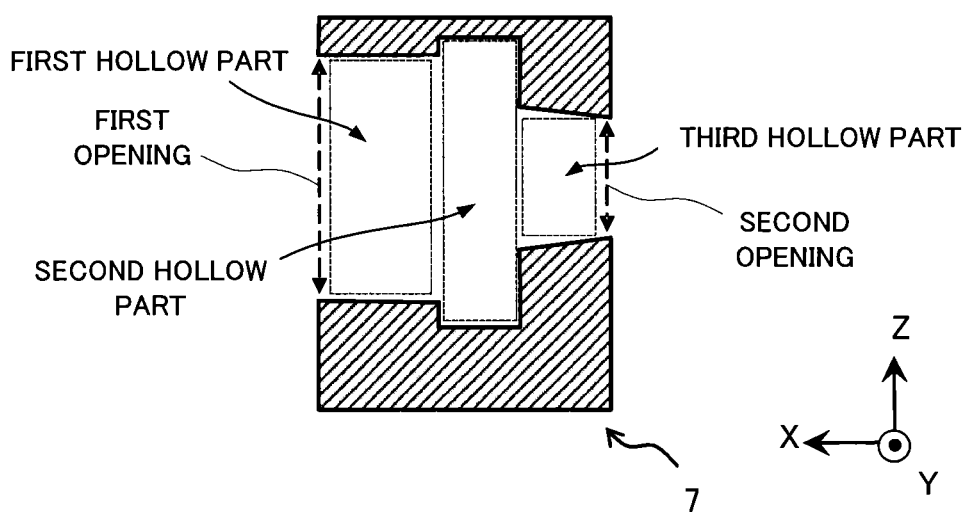
FIG. 29B is a cross-section view of a support part according to Modification 2.6.
Figure 30A:
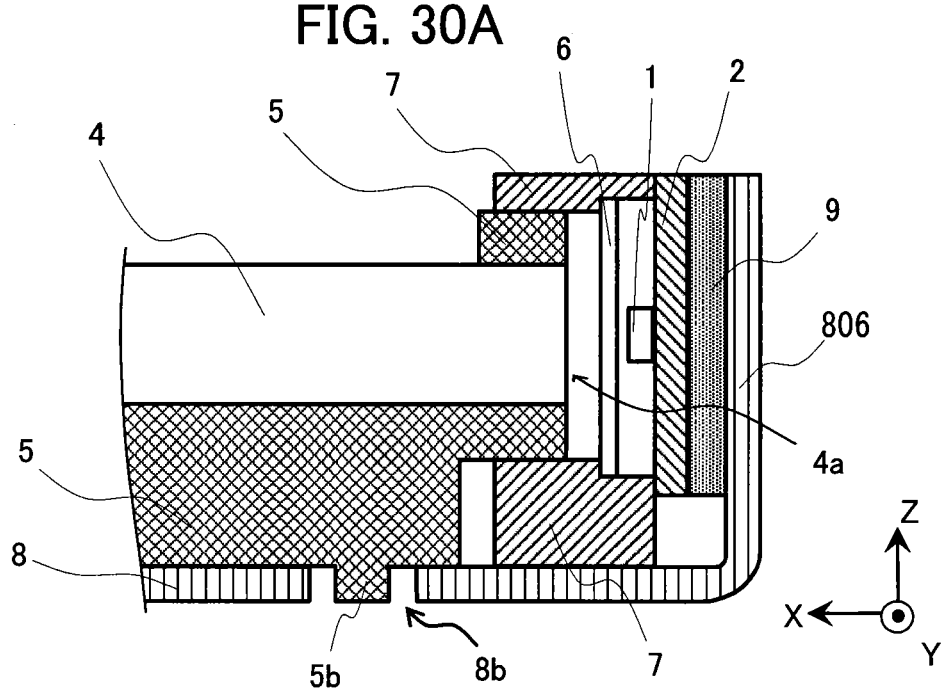
FIG. 30A is a cross-section view near a light-emitting part of a light source device according to Modification 2.6.
Figure 30B:
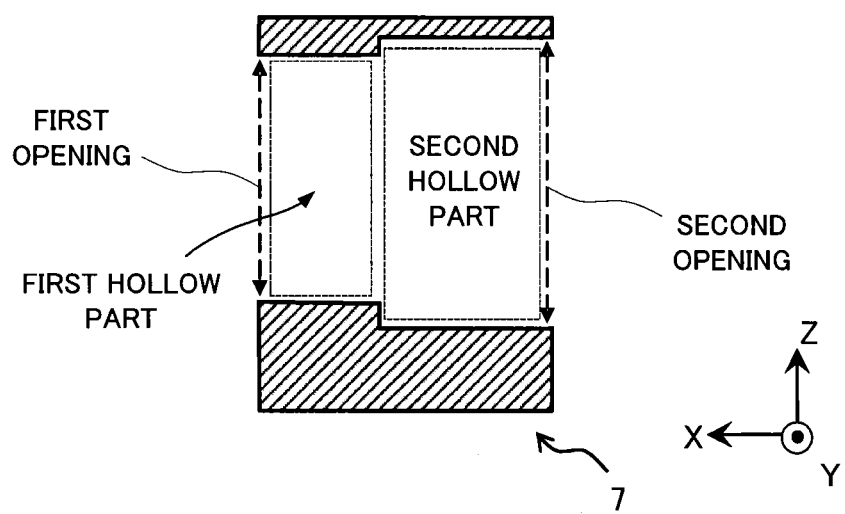
FIG. 30B is a cross-section view of a support part according to Modification 2.6.

FIG. 29A is a cross-section view near a light-emitting part of a light source device according to Modification 2.6. FIG. 29B is a cross-section view of a support part according to Modification 2.6. FIG. 30A is a cross-section view near a light-emitting part, illustrating a different example of a light source device according to Modification 2.6. FIG. 30B is a cross-section view of a support part according to a different configuration of Modification 2.6. In a light source device according to Modification 2.6, the support parts 7 internally includes a first hollow part and a second hollow part whose diameters successively increase proceeding from the side of the first opening to the side of the second opening, and supports the optical filters 6 inside the second hollow part.

In the example of FIG. 29A and FIG. 29B, the diameter of the second hollow part is greater than the diameter of the first hollow part, and a third hollow part whose diameter is smaller than the second hollow part is formed on the side of the second opening. In the example of FIG. 30A and FIG. 30B, there is no third hollow part, and the substrate 2 side of the second hollow part is the second opening. Alternatively, the diameters of the second hollow part and the third hollow part may be seen as being equal.

In the configuration of FIGS. 29A and 29B, the optical filters 6 are placed in the step portion produced between the first hollow part and the second hollow part, or alternatively, in the step portion produced between the second hollow part and the third hollow part. In FIG. 30, the optical filters 6 are placed in the step portion produced between the first hollow part and the second hollow part.

In the light source device illustrated in FIGS. 29A to 30B, in the case of maximum expansion of the light guide 4 (light guide holder 5), the light guide holder 5 and the support parts 7 cannot be disposed such that the end faces 4a of the light guide 4 and the end faces of the light guide holder 5 are contacting or about to contact at the step portion produced between the first hollow part and the second hollow part, as with the light source device illustrated in FIGS. 21 and 22. However, it is sufficient to dispose the light guide holder 5 and the support parts 7 such that, at maximum expansion, the end faces 4a of the light guide 4 and the end faces of the light guide holder 5 do not enter the second hollow part (see FIG. 29A). Note that in the case of FIG. 30A, it is necessary to make it so that the end faces 4a of the light guide 4 and the end faces of the light guide holder 5 may enter the second hollow part, but not contact the optical filters 6.

The light source device and reflector support structure according to Embodiment 2 described using FIGS. 10 to 30 may be carried out by suitably substituting the respective configurations.

Embodiment 2 is not limited to the example described using the drawings, namely, a configuration in which the support parts 7 slidably hold the ends of the light guide holder 5 inside the first hollow part. Since the light guide holder 5 is placed in the housing 8 and stands free without the support parts 7, it may be configured such that the support parts 7 and the light guide holder 5 do not contact, and the ends of the light guide holder 5 stretch in the lengthwise direction inside the first hollow part of the support parts 7 or above the first hollow part of the support parts 7.

The housing 8 (housing) of a light source device according to Embodiment 2 is equipped with two long holes 8b formed at both ends in the lengthwise direction, and an interlocking hole 8c formed between the two long holes 8b, in the center part in the widthwise direction of the floor (bottom face) having a rectangular shape. In addition, there are provided an reflected light passage hole 807 (aperture) formed in the bottom face along the lengthwise direction, screw holes 805, light guide holder affixing parts 802, reflector support parts 801, and fastening parts 806. Furthermore, the light guide holder 5 and the reflector 11 are affixed in the lengthwise direction, the widthwise direction, and the height direction, while the support parts 7 and the heat transfer bodies 9 are affixed in the lengthwise direction, the widthwise direction, and the height direction.

The long holes 8b are long holes elongated in the lengthwise direction in the bottom face of the housing 8, positioned at either end in the lengthwise direction, between the reflected light passage hole 807 and the fastening parts 806 in the widthwise direction, and in the widthwise center of the bottom face of the light guide holder 5. The first projecting parts 5b of the light guide holder 5 are inserted into the long holes 8b, thereby restricting planar movement of the light guide holder 5 in the widthwise direction. The interlocking hole 8c is positioned in the housing 8 bottom face, on the side of the long holes 8b opposite the fastening parts 806 in the lengthwise direction, between the reflected light passage hole 807 and the light guide holder affixing parts 802 in the widthwise direction, and in a center position in the widthwise direction of the light guide holder 5. The second projecting part 5c of the light guide holder 5 is inserted into the interlocking hole 8c, thereby restricting arbitrary planar movement of the light guide holder 5 in the bottom face direction (FIG. 17).

The reflected light passage hole 807 is a hole formed along the lengthwise direction of the housing 8 bottom face, and works to convey image information about the object to be scanned (light among the radiated light that was scattered and reflected by the object to be scanned) to the imager (an image-forming optical system such as a lens and a light-sensing part such as an image sensor) (FIG. 19), while minimizing all other unwanted light. The light guide holder affixing parts 802 extend along the side face on the side of the housing 8, are positioned on the side opposite the reflector 11 with respect to the reflected light passage hole 807, and work to affix the light guide holder 5 in the height direction. The reflector support parts 801 are multiply provided in the lengthwise direction, positioned farther outward than the reflected light passage hole 807 in the widthwise direction, and work to hold the reflector 11 with good precision. The fastening parts 806 are positioned outward in the lengthwise direction of the housing with respect to the reflected light passage hole 807, and affix the substrates 2, the support parts 7, and the heat transfer bodies 9 to the housing 8 with the screws 10.

The reflector support parts 801, the light guide holder affixing parts 802, the planar ends 803, the planar ends 804, the fastening parts 806, and the integral end 808 in the housing 8 also perform the function of heatsinks. Particularly, the planar ends 803, the planar ends 804, the fastening parts 806, and the integral end 808 may be continuous at the side wall portion of the short-edge walls (fastening parts 806) of the housing 8. In addition, the short-edge walls (fastening parts 806) may be extended and bent in the lengthwise direction, and extend in the lengthwise direction facing in the opposite direction of the reflector supports 801 with respect to the long-edge walls (planar ends 803). Also, the short-edge walls (fastening parts 806) may be continuous with the long-edge walls and bent in the short-edge direction, and may be extended (bent) in the direction facing the bottom face of the housing 8.

Embodiment 3.

In a light source device of Embodiment 3, the ends of the light guide 4 are curved towards the bottom face of the housing 8. Embodiment 3 describes a case in which the light-emitting parts 3 are fastened to the bottom face of the housing 8 directly or via the heat transfer bodies 9, and a case in which the light-emitting parts 3 are attached via holes formed in the housing 8. Otherwise, the configuration is similar to Embodiment 2.

Likewise in Embodiment 3, the light guide 4, the light guide holder 5, and the support parts 7 are obviously placed while accounting for expansion and contraction in the thickness direction of the light guide 4 and the light guide holder 5. For example, the dimensions of the light guide holder 5 (light guide 4) and the support parts 7 are set so that, at maximum expansion, the light guide holder 5 (light guide 4) does not damage the support parts 7. However, the influence is extremely small compared to expansion and contraction in the lengthwise direction of the light guide 4 and the light guide holder 5.

Figure 31:
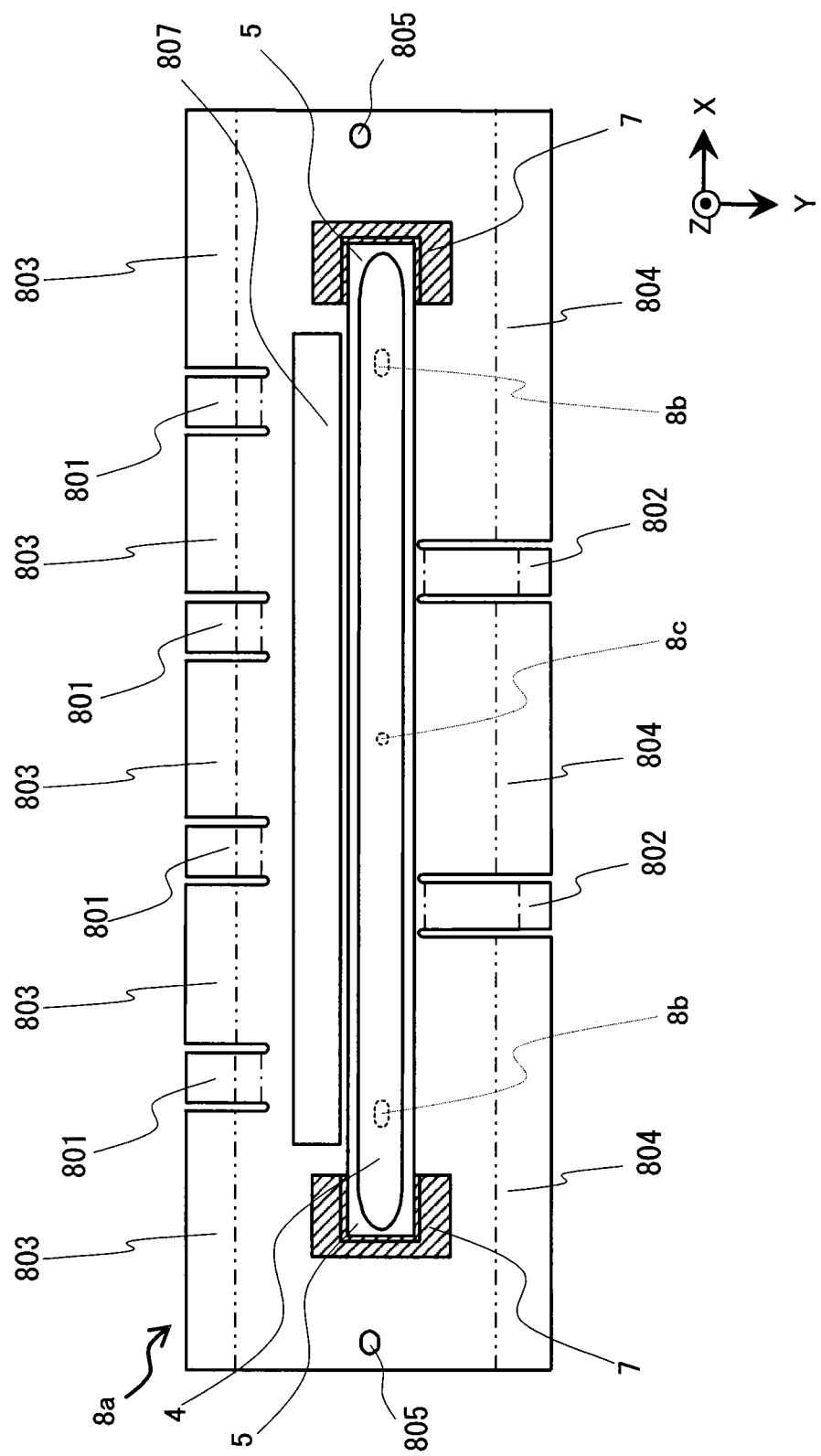
FIG. 31 is a development view of a planar member that forms the housing of a light source device according to Embodiment 3 of the present disclosure.
Figure 32A:
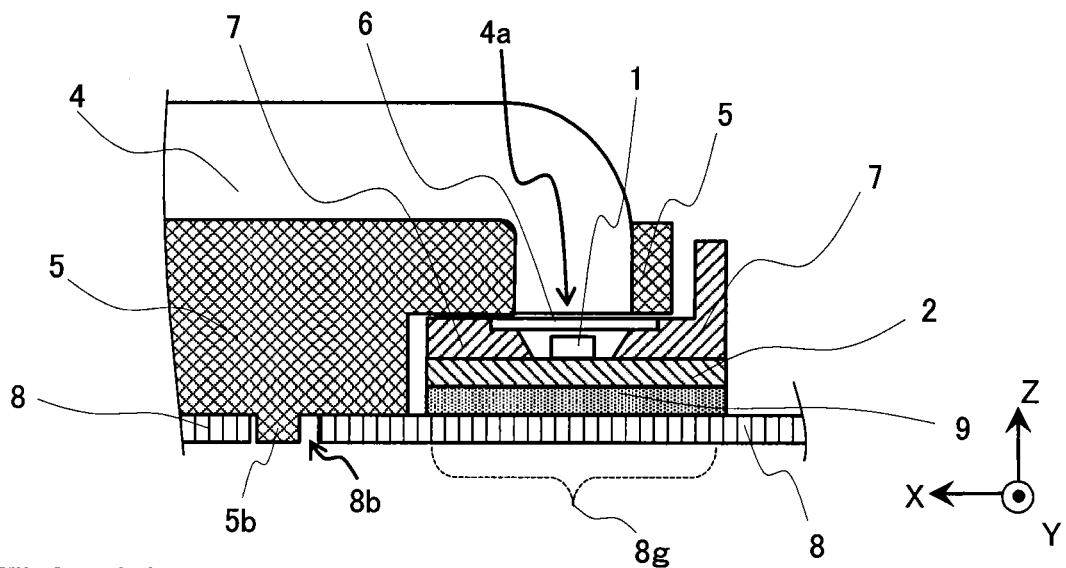
FIG. 32A is a cross-section view near a light-emitting part of a light source device according to Embodiment 3.
Figure 32B:
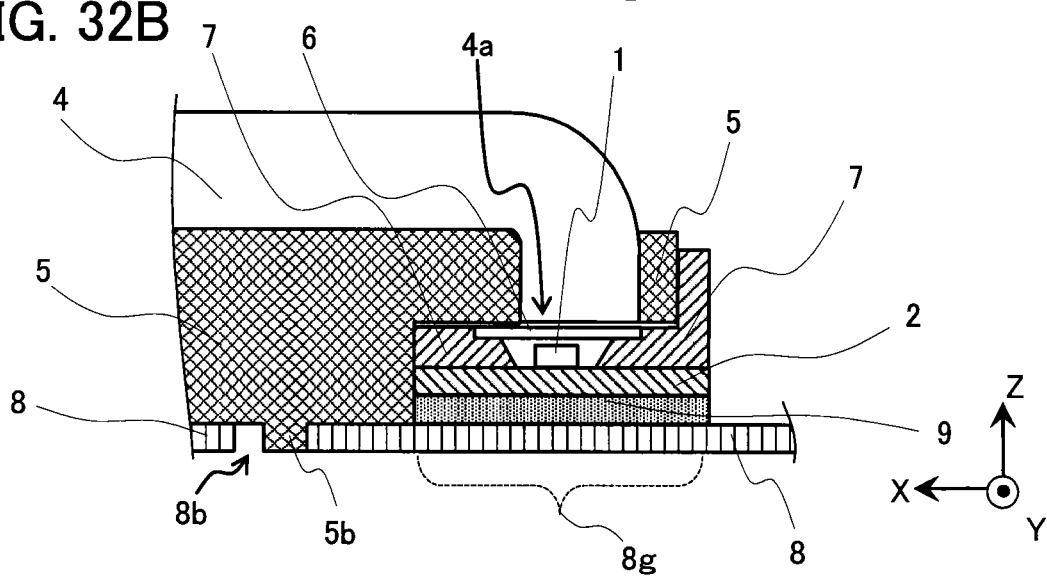
FIG. 32B is a cross-section view near a light-emitting part that illustrates the case of a thermally expanded light guide and light guide holder in a light source device according to Embodiment 3.
Figure 32C:
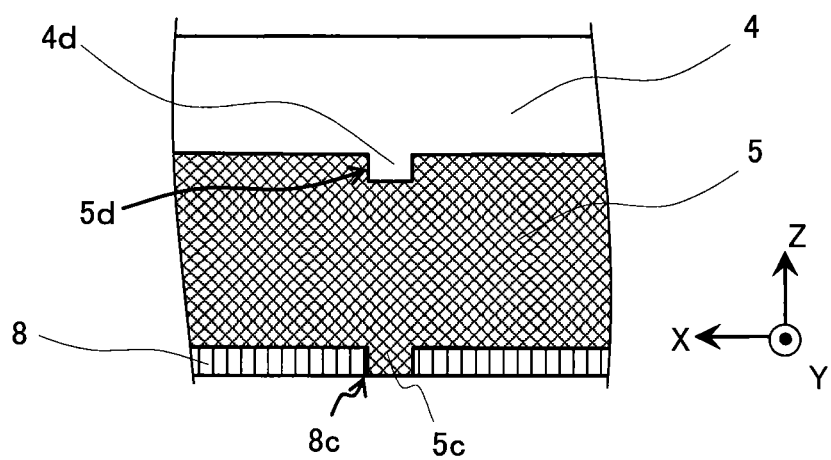
FIG. 32C is a central cross-section view of a light source device according to Embodiment 3.

FIG. 31 is a development view of a planar member that forms the housing of a light source device according to Embodiment 3 of the present disclosure. FIG. 32A is a cross-section view near a light-emitting part of a light source device according to Embodiment 3. FIG. 32B is a cross-section view near a light-emitting part that illustrates the case of a thermally expanded light guide and light guide holder in a light source device according to Embodiment 3. FIG. 32C is a central cross-section view of a light source device according to Embodiment 3. FIGS. 31 to 32C illustrate the case in which the light-emitting parts 3 are fastened to the bottom face of the housing 8.

FIG. 31 illustrates a state of virtually placing the light guide 4, the light guide holder 5, and the support parts 7 on top of the housing 8. As illustrated in FIG. 32A, in a light source device according to Embodiment 3, the ends of the light guide 4 are curved towards areas 8g of the housing 8 bottom face. Likewise in Embodiment 3, the light guide holder 5 covers the ends of the light guide 4, except for at least a part of the end faces 4a.

In the support parts 7, a first hollow part and a second hollow part whose diameters successively decrease from above (farther away from the bottom face of the housing 8) are formed in the direction in which the ends of the light guide 4 curve. The side of the first hollow part that abuts the end faces 4a of the light guide 4 is a first opening, while the side of the second hollow part on the bottom face of the housing 8 is a second opening. The light-emitting parts 3 (light-emitting elements 1 and substrates 2) and the heat transfer bodies 9 are affixed between the second opening and the areas 8g. The support parts 7 support the optical filters 6 between the first opening and the second opening while maintaining a designated spacing with the light-emitting parts 3. The height of the first hollow part is equal to or greater than the thickness of the optical filters 6. The end faces 4a of the light guide 4 are able to slide in the lengthwise direction above the first opening. The ends of the light guide holder 5 are able to move in the lengthwise direction above the first opening to match stretching of the light guide holder 5 in the lengthwise direction.

Light exiting the light-emitting parts 3 (light-emitting elements 1) fastened to the areas 8g is input from the end faces 4a (light input parts 4a) of the light guide 4, whose ends are curved towards the areas 8g. Subsequent basic operation is similar to a light source device according to Embodiment 2.

FIG. 32A illustrates the state in which the length of the light guide 4 is maximally contracted in the lengthwise direction. FIG. 32B illustrates the state in which the length of the light guide 4 is maximally expanded in the lengthwise direction. FIG. 32C illustrates how the second projecting part 5c and the interlocking hole interlocking hole 5d of the light guide holder 5 are set so as to be disposed in the same cross-section in the sub scanning direction (widthwise direction). The configuration of the center parts of the light guide 4 and the light guide holder 5 is similar to Embodiment 2.

As illustrated in FIG. 32B, in the case of maximum expansion of the light guide 4 (light guide holder 5), the light guide holder 5 and the support parts 7 are disposed such that the end faces 4a of the light guide 4 and the end faces of the light guide holder 5 are contacting or about to contact in the first opening. As a result, the end faces 4a (light input parts 4a) of the light guide 4 and the light-emitting parts 3 (optical filters 6) may be made to not contact. Also, as illustrated in FIGS. 32A and 32B, the light guide holder 5 may respectively include pushing face parts that face opposite the edges of the first opening and the support parts 7, and these pushing face parts may be provided so as to restrict the sliding range (movement range) of the light guide holder 5 (FIG. 32B). Note that the pushing face parts may also be made to be about to contact the edges of the first opening when the expansion of the light guide 4 is at maximum. In this case, the pushing face parts become opposing face parts rather than pushing face parts.

Figure 34A:
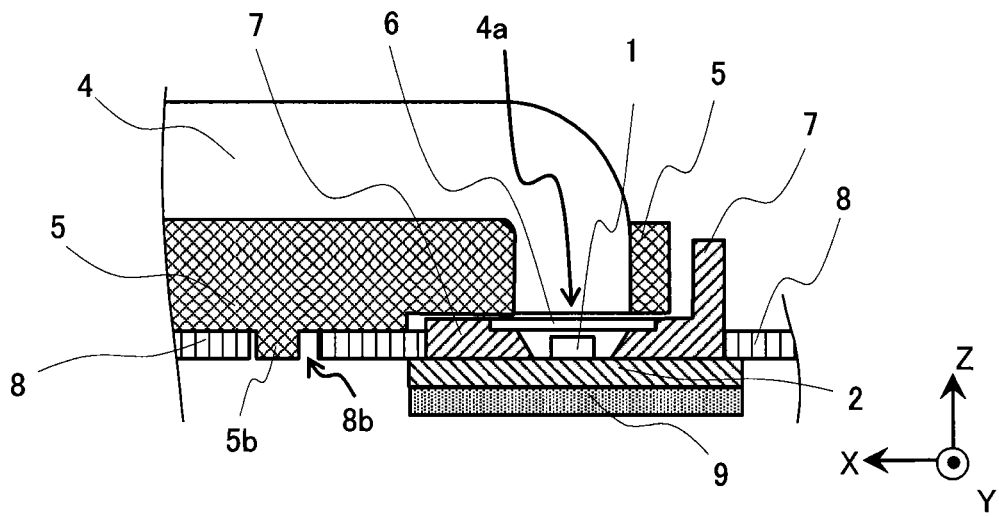
FIG. 34A is a cross-section view near a light-emitting part in a different configuration of a light source device according to Embodiment 3.
Figure 34B:
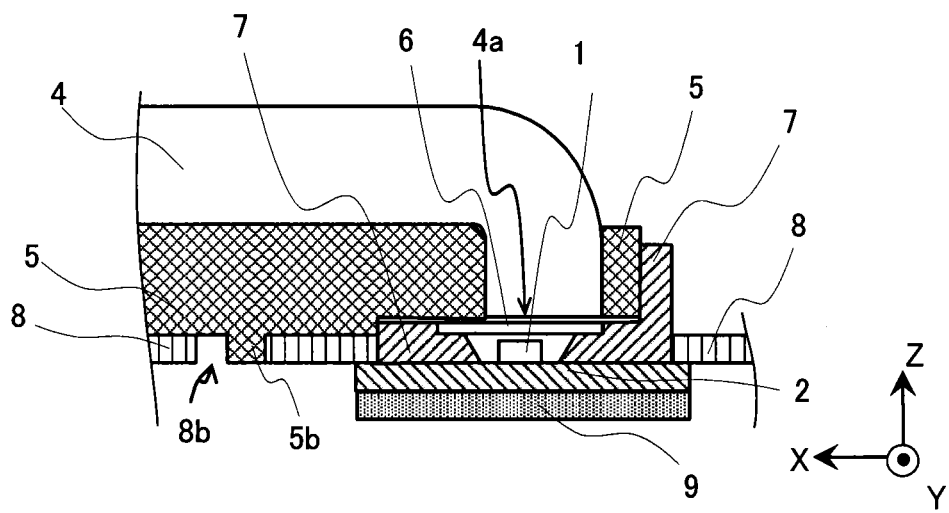
FIG. 34B is a cross-section view near a light-emitting part that illustrates the case of a thermally expanded light guide and light guide holder in a different configuration of a light source device according to Embodiment 3.
Figure 34C:
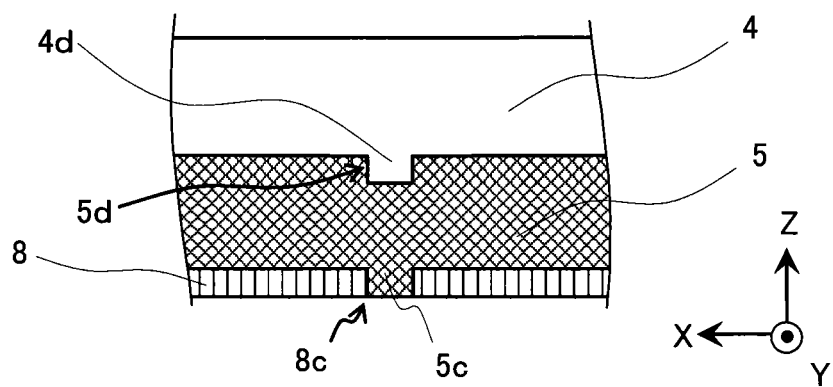
FIG. 34C is a central cross-section view of a different configuration of a light source device according to Embodiment 3.

FIG. 33 is a development view of a planar member in a different configuration of a light source device according to Embodiment 3. FIG. 34A is a cross-section view near a light-emitting part in a different configuration of a light source device according to Embodiment 3. FIG. 34B is a cross-section view near a light-emitting part that illustrates the case of a thermally expanded light guide and light guide holder in a different configuration of a light source device according to Embodiment 3. FIG. 34C is a central cross-section view of a different configuration of a light source device according to Embodiment 3. FIGS. 33 to 34C illustrate the case in which the light-emitting parts 3 are attached via holes formed in the housing 8. As illustrated in FIG. 33, light-emitting part holes 809 (light-emitting part cut-outs 809) are formed in the planar member 8a.

The light-emitting part holes 809 are not required to be complete holes in which the periphery of the light-emitting part holes 809 is closed, and may also be light-emitting part cut-outs that are inwardly cut out from the outer periphery of the housing 8 (planar member 8a). In Embodiment 3, the light-emitting part holes 809 include the case of light-emitting part cut-outs.

As illustrated in FIG. 34A, in a light source device according to Embodiment 3, the ends of the light guide 4 are curved towards the bottom face of the housing 8. The support parts 7 are attached by interlocking with the light-emitting part holes 809. The light-emitting parts 3 are affixed to the support parts 7 in between (the planar member 8a of) the housing 8 with respect to the light guide holder 5. Otherwise, the configuration is unchanged from FIGS. 31 to 32C.

The support parts 7 support the optical filters 6 between the first opening and the second opening while maintaining a designated spacing with the light-emitting parts 3. The height of the first hollow part is equal to or greater than the thickness of the optical filters 6. The end faces 4a of the light guide 4 are able to slide in the lengthwise direction above the first opening. The ends of the light guide holder 5 are able to move in the lengthwise direction above the first opening to match stretching of the light guide holder 5 in the lengthwise direction.

As illustrated in FIG. 34B, in the case of maximum expansion of the light guide 4 (light guide holder 5), the light guide holder 5 and the support parts 7 are disposed such that the end faces 4a of the light guide 4 and the end faces of the light guide holder 5 are contacting or about to contact in the first opening. As a result, the end faces 4a (light input parts 4a) of the light guide 4 and the light-emitting parts 3 (optical filters 6) may be made to not contact.

Light exiting the light-emitting parts 3 (light-emitting elements 1) disposed via light-emitting part holes 809 (housing 8) is input from the end faces 4a (light input parts 4a) of the light guide 4, whose ends are curved towards the housing 8 (light-emitting part holes 809). Subsequent basic operation is similar to a light source device according to Embodiment 2.

Likewise in the light guide 4 of a light source device according to Embodiment 3, it is sufficient for the light scattering patterns 4c to be formed in a portion that at least corresponds to an effective scanning area in the main scanning direction of the image scanning device. The brightness or the like at the ends of the effective scanning area (near the support parts 7) may also be adjusted by causing more or less light to be output from the curved portion of the light guide 4 compared to other portions.

In FIG. 34A, the heat transfer bodies 9 are illustrated as not contacting the housing 8 (light-emitting part holes 809) that act as the housing, but in actual practice, the heat transfer bodies 9 and the housing 8 may be contacting directly or indirectly to conduct heat, or the heat transfer bodies 9 may not be provided.

Modification 3.1

Figure 36A:
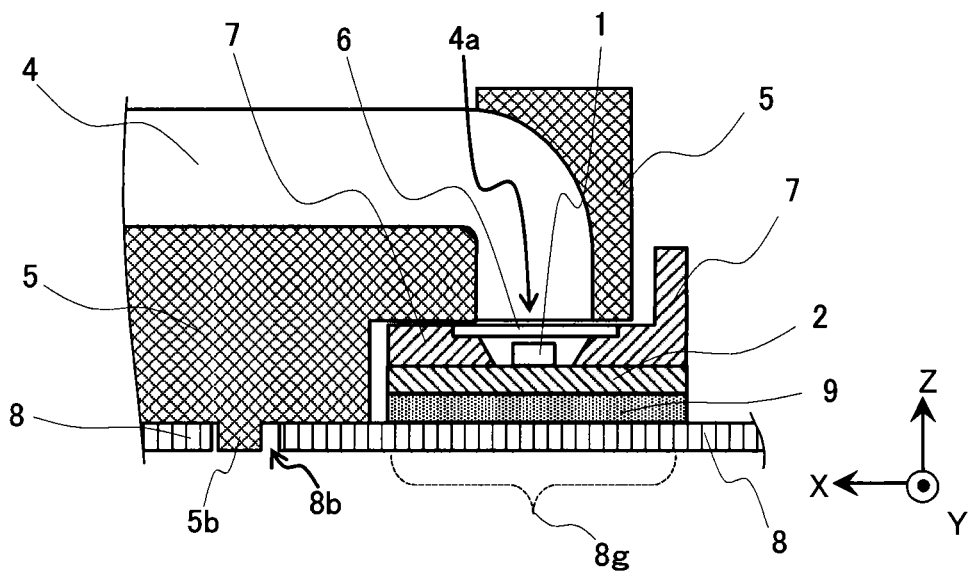
FIG. 36A is a cross-section view near a light-emitting part of a light source device according to Modification 3.1.
Figure 36B:
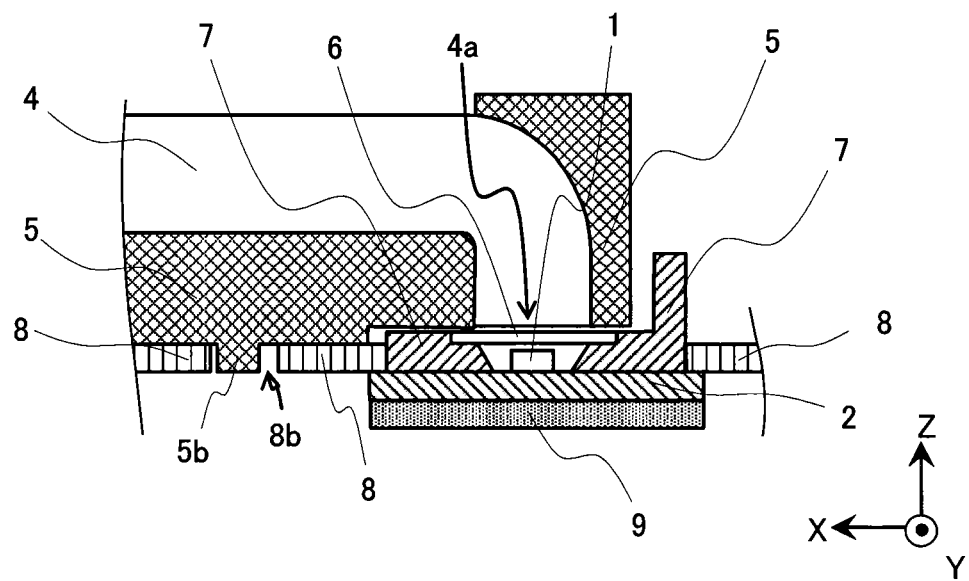
FIG. 36B is a cross-section view near a light-emitting part in a different configuration of a light source device according to Modification 3.1.

FIG. 35 is a development view of a planar member that forms the housing of a light source device according to Modification 3.1 of Embodiment 3. FIG. 36A is a cross-section view near a light-emitting part of a light source device according to Modification 3.1. FIG. 36B is a cross-section view near a light-emitting part in a different configuration of a light source device according to Modification 3.1. FIG. 35 illustrates a state of virtually placing the light guide 4, the light guide holder 5, and the support parts 7 on top of the housing 8.

As illustrated in FIG. 36A, in a light source device according to Modification 3.1, the curved portion of the light guide 4 on the side opposite the support parts 7 is also covered by the light guide holder 5. Otherwise, the configuration is similar to FIGS. 31 to 32C or FIGS. 33 to 34C. FIG. 36A is the case in which the housing 8 includes the areas of the areas 8g (corresponds to FIGS. 31 to 32C). FIG. 36B is the case in which the housing 8 includes the light-emitting part holes 809 (corresponds to FIGS. 33 to 34C).

Modification 3.2

Figure 37:
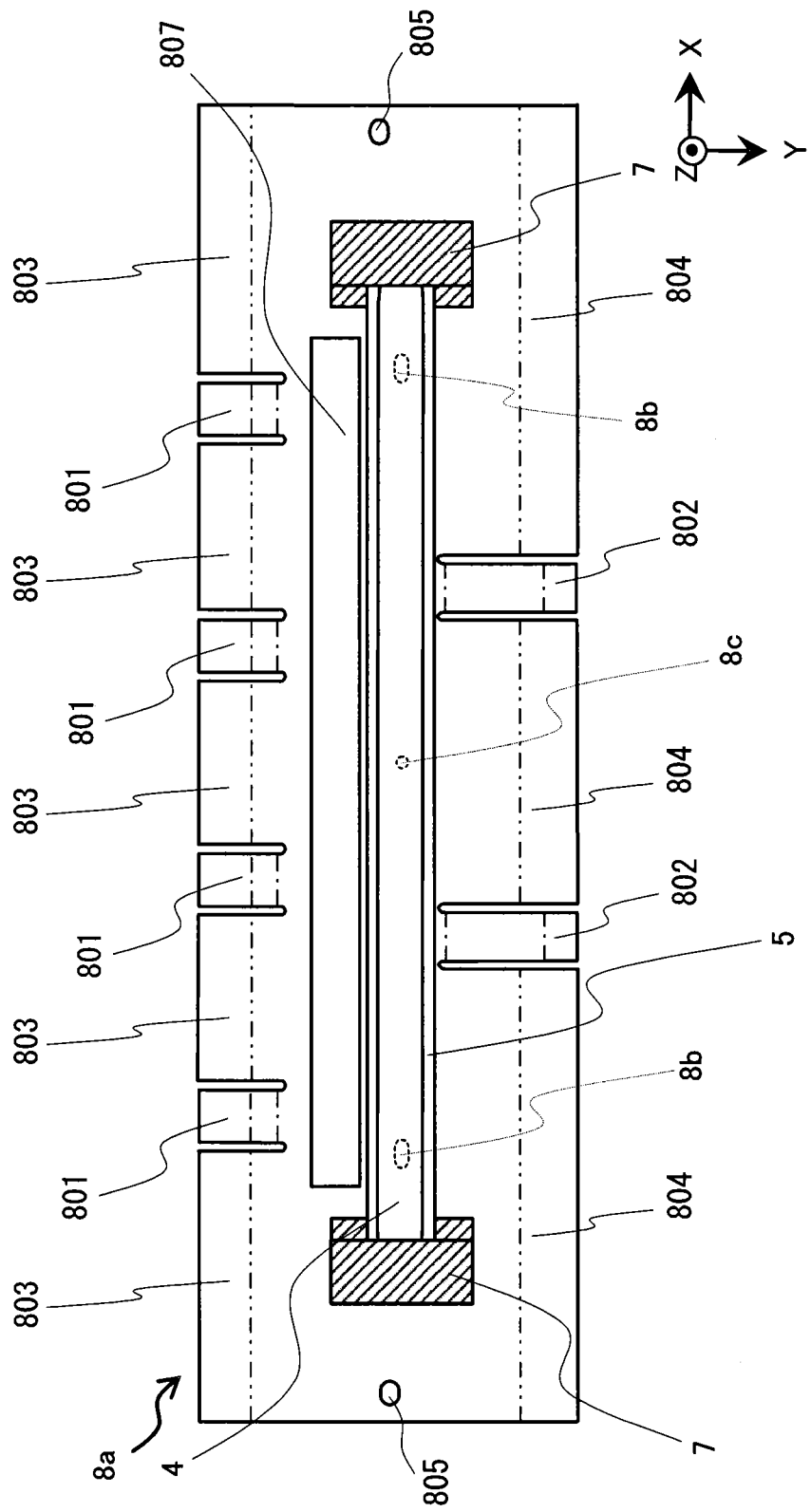
FIG. 37 is a development view of a planar member that forms the housing of a light source device according to Modification 3.2 of Embodiment 3.
Figure 38A:
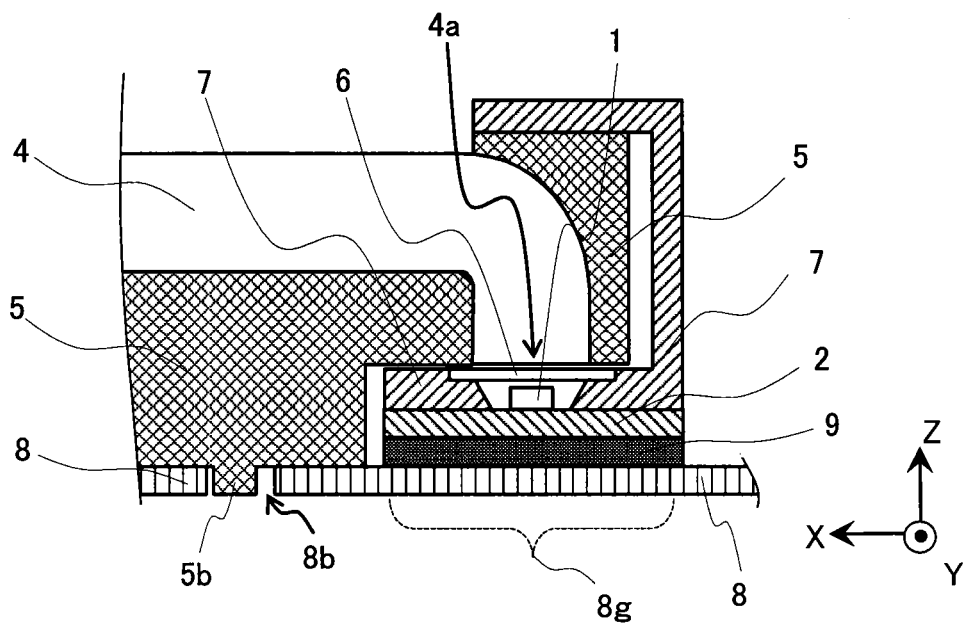
FIG. 38A is a cross-section view near a light-emitting part of a light source device according to Modification 3.2.
Figure 38B:
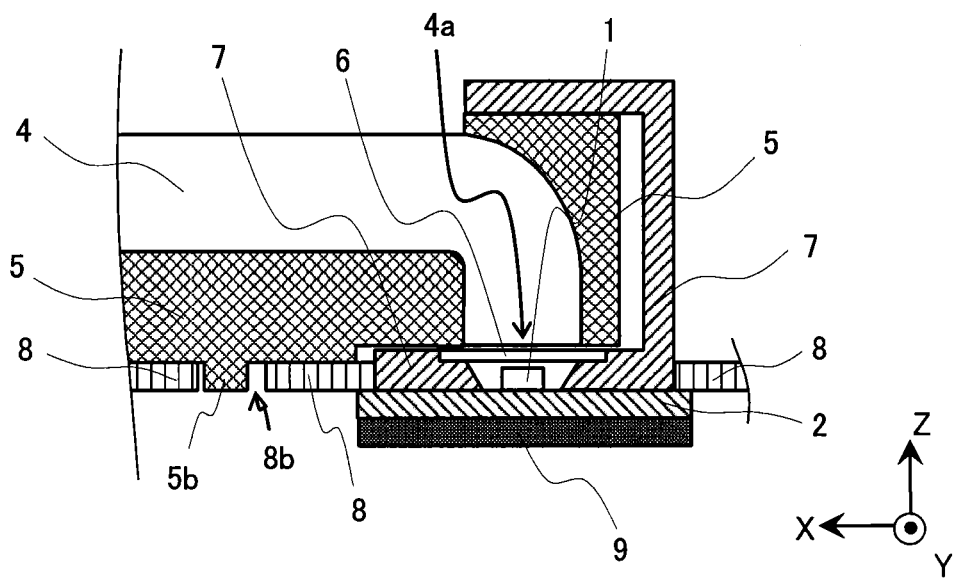
FIG. 38B is a cross-section view near a light-emitting part in a different configuration of a light source device according to Modification 3.2.

FIG. 37 is a development view of a planar member that forms the housing of a light source device according to Modification 3.2. FIG. 38A is a cross-section view near a light-emitting part of a light source device according to Modification 3.2. FIG. 38B is a cross-section view near a light-emitting part in a different configuration of a light source device according to Modification 3.2. FIG. 37 illustrates a state of virtually placing the light guide 4, the light guide holder 5, and the support parts 7 on top of the housing 8.

As illustrated in FIG. 38A, in a light source device according to Modification 3.2, the curved portion of the light guide 4 on the side opposite the support parts 7 is also covered by the light guide holder 5. Furthermore, those portions of the light guide holder 5 are covered by the support parts 7. The ends of the light guide holder 5 are in proximity to, or slidably contacting, the support parts 7. Stated differently, the ends of the light guide holder 5 (light guide 4) are inserted into the first hollow part of the support parts 7, and the light guide holder 5 (light guide 4) slidably (stretchably) contacts the support parts 7. Otherwise, the configuration is similar to FIGS. 35 to 36B. FIG. 38A is the case in which the housing 8 includes the areas of the areas 8g (corresponds to FIG. 36A). FIG. 38B is the case in which the housing 8 includes the light-emitting part holes 809 (corresponds to FIG. 36B).

Hereinafter, details and variations of support parts according to Embodiment 3 will be described with reference to FIGS. 39A to 40d. FIGS. 39A to 40D are cross-section views of support parts according to Embodiment 3. The support parts 7 of FIG. 39A correspond to the support parts 7 of FIG. 38A or FIG. 38B. The support parts 7 illustrated in FIG. 39A internally include a first hollow part, a second hollow part, and a third hollow part whose diameters successively decrease proceeding from the side of the first opening to the side of the second opening. The support parts 7 support the optical filters 6 inside the second hollow part. Specifically, the optical filters 6 are formed in the step portion produced between the second hollow part and the third hollow part. Note that the first hollow part and the second hollow part are disposed at positions such that the central axes of the respective diameters intersect. The depth of the second hollow part is taken to be equal to or greater than the thickness of the optical filters 6.

Figure 39A:
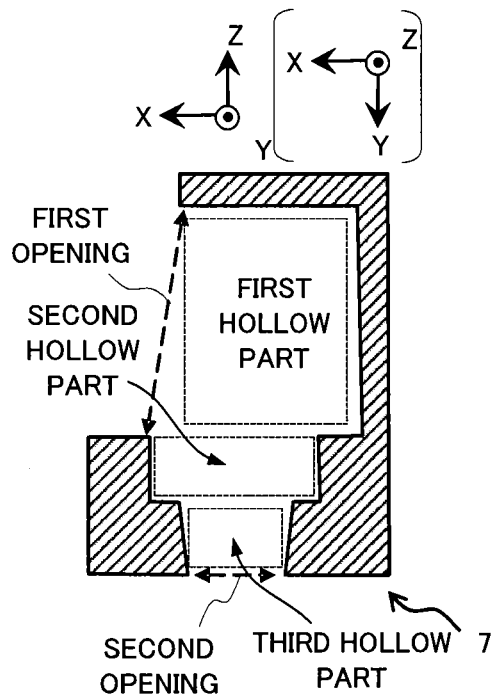
FIG. 39A is a cross-section view of a support part according to Embodiment 3.
Figure 39B:
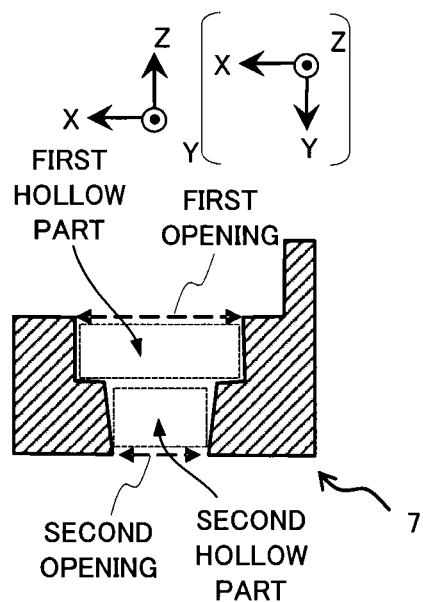
FIG. 39B is a cross-section view of a support part according to Embodiment 3.

The support parts 7 of FIG. 39B correspond to the support parts 7 of FIG. 36A or FIG. 36B. The support parts 7 illustrated in FIG. 39B internally include a first hollow part and a second hollow part whose diameters successively decrease proceeding from the side of the first opening to the side of the second opening. The support parts 7 support the optical filters 6 inside the first hollow part. Specifically, the optical filters 6 are formed in the step portion produced between the first hollow part and the second hollow part. Note that the depth of the first hollow part is taken to be equal to or greater than the thickness of the optical filters 6.

Figure 39C:
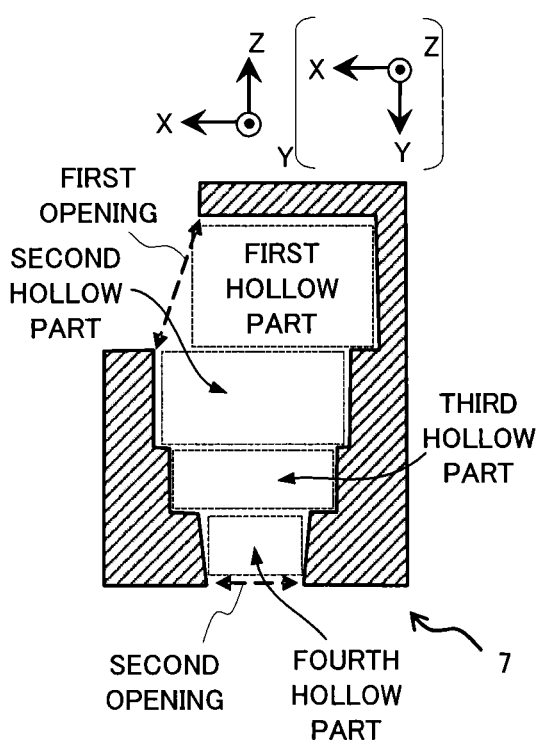
FIG. 39C is a cross-section view of a support part according to Embodiment 3.

The support parts 7 illustrated in FIG. 39C are a modification of the support parts 7 illustrated in FIG. 39A. The support parts 7 illustrated in FIG. 39C internally include a first hollow part, a second hollow part, a third hollow part, and a fourth hollow part whose diameters successively decrease proceeding from the side of the first opening to the side of the second opening, and support the optical filters 6 inside the second hollow part or the third hollow part. Specifically, the optical filters 6 are formed in the step portion produced between the second hollow part and the third hollow part, or alternatively, in the step portion produced between the third hollow part and the fourth hollow part. Note that the first hollow part and the second hollow part are disposed at positions such that the central axes of the respective diameters intersect. The thickness of the step portion is taken to be equal to or greater than the thickness of the optical filters 6.

Figure 39D:
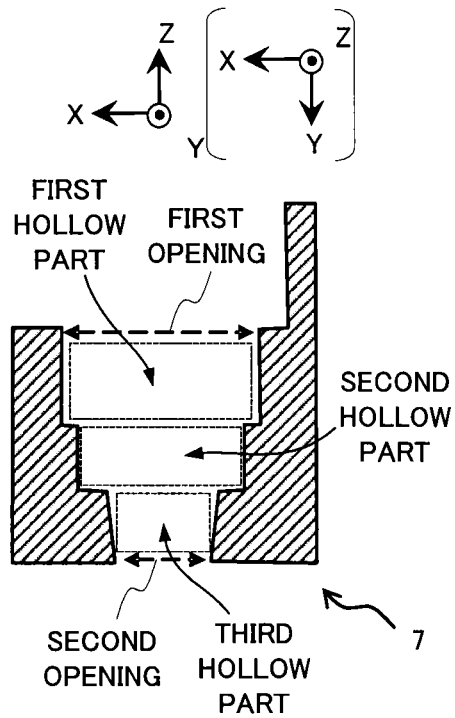
FIG. 39D is a cross-section view of a support part according to Embodiment 3.

The support parts 7 illustrated in FIG. 39D are a modification of the support parts 7 illustrated in FIG. 39B. The support parts 7 illustrated in FIG. 39D internally include a first hollow part, a second hollow part, and a third hollow part whose diameters successively decrease proceeding from the side of the first opening to the side of the second opening, and support the optical filters 6 inside the first hollow part or the second hollow part. Specifically, the optical filters 6 are formed in the step portion produced between the first hollow part and the second hollow part, or alternatively, in the step portion produced between the second hollow part and the third hollow part. Note that, at the least, the thickness of the step portion produced between the first hollow part and the second hollow part is taken to be equal to or greater than the thickness of the optical filters 6. Note that the inner-wall shape of the first hollow part illustrated in FIG. 39A and FIG. 39C is required to be a shape such that either the portion of the light guide holder 5 that is inserted into the support parts 7 contacts the support parts 7 and allows the light guide holder 5 to slide, or the portion of the light guide holder 5 that is inserted into the support parts 7 does not contact the support parts 7 and allows the light guide holder 5 to stretch.

Figure 40A:
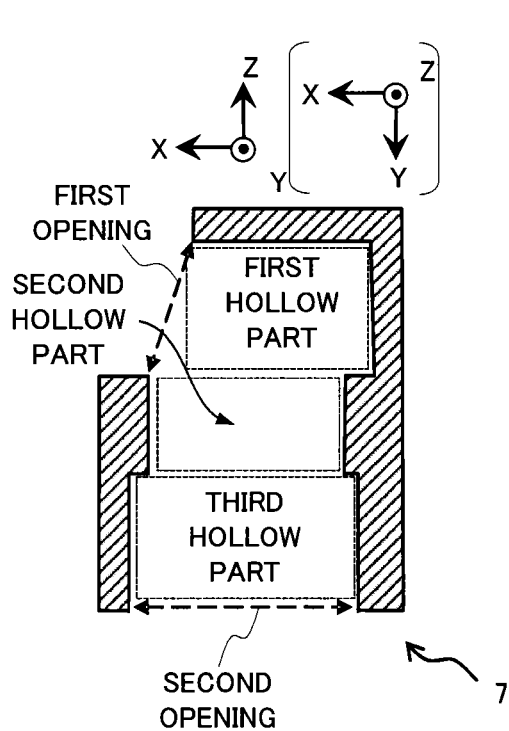
FIG. 40A is a cross-section view of a support part according to Embodiment 3.

The support parts 7 illustrated in FIG. 40A are a modification of the support parts 7 illustrated in FIG. 39A. The support parts 7 illustrated in FIG. 40A internally include a first hollow part, a second hollow part, and a third hollow part whose diameters successively increase proceeding from the side of the first opening to the side of the second opening, and support the optical filters 6 inside the third hollow part. Specifically, in FIG. 40A, the optical filters 6 are formed in the step portion produced between the second hollow part and the third hollow part. Note that the first hollow part and the second hollow part are disposed at positions such that the central axes of the respective diameters intersect. Note that the inner-wall shape of the first hollow part illustrated in FIG. 40A and FIG. 40C is required to be a shape such that either the portion of the light guide holder 5 that is inserted into the support parts 7 contacts the support parts 7 and allows the light guide holder 5 to slide, or the portion of the light guide holder 5 that is inserted into the support parts 7 does not contact the support parts 7 and allows the light guide holder 5 to stretch.

Figure 40B:
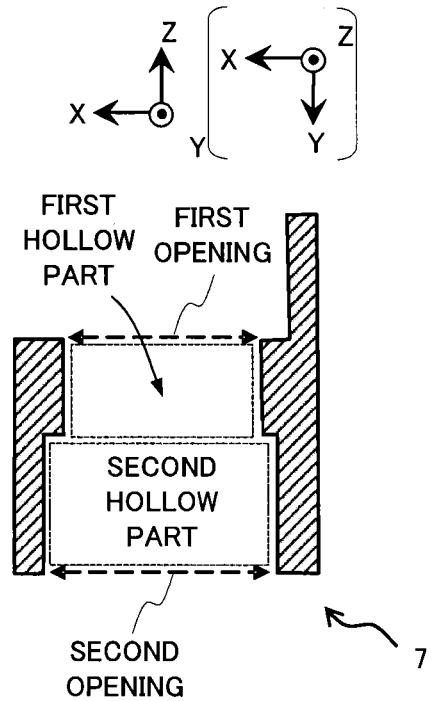
FIG. 40B is a cross-section view of a support part according to Embodiment 3.

The support parts 7 illustrated in FIG. 40B are a modification of the support parts 7 illustrated in FIG. 39B. The support parts 7 illustrated in FIG. 40B internally include a first hollow part and a second hollow part whose diameters successively increase proceeding from the side of the first opening to the side of the second opening, and support the optical filters 6 inside the second hollow part. Specifically, in FIG. 40B, the optical filters 6 are formed in the step portion produced between the first hollow part and the second hollow part.

Figure 40C:
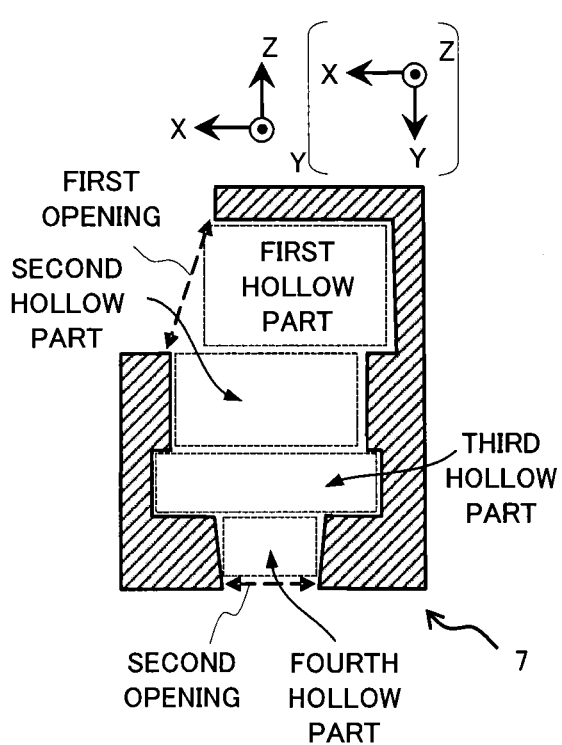
FIG. 40C is a cross-section view of a support part according to Embodiment 3.

The support parts 7 illustrated in FIG. 40C are a modification of the support parts 7 illustrated in FIG. 39A. The support parts 7 illustrated in FIG. 40C internally include a first hollow part, a second hollow part, and a third hollow part whose diameters successively increase proceeding from the side of the first opening to the side of the second opening, and a fourth hollow part of smaller diameter than the third hollow part that communicates with the third hollow part. The optical filters 6 are supported inside the third hollow part. Specifically, in FIG. 40C, the optical filters 6 are formed in the step portion produced between the second hollow part and the third hollow part, or alternatively, in the step portion produced between the third hollow part and the fourth hollow part. Note that the first hollow part and the second hollow part are disposed at positions such that the central axes of the respective diameters intersect.

Figure 40D:
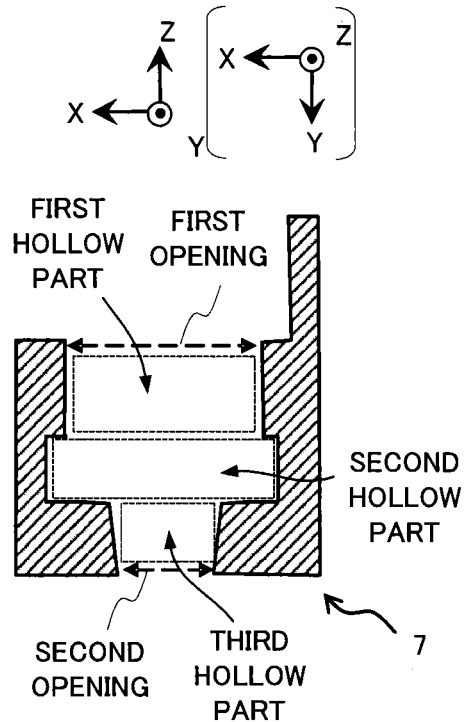
FIG. 40D is a cross-section view of a support part according to Embodiment 3.

The support parts 7 illustrated in FIG. 40D are a modification of the support parts 7 illustrated in FIG. 39B. The support parts 7 illustrated in FIG. 40D internally include a first hollow part and a second hollow part whose diameters successively increase proceeding from the side of the first opening to the side of the second opening, and a third hollow part of smaller diameter than the second hollow part that communicates with the second hollow part. The optical filters 6 are supported inside the second hollow part. Specifically, in FIG. 40D, the optical filters 6 are formed in the step portion produced between the first hollow part and the second hollow part, or alternatively, in the step portion produced between the second hollow part and the third hollow part. Note that the inner wall shape of the hollow parts (second hollow part, third hollow part, and fourth hollow part) other than the first hollow part illustrated in FIG. 39A, FIG. 39C, FIG. 40A, and FIG. 40C is not particularly limited insofar as the shape is tubular and does not block light from the light-emitting parts 3.

Hereinafter, modifications related to the light guide holder 5 and the support parts 7 will be described.

Modification 3.4

Figure 41A:
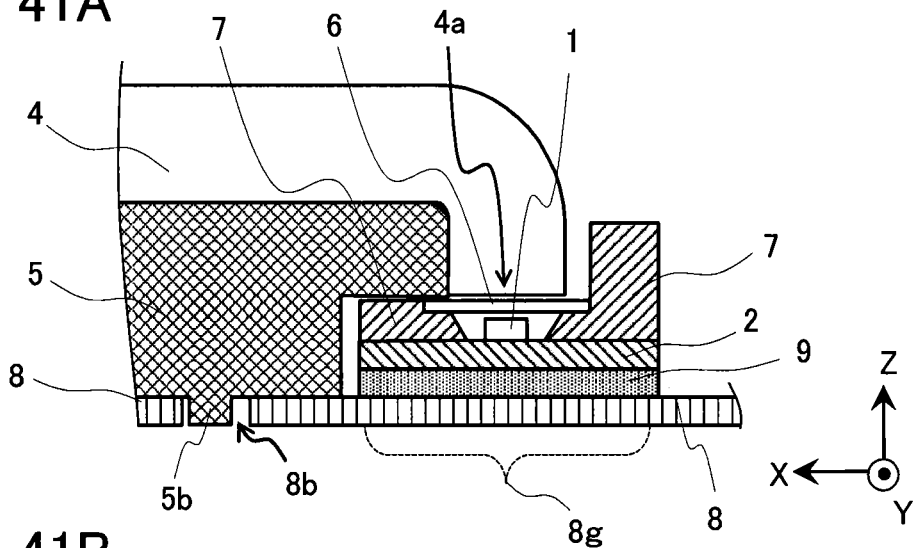
FIG. 41A is a cross-section view near a light-emitting part of a light source device according to Modification 3.4 of Embodiment 3.
Figure 41B:
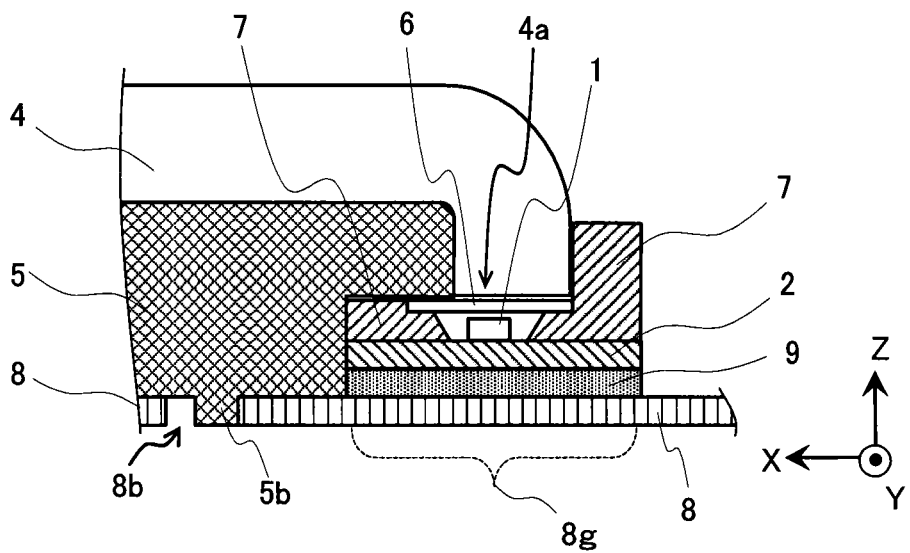
FIG. 41B is a cross-section view near a light-emitting part that illustrates the case of a thermally expanded light guide and light guide holder in a light source device according to Modification 3.4.
Figure 41C:
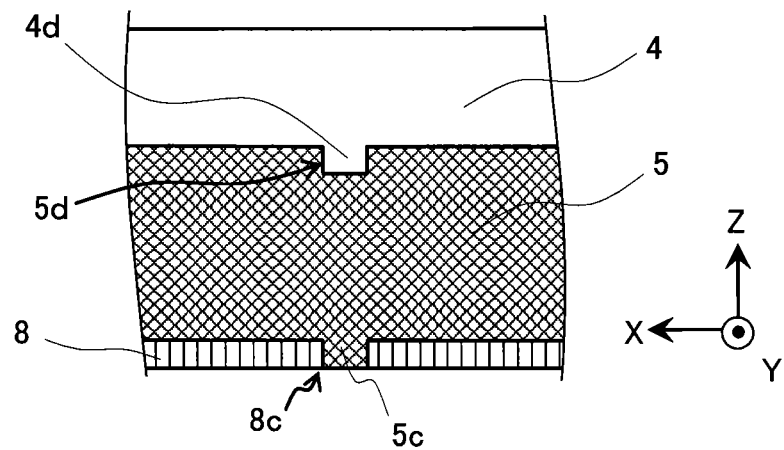
FIG. 41C is a central cross-section view of a light source device according to Modification 3.4.
Figure 42A:
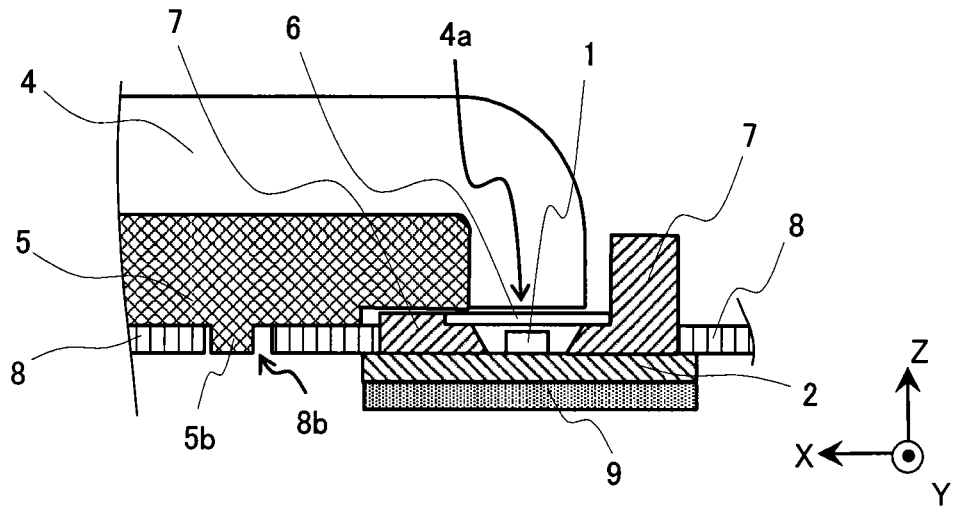
FIG. 42A is a cross-section view near a light-emitting part, illustrating a different example of a light source device according to Modification 3.4.
Figure 42B:
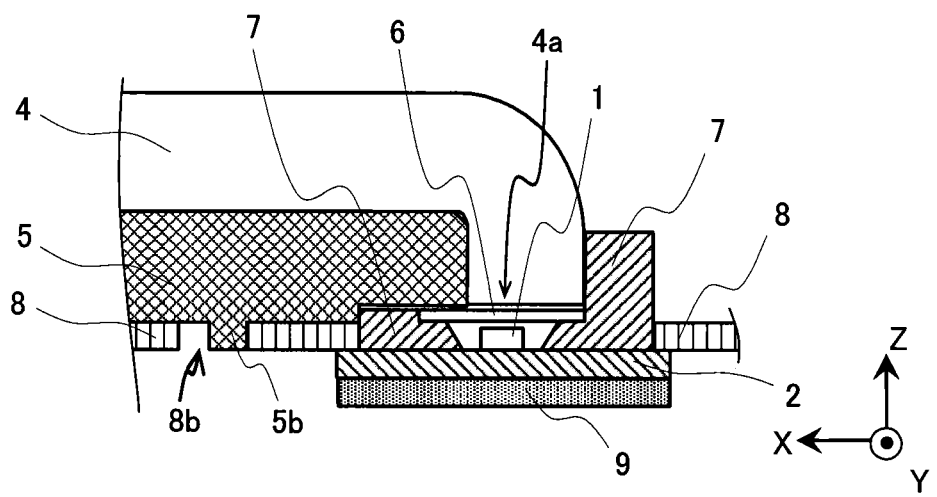
FIG. 42B is a cross-section view near a light-emitting part that illustrates the case of a thermally expanded light guide and light guide holder in a different example of a light source device according to Modification 3.4.
Figure 42C:
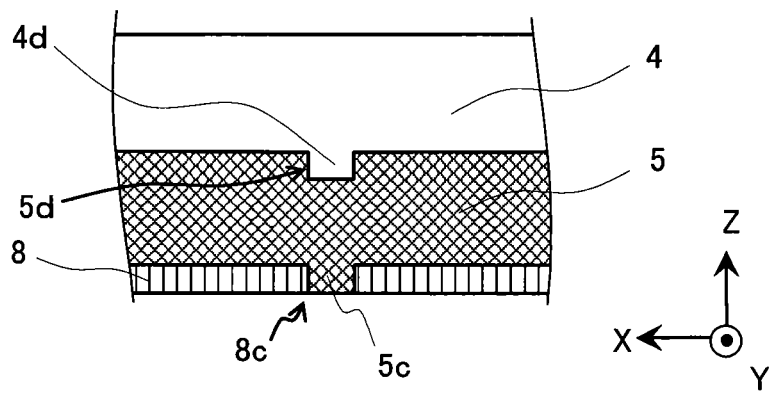
FIG. 42C is a central cross-section view of a different example of a light source device according to Modification 3.4.

FIG. 41A is a cross-section view near a light-emitting part of a light source device according to Modification 3.4 of Embodiment 3. FIG. 41B is a cross-section view near a light-emitting part that illustrates the case of a thermally expanded light guide and light guide holder in a light source device according to Modification 3.4. FIG. 41C is a central cross-section view of a light source device according to Modification 3.4. FIG. 42A is a cross-section view near a light-emitting part, illustrating a different example of a light source device according to Modification 3.4. FIG. 42B is a cross-section view near a light-emitting part that illustrates the case of a thermally expanded light guide and light guide holder in a different example of a light source device according to Modification 3.4. FIG. 42C is a central cross-section view of a different example of a light source device according to Modification 3.4.

Modification 3.4 is the case of exposing the area from the curved portion of the light guide 4 on the side opposite the support parts 7 up to the end faces 4a (light input parts 4a) of the light guide 4. FIGS. 41A to 41C correspond to FIGS. 32A to 32c, and are a configuration that disposes the light-emitting parts 3 and the heat transfer bodies 9 between the support parts 7 and the bottom face of the housing 8. FIGS. 42A to 42C correspond to FIGS. 34A to 34C, and are a configuration in which the light-emitting parts 3 are attached via holes formed in the housing 8.

A light source device of Modification 3.4 exposes the area from the curved portion of the light guide 4 on the side opposite the support parts 7 up to the end faces 4a (light input parts 4a) of the light guide 4. As illustrated in FIG. 41B and FIG. 42B, since the side faces of the light guide 4 are in proximity to or contacting the support parts 7 when the expansion of the light guide 4 is at maximum, this portion of the light guide 4 may be taken to be an opposing face part or a pushing face part.

Modification 3.5

Figure 43A:
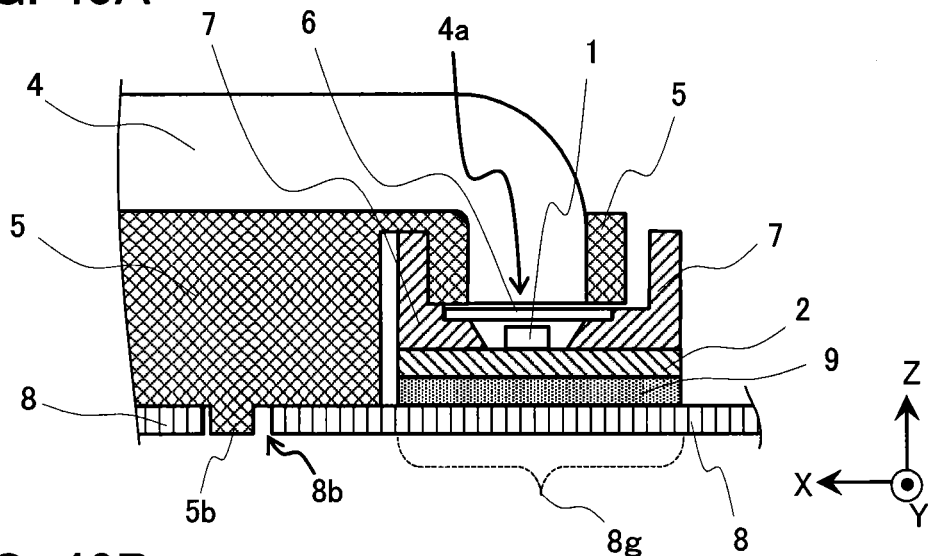
FIG. 43A is a cross-section view near a light-emitting part of a light source device according to Modification 3.5 of Embodiment 3.
Figure 43B:
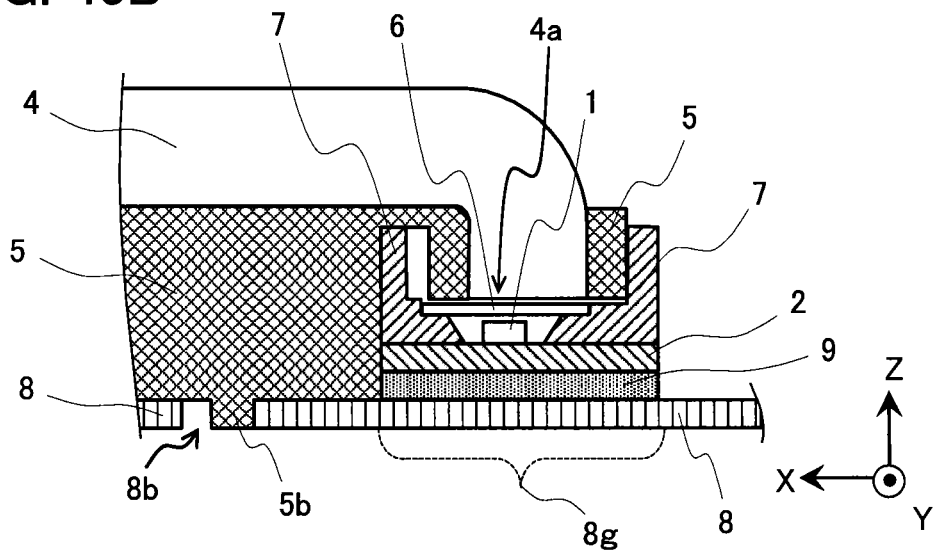
FIG. 43B is a cross-section view near a light-emitting part that illustrates the case of a thermally expanded light guide and light guide holder in a light source device according to Modification 3.5.
Figure 43C:
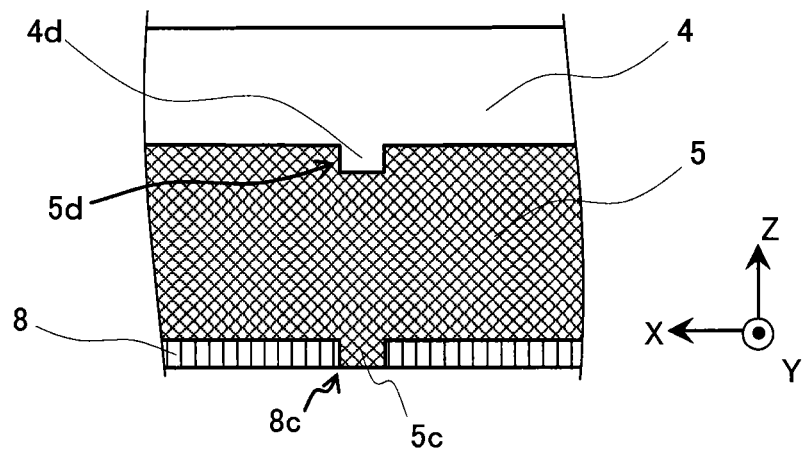
FIG. 43C is a central cross-section view of a light source device according to Modification 3.5.
Figure 44A:
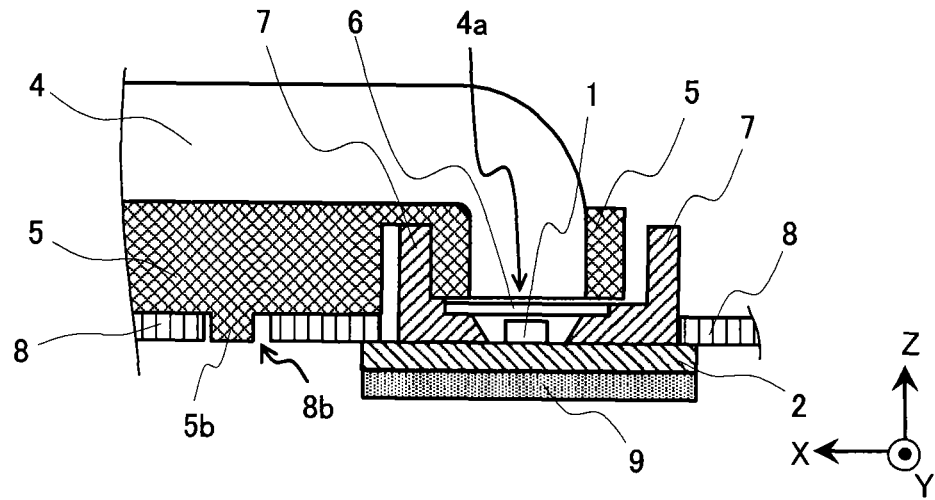
FIG. 44A is a cross-section view near a light-emitting part, illustrating a different example of a light source device according to Modification 3.5.
Figure 44B:
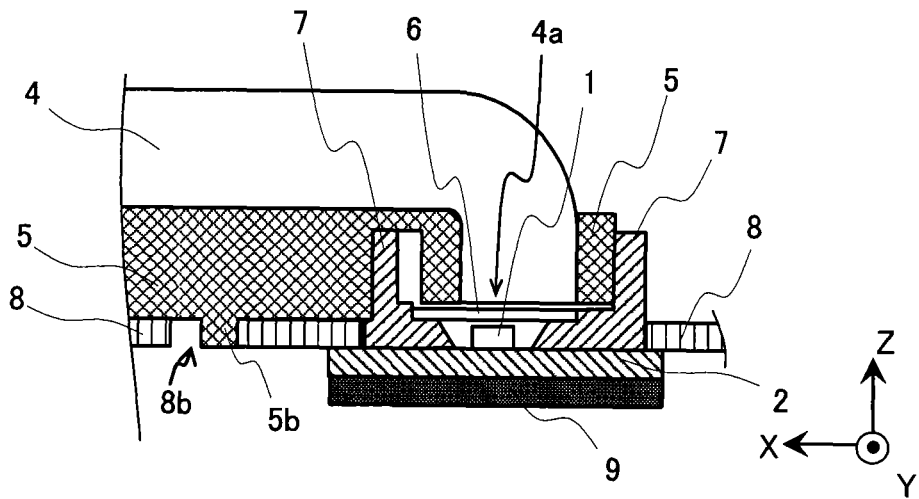
FIG. 44B is a cross-section view near a light-emitting part that illustrates the case of a thermally expanded light guide and light guide holder in a different example of a light source device according to Modification 3.5.
Figure 44C:
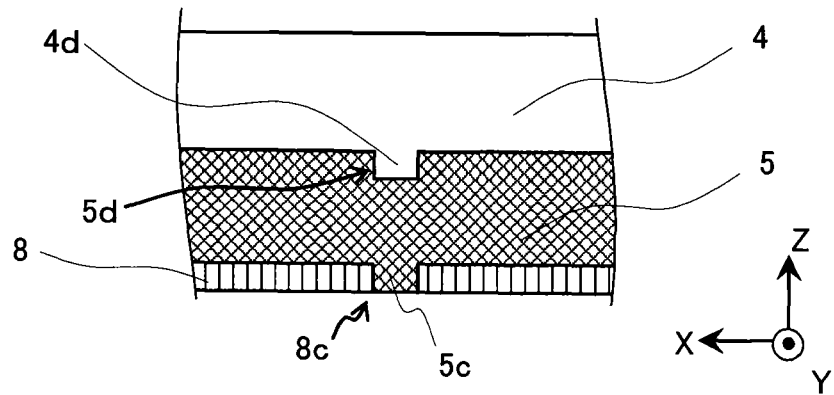
FIG. 44C is a central cross-section view of a different example of a light source device according to Modification 3.5.

FIG. 43A is a cross-section view near a light-emitting part of a light source device according to Modification 3.5 of Embodiment 3. FIG. 43B is a cross-section view near a light-emitting part that illustrates the case of a thermally expanded light guide and light guide holder in a light source device according to Modification 3.5. FIG. 43C is a central cross-section view of a light source device according to Modification 3.5. FIG. 44A is a cross-section view near a light-emitting part, illustrating a different example of a light source device according to Modification 3.5. FIG. 44B is a cross-section view near a light-emitting part that illustrates the case of a thermally expanded light guide and light guide holder in a different example of a light source device according to Modification 3.5. FIG. 44C is a central cross-section view of a different example of a light source device according to Modification 3.5.

The Modification 3.5 is a configuration in which the area from the curved portion of the light guide 4 on the side of the support parts 7 up to the end faces 4a (light input parts 4a) of the light guide 4 are also covered by the light guide holder 5, and the light guide holder 5 is inserted into the first hollow part in the direction in which the light guide 4 curves. FIGS. 43A to 43C correspond to FIGS. 32A to 32c, and are a configuration that disposes the light-emitting parts 3 and the heat transfer bodies 9 between the support parts 7 and the bottom face of the housing 8. FIGS. 44A to 44C correspond to FIGS. 34A to 34C, and are a configuration in which the light-emitting parts 3 are attached via holes formed in the housing 8.

In the light source device of Modification 3.5, a light guide holder 5 that is thinner than that illustrated in FIGS. 32 and 34 covers the light guide 4 along the curved portion of the light guide 4 on the side of the support parts 7. Support parts 7 with the same shape as those according to Embodiment 2 may be used.

Modification 3.6

Figure 45A:
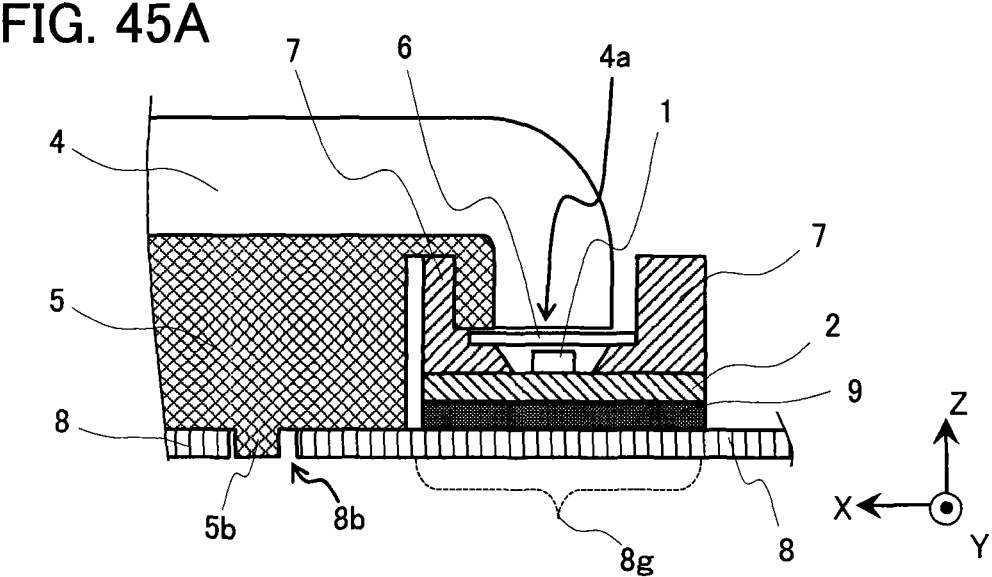
FIG. 45A is a cross-section view near a light-emitting part of a light source device according to Modification 3.6 of Embodiment 3.
Figure 45B:
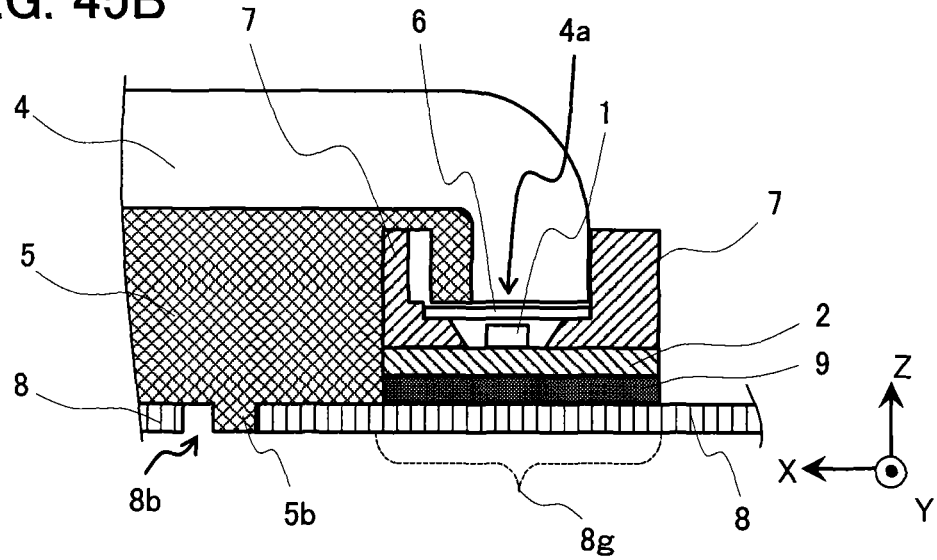
FIG. 45B is a cross-section view near a light-emitting part that illustrates the case of a thermally expanded light guide and light guide holder in a light source device according to Modification 3.6.
Figure 45C:
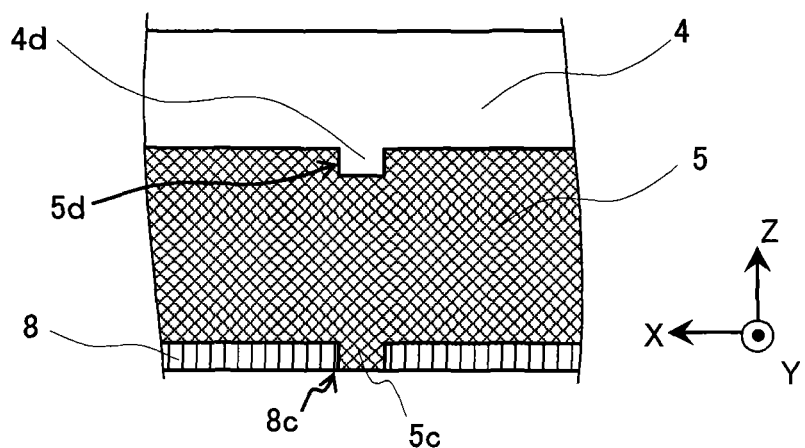
FIG. 45C is a cross-section view near a light-emitting part of a light source device according to Modification 3.6.
Figure 46A:
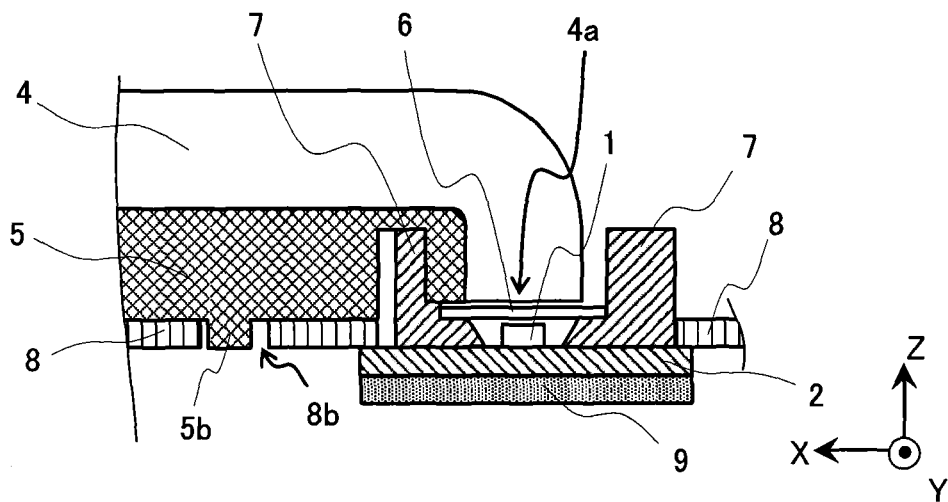
FIG. 46A is a cross-section view near a light-emitting part, illustrating a different example of a light source device according to Modification 3.6.
Figure 46B:
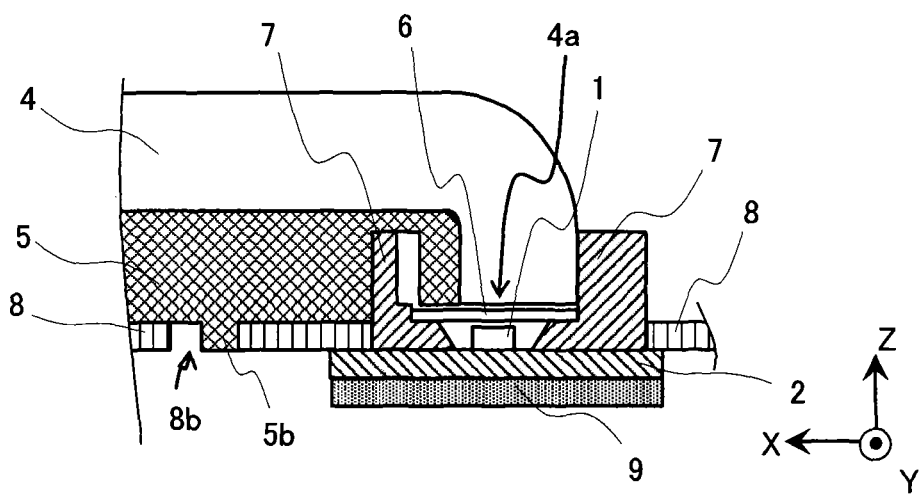
FIG. 46B is a cross-section view near a light-emitting part that illustrates the case of a thermally expanded light guide and light guide holder in a different example of a light source device according to Modification 3.6.
Figure 46C:
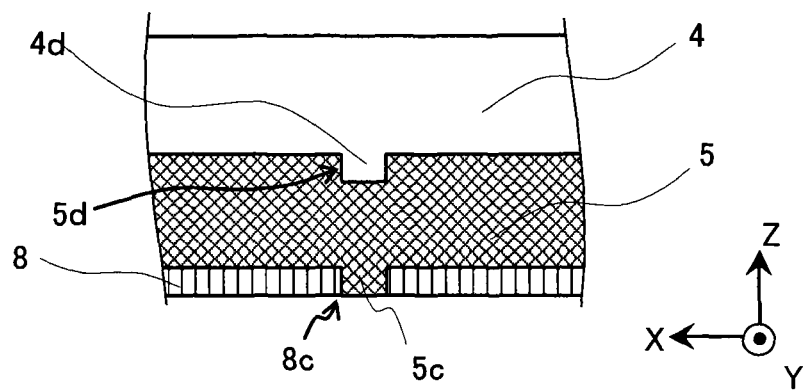
FIG. 46C is a central cross-section view of a different example of a light source device according to Modification 3.6.

FIG. 45A is a cross-section view near a light-emitting part of a light source device according to Modification 3.6 of Embodiment 3. FIG. 45B is a cross-section view near a light-emitting part that illustrates the case of a thermally expanded light guide and light guide holder in a light source device according to Modification 3.6. FIG. 45C is a cross-section view near a light-emitting part of a light source device according to Modification 3.6. FIG. 46A is a cross-section view near a light-emitting part, illustrating a different example of a light source device according to Modification 3.6. FIG. 46B is a cross-section view near a light-emitting part that illustrates the case of a thermally expanded light guide and light guide holder in a different example of a light source device according to Modification 3.6. FIG. 46C is a central cross-section view of a different example of a light source device according to Modification 3.6.

In Modification 3.6, the outer side of the curve from the curved portion of the light guide 4 on the side opposite the support parts 7 up to the end faces 4a (light input parts 4a) of the light guide 4 is exposed, whereas the inner side of the curve from the curved portion of the light guide 4 on the side of the support parts 7 up to the end faces 4a (light input parts 4a) of the light guide 4 is covered by the light guide holder 5. The ends of the light guide 4 and the light guide holder 5 are inserted into the first hollow part in the direction in which the light guide 4 curves.

FIGS. 45A to 45C correspond to FIGS. 32A to 32c, and are a configuration that disposes the light-emitting parts 3 and the heat transfer bodies 9 between the support parts 7 and the bottom face of the housing 8. FIGS. 46A to 46C correspond to FIGS. 34A to 34C, and are a configuration in which the light-emitting parts 3 are attached via holes formed in the housing 8. The light source device of Modification 3.6 is a configuration combining Modification 3.4 and Modification 3.5.

In the light source device of Modification 3.6, since the side faces of the light guide 4 are in proximity to or contacting the support parts 7 when the expansion of the light guide 4 is at maximum, this portion of the light guide 4 may be taken to be an opposing face part or a pushing face part. Also, since a light guide holder 5 that is thinner than that illustrated in FIGS. 32 and 34 covers the light guide 4 along the curved portion of the light guide 4 on the side of the support parts 7, support parts 7 with the same shape as those according to Embodiment 2 may be used.

Modification 3.7

Figure 47A:
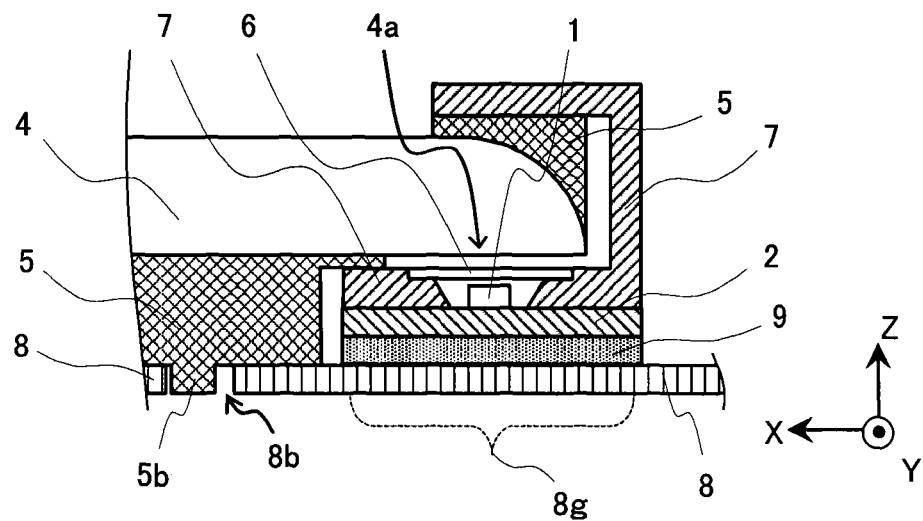
FIG. 47A is a cross-section view near a light-emitting part of a light source device according to Modification 3.7 of Embodiment 3.
Figure 47B:
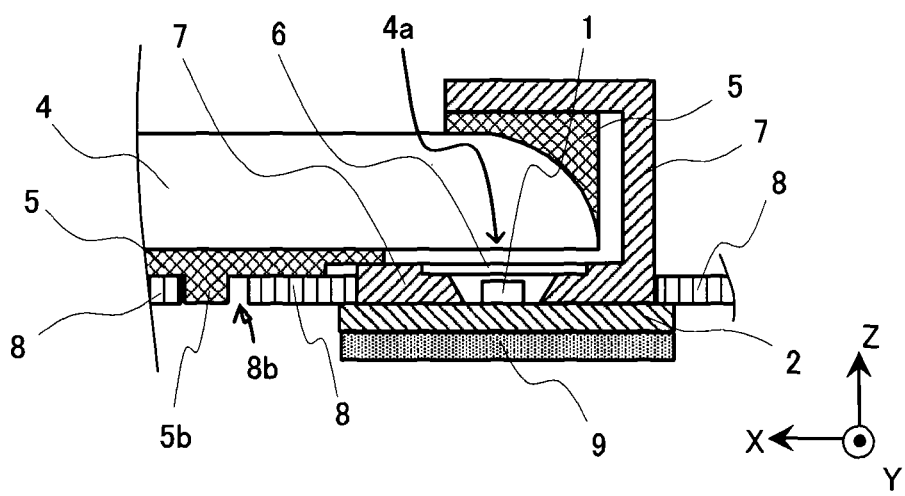
FIG. 47B is a cross-section view near a light-emitting part, illustrating a different example of a light source device according to Modification 3.7.

FIG. 47A is a cross-section view near a light-emitting part of a light source device according to Modification 3.7 of Embodiment 3. FIG. 47B is a cross-section view near a light-emitting part, illustrating a different example of a light source device according to Modification 3.7. In the light source device of Modification 3.7, the structure is similar to that illustrated in FIG. 38A or FIG. 38B, except for the shape of the light guide 4.

In the light guide 4 illustrated in FIGS. 47A and 47B, the position of the end faces 4a (light input parts 4a) in the height direction (Z direction) is set to nearly the same height as the baseline closest to the portion of the bottom face of the housing 8 that extends in the lengthwise direction of the light guide 4. By using such a light guide 4 in a light source device according to Embodiment 3, it is possible to lower the profile of the light guide 4 and the light guide holder 5 in the thickness direction (height direction). Also, it is possible to simplify the shape of the light guide holder 5 and the support parts 7.

Figure 48A:
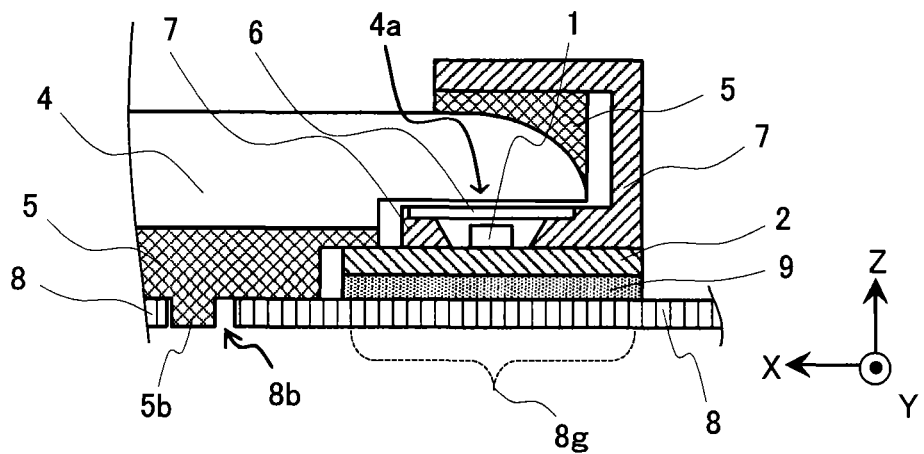
FIG. 48A is a cross-section view near a light-emitting part, illustrating a different example of a light source device according to Modification 3.7.
Figure 48B:
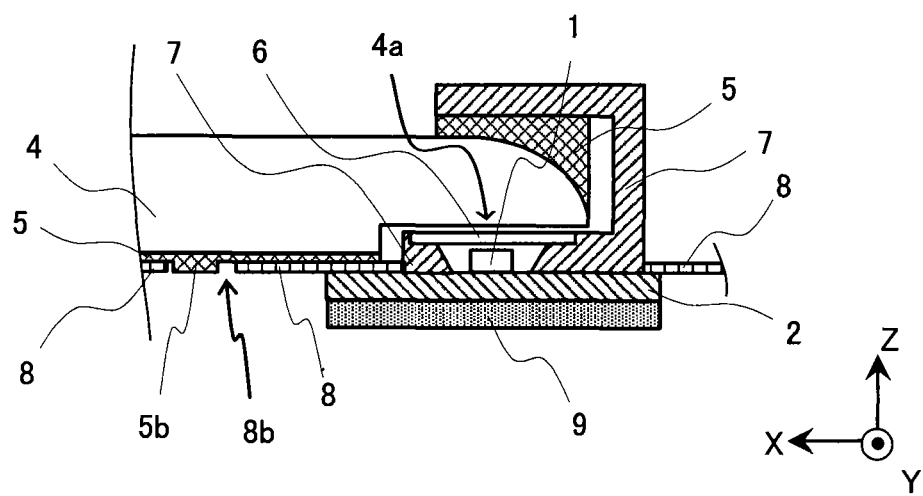
FIG. 48B is a cross-section view near a light-emitting part, illustrating a different example of a light source device according to Modification 3.7.

FIG. 48A is a cross-section view near a light-emitting part, illustrating a different example of a light source device according to Modification 3.7. FIG. 48B is a cross-section view near a light-emitting part, illustrating a different example of a light source device according to Modification 3.7. In the light guide 4 illustrated in FIGS. 48A and 48B, the position of the end faces 4a (light input parts 4a) in the height direction (Z direction) is set to a position higher than (farther away from the bottom face of the housing 8) the baseline closest to the portion of the bottom face of the housing 8 that extends in the lengthwise direction of the light guide 4. By using such a light guide 4 in a light source device according to Embodiment 3, it is possible to further lower the profile of the light guide 4 and the light guide holder 5 in the thickness direction (height direction) compared to the light guide 4 illustrated in FIGS. 47A and 47B. Also, it is possible to further simplify the shape of the light guide holder 5 and the support parts 7.

Figure 49A:
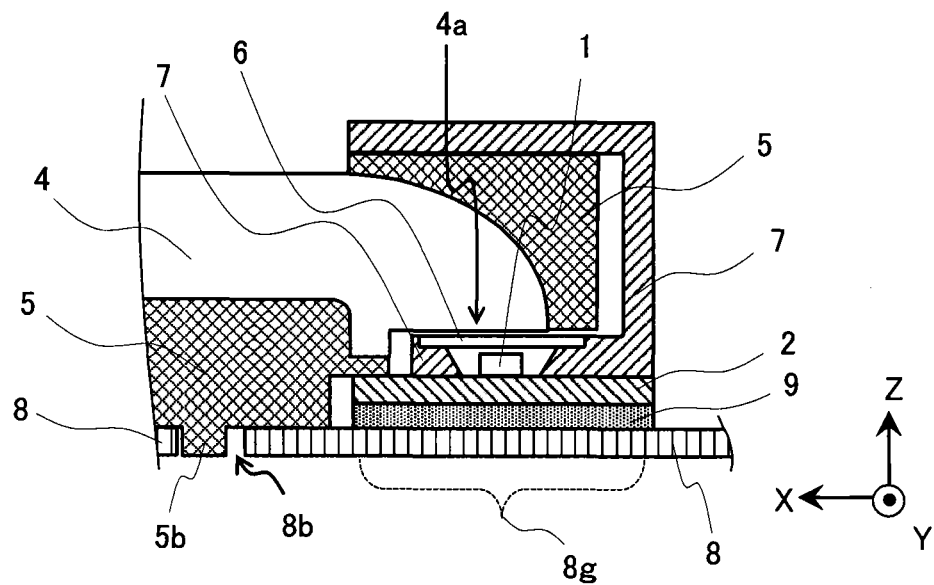
FIG. 49A is a cross-section view near a light-emitting part, illustrating a different example of a light source device according to Modification 3.7.
Figure 49B:
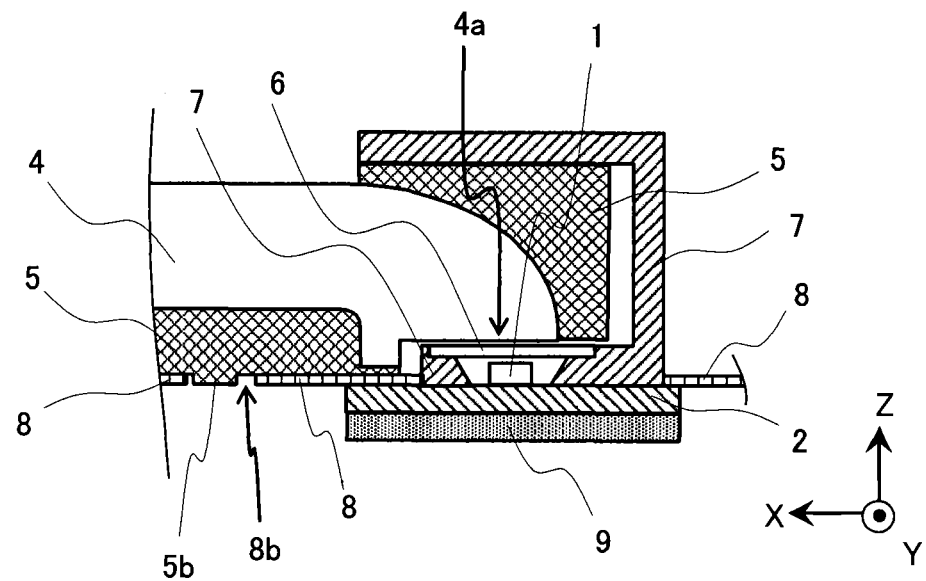
FIG. 49B is a cross-section view near a light-emitting part, illustrating a different example of a light source device according to Modification 3.7.

FIG. 49A is a cross-section view near a light-emitting part, illustrating a different example of a light source device according to Modification 3.7. FIG. 49B is a cross-section view near a light-emitting part, illustrating a different example of a light source device according to Modification 3.7.

In the light guide 4 illustrated in FIG. 49A and FIG. 49B, part of the face of the end faces 4a (light input parts 4a) projects in the curve direction of the light guide 4, and the tip face of the projection contacts the light guide holder 5. Accordingly, it is possible to lower the profile of the light guide 4 and the light guide holder 5 in the thickness direction (height direction), while also making the interlock between the light guide 4 and the light guide holder 5 more secure.

The light source device according to Embodiment 3 described using FIGS. 31 to 49 may be carried out by suitably substituting the respective configurations. It is also possible to combine a light source device (reflector support structure) according to Embodiment 3 with a light source device according to Embodiment 2 and a reflector support structure according to Embodiment 2.

Embodiment 4.

In a light source device according to Embodiment 4, the ends of the light guide 4 are curved away from the reflector 11 in a plane parallel to the bottom face of the housing 8. Embodiment 4 describes a case in which the light-emitting parts 3 are fastened to the inner face of the housing 8 directly or via the heat transfer bodies 9, and a case in which the light-emitting parts 3 are attached via holes formed in the housing 8. Otherwise, the configuration is similar to Embodiment 3.

Likewise in Embodiment 4, the light guide 4, the light guide holder 5, and the support parts 7 are obviously placed while accounting for expansion and contraction in the thickness direction of the light guide 4 and the light guide holder 5. For example, the dimensions of the light guide holder 5 (light guide 4) and the support parts 7 are set so that, at maximum expansion, the light guide holder 5 (light guide 4) does not damage the support parts 7. However, the influence is extremely small compared to expansion and contraction in the lengthwise direction of the light guide 4 and the light guide holder 5.

Figure 50:
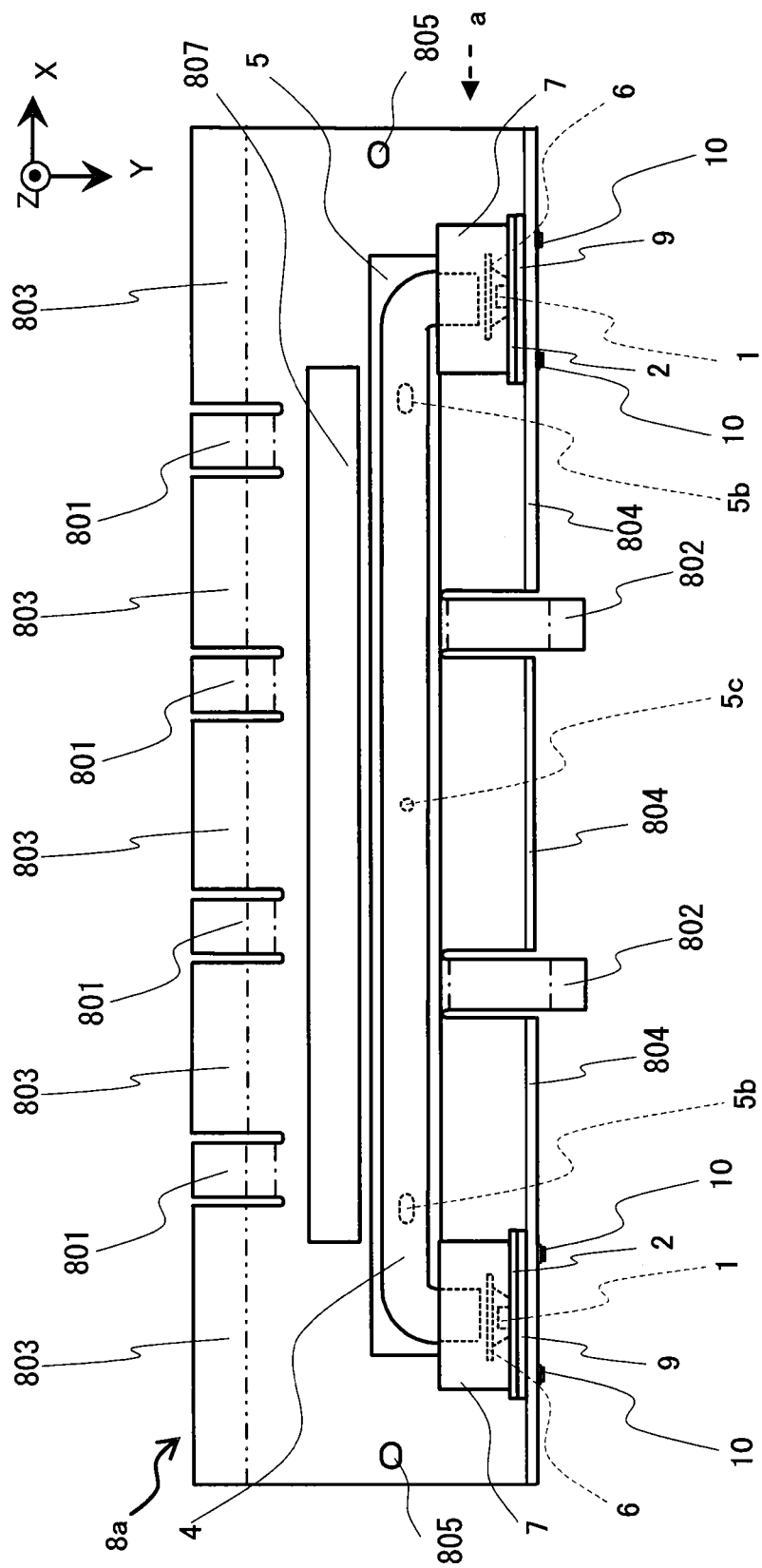
FIG. 50 is a partial development view of a planar member that forms the housing of a light source device according to Embodiment 4 of the present disclosure.

FIG. 50 is a partial development view of a planar member that forms the housing of a light source device according to Embodiment 4 of the present disclosure. FIG. 50 illustrates a state of developing the reflector support parts 801 and the planar ends 803. FIG. 50 also illustrates a state of virtually placing the light guide 4, the light guide holder 5, and the support parts 7 on top of the housing 8. In FIG. 50, the interior of the support parts 7 is indicated with broken lines.

Figure 51A:
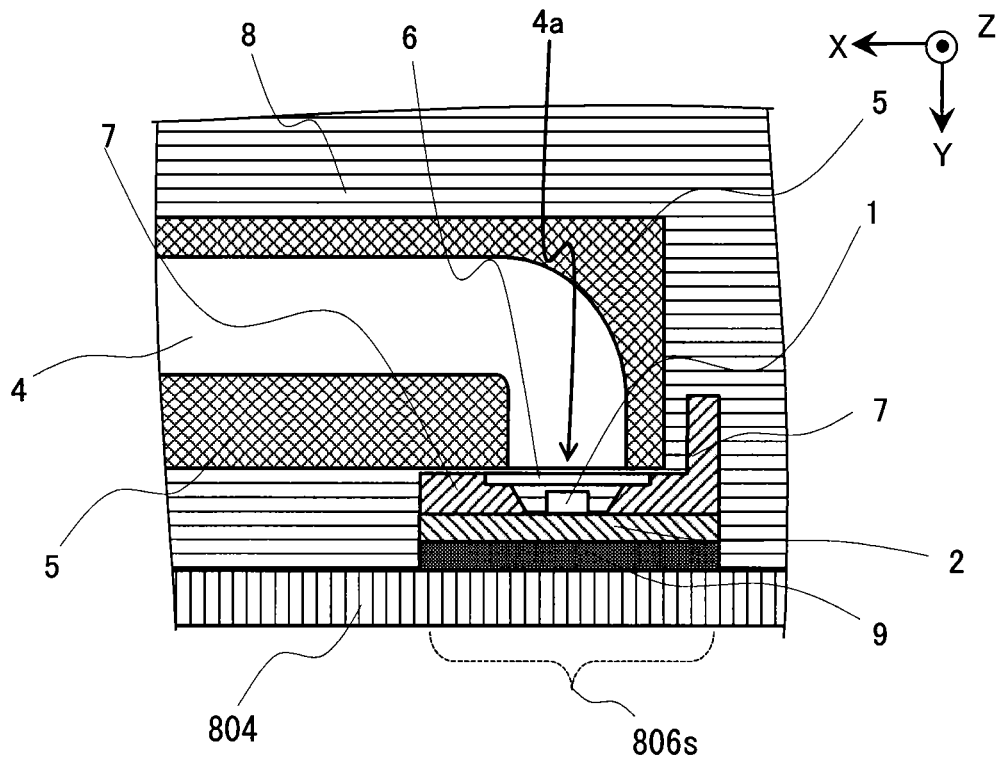
FIG. 51A is a cross-section view near a light-emitting part of a light source device according to Embodiment 4.
Figure 51B:
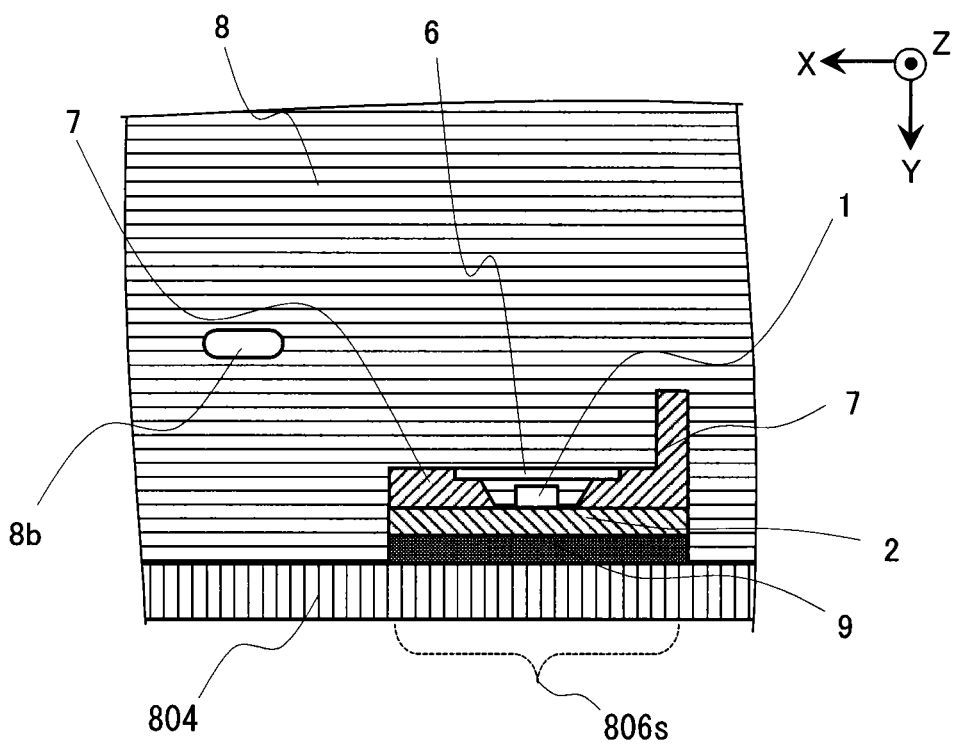
FIG. 51B is a cross-section view in which the light guide and the light guide holder have been removed from FIG. 51A.

FIG. 51A is a cross-section view near a light-emitting part of a light source device according to Embodiment 4. FIG. 51B is a cross-section view in which the light guide and the light guide holder have been removed from FIG. 51A. The ends of the light guide 4 are curved away from the reflector 11, or in other words, towards the planar ends 804, in a plane parallel to the bottom face of the housing 8.

In the support parts 7, there is formed a through-hole that penetrates from one face to another opposing face. The support parts 7 are disposed so that the first opening on one side of the through-hole faces opposite the end faces 4a of the light guide 4. The through-hole comprises a first hollow part and a second hollow part whose diameters successively decrease proceeding from the first opening to the second opening on the other side of the through-hole. The light-emitting elements 1 are disposed in the second opening, and the substrates 2 are affixed to the face of the second opening.

The support parts 7 support the optical filters 6 while maintaining a designated spacing with the light-emitting parts 3 (light-emitting elements 1 and substrates 2). The optical filters 6 are affixed to the step between the first hollow part and the second hollow part. The depth of the first hollow part is equal to or greater than the thickness of the optical filters 6.

Figure 52:
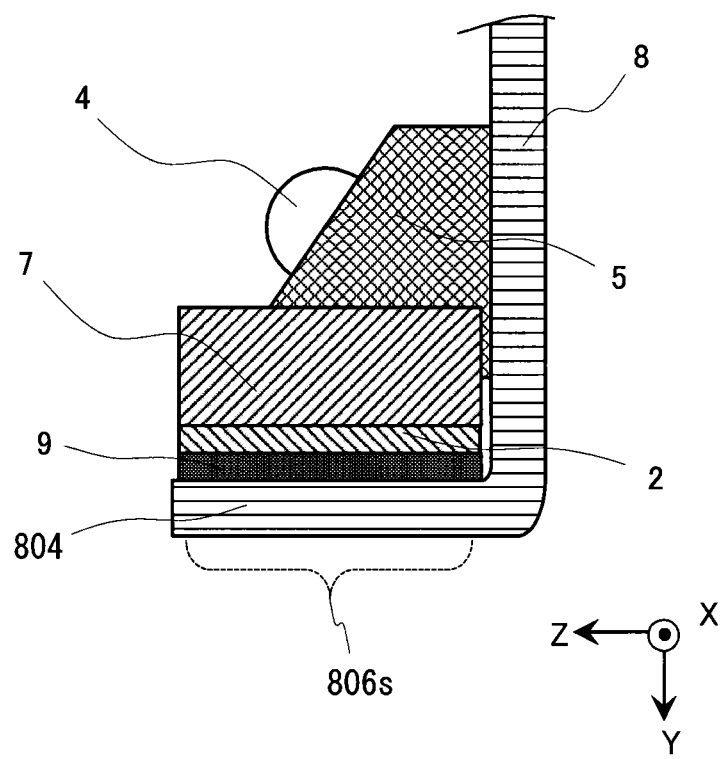
FIG. 52 is a side view near a support part of a light source device according to Embodiment 4.

FIG. 52 is a side view near a support part of a light source device according to Embodiment 4. FIG. 52 corresponds to a view as seen from the direction of the arrow A in FIG. 14. In FIG. 52, the bottom face of the housing 8 is drawn on the right. The planar ends 804 stand off from the bottom face of the housing 8. The support parts 7 are affixed to fastening parts 806s of the planar ends 804, either directly or with the heat transfer bodies 9 therebetween. Screw holes that allow the passage of the screws 10 are formed in the fastening parts 806s.

Figure 53A:
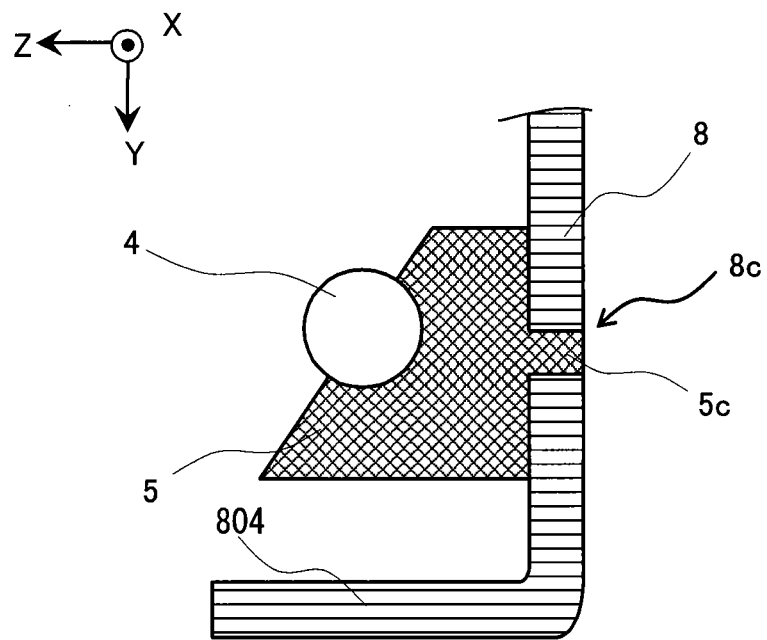
FIG. 53A is a central cross-section view of a light source device according to Embodiment 4.
Figure 53B:
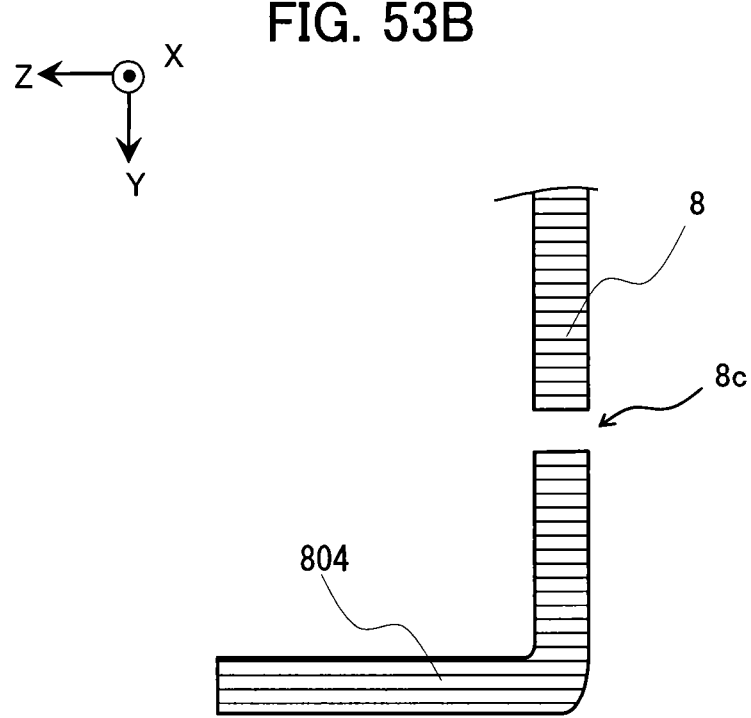
FIG. 53B is a diagram in which the light guide and the light guide holder have been removed from FIG. 53A.

FIG. 53A is a central cross-section view of a light source device according to Embodiment 4. FIG. 53B is a diagram in which the light guide and the light guide holder have been removed from FIG. 53A. Likewise in Embodiment 4, the light guide holder 5 is placed on the bottom face of the housing 8. The second projecting part 5c is formed in the lengthwise center part on the face of the light guide holder 5 that abuts the bottom face of the housing 8. The interlocking hole 8c is formed in the bottom face of the housing 8 at a position corresponding to the second projecting part 5c. By inserting the second projecting part 5c into the interlocking hole 8c, arbitrary planar movement of the light guide holder 5 in the bottom face direction of the housing 8 is restricted. Although not illustrated, the first projecting parts 5b of the light guide holder 5 are inserted into the long holes 8b formed in the bottom face of the housing 8. In addition, the ends of the light guide holder 5 are able to slide in the lengthwise direction, whereas movement in the widthwise direction is restricted.

Even if the light guide holder 5 and the light guide 4 stretch due to temperature changes, the ends of the light guide holder 5 are able to move in the lengthwise direction above the first opening of the support parts 7. As a result, the light guide 4 does not sag in the widthwise direction (Y direction) or the height direction (Z direction).

Figure 54A:
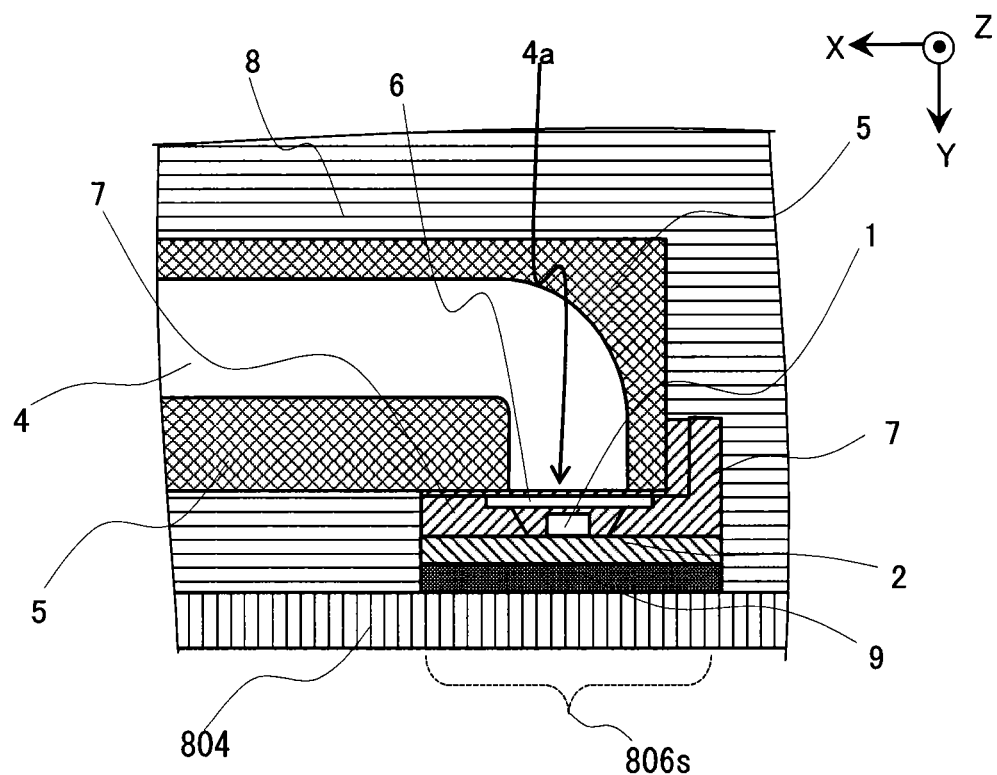
FIG. 54A is a cross-section view (widthwise direction) near a light-emitting part of a light source device according to Embodiment 4.
Figure 54B:
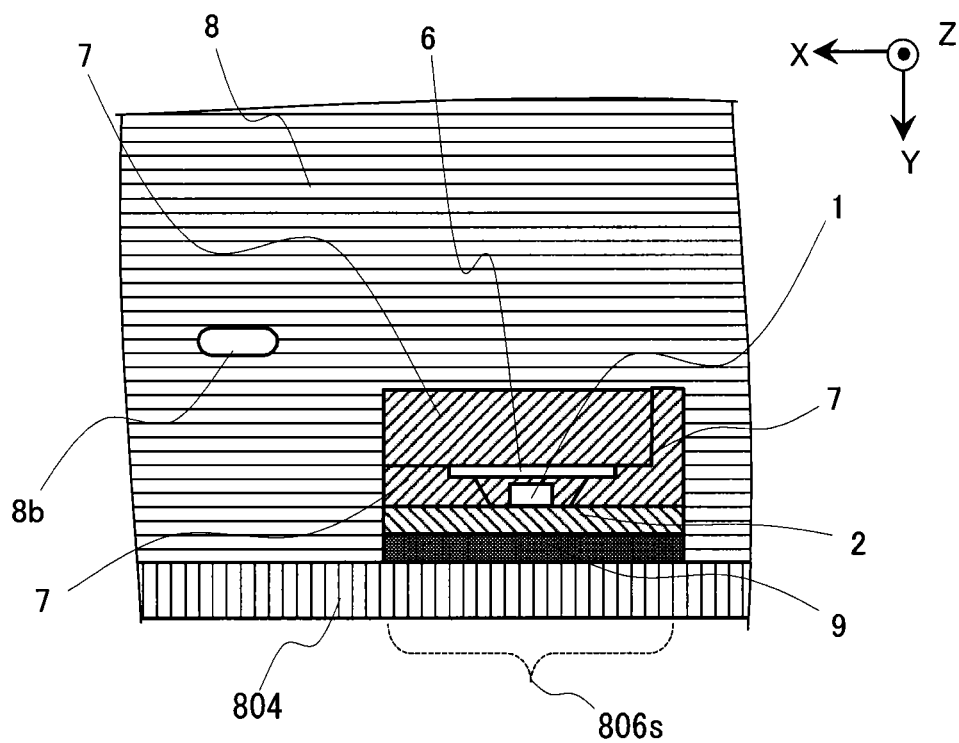
FIG. 54B is a cross-section view in which the light guide and the light guide holder have been removed from FIG. 54A.
Figure 55:
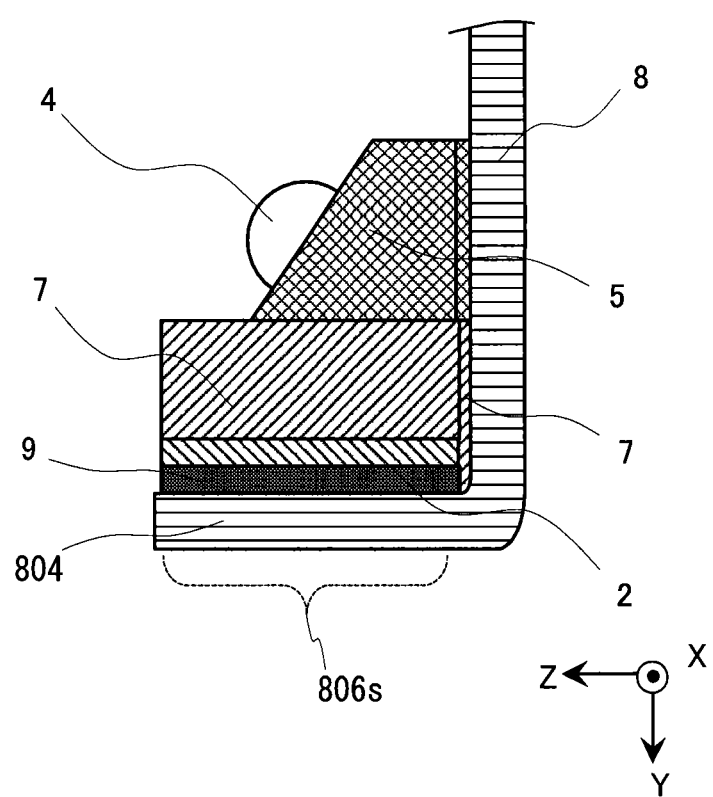
FIG. 55 is a side view near a support part of a light source device according to Embodiment 4.

FIG. 54A is a cross-section view near a light-emitting part of a light source device according to Embodiment 4. FIG. 54B is a cross-section view in which the light guide and the light guide holder have been removed from FIG. 54A. FIG. 55 is a side view near a support part of a light source device according to Embodiment 4. FIG. 55 corresponds to a view as seen from the direction of the arrow A in FIG. 14. In FIGS. 54A to 55, part of the support parts 7 is interposed between the light guide holder 5 and the bottom face of the housing 8 in the extension plane of the end faces 4a of the light guide 4.

As a comparison of FIGS. 51B and 54B demonstrates, in the light source device illustrated in FIGS. 51A to 52, the support parts 7 is not interposed between the light guide holder 5 and the bottom face of the housing 8. Specifically, with the support parts 7 illustrated in FIGS. 51A to 52, above the first hollow part (in which the optical filters 6 are formed), the support parts 7 (the wall face extending from the edges of the first hollow part), the light guide holder 5, and the housing 8 are successively disposed in the thickness direction (Z direction) of the light source device according to Embodiment 4. On the other hand, with the support parts 7 illustrated in FIGS. 54 to 55, above the first hollow part (in which the optical filters 6 are formed), the support parts 7 (the wall face extending from the edges of the first hollow part), the light guide holder 5, the support parts 7 (the wall face extending from the edges of the first hollow part), and the housing 8 are successively disposed in the thickness direction of the light source device according to Embodiment 4.

The support parts 7 illustrated in FIG. 51 and FIG. 52 correspond to the support parts 7 illustrated in FIG. 39B in Embodiment 3. Herein, the placement of the support parts 7 is indicated in parenthesis in FIG. 39B. Likewise in Embodiment 4, it is possible to adopt a structure of the support parts 7 as illustrated in FIGS. 39A to 40D of Embodiment 3. In this case, the orientation of the support parts 7 is the orientation of the coordinate axes indicated in parenthesis in FIGS. 39A to 40D.

In Embodiment 4, it may be configured such that, in addition to the respective structures of the support parts 7 in FIGS. 39A to 40D, part of the support parts 7 is interposed between the light guide holder 5 and the bottom face of the housing 8 in the extension plane of the end faces 4a of the light guide 4, as in FIGS. 54A to 55.

In a light source device according to Embodiment 4, the light guide holder 5 includes pushing face parts that face opposite the edges of the first opening of the support parts 7. Specifically, the pushing face parts correspond to the portion of the light guide holder 5 that covers the outer circumference of the curved portion of the light guide 4. These pushing face parts may also be configured to restrict the sliding range (movement range) of the light guide holder 5. Note that the pushing face parts may also be made to be about to contact the edges of the first opening when the expansion of the light guide 4 is at maximum. In this case, the pushing face parts become opposing face parts rather than pushing face parts.

In Embodiment 4, the support parts 7 slidably hold the ends of the light guide holder 5, or alternatively, the ends of the light guide holder 5 stretch in the lengthwise direction above the first hollow part. However, the sites that potentially contact the support parts 7 differ between the light guide holder 5 illustrated in FIGS. 51A to 52 versus the light guide holder 5 illustrated in FIGS. 54A to 55. Specifically, part of the ends of the light guide holder 5 illustrated in FIGS. 51A to 52 contacts the housing 8 and slides, or alternatively, stretches in the lengthwise direction above the housing 8.

In a light source device according to Embodiment 4, the ends of the light guide 4 are curved towards the planar ends 804, and light exiting the light-emitting parts 3 (light-emitting elements 1) fastened to the fastening parts 806s is input from the end faces 4a (light input parts 4a) of the light guide 4 whose are curved towards the planar ends 804 (fastening parts 806s). Subsequent basic operation is similar to a light source device according to Embodiments 2 and 3. In Embodiment 3, the ends of the light guide 4 are curved in the XZ plane, whereas in Embodiment 4, the ends of the light guide 4 are curved in the XY plane.

Likewise in the light guide 4 of a light source device according to Embodiment 4, it is sufficient for the light scattering patterns 4c to at least be formed in a portion that at least corresponds to an effective scanning area in the main scanning direction of the image scanning device. Also, the brightness or the like at the ends of the effective scanning area (near the support parts 7) may also be adjusted by causing more or less light to be output from the curved portion of the light guide 4 compared to other portions.

Figure 56:
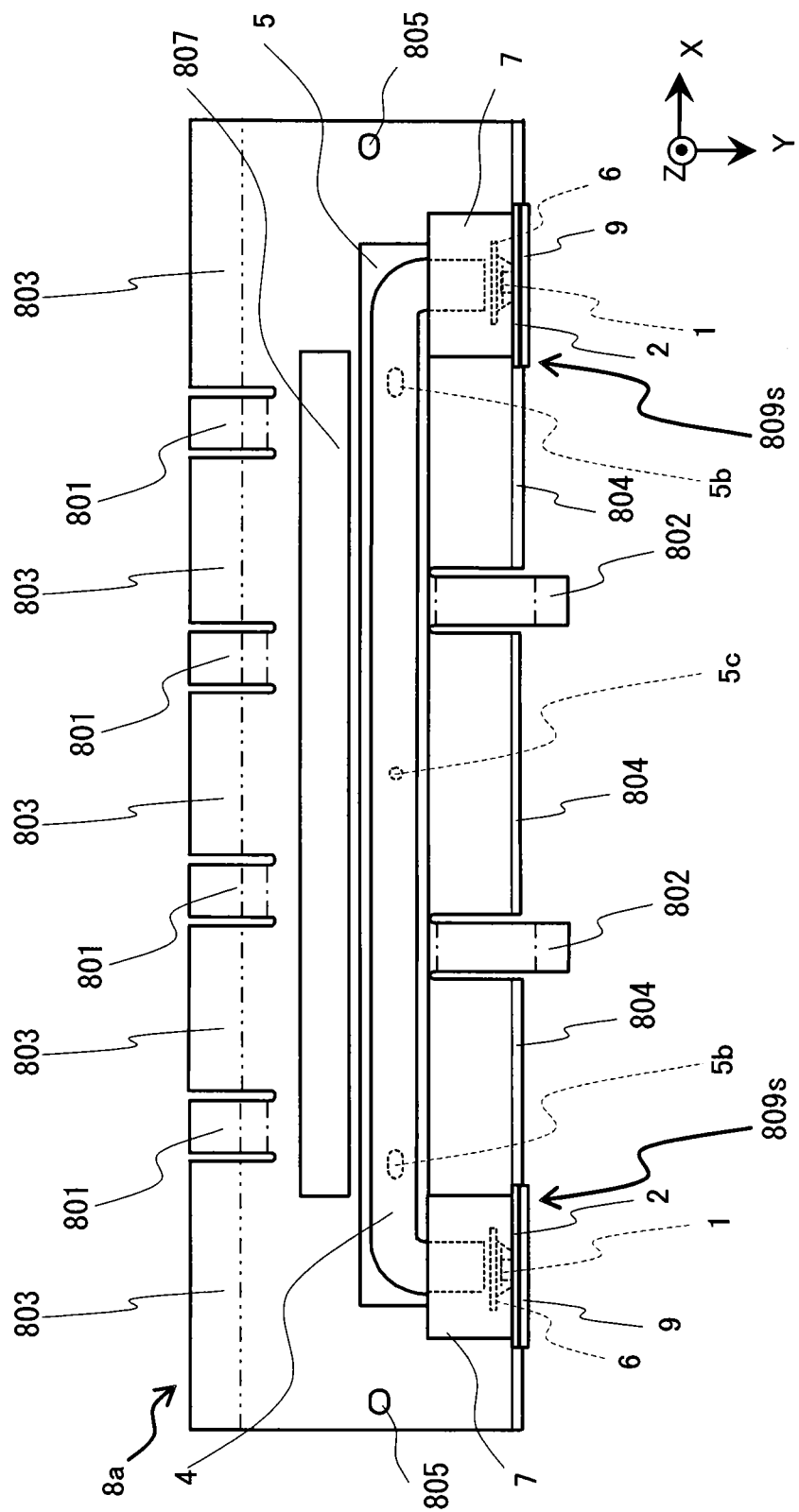
FIG. 56 is a development view of a planar member in a different configuration of a light source device according to Embodiment 4.

FIG. 56 is a partial development view of a planar member in a different configuration of a light source device according to Embodiment 4. FIG. 56 illustrates a state of developing the reflector support parts 801 and the planar ends 803. FIG. 50 also illustrates a state of virtually placing the light guide 4, the light guide holder 5, and the support parts 7 on top of the housing 8. In FIG. 56, the interior of the support parts 7 is indicated with broken lines.

FIG. 56 illustrates the planar member 8a in the case in which the light-emitting parts 3 are attached via holes formed in the planar member 8a of the housing 8. Light-emitting part holes 809s are formed in the planar ends 804 of the planar member 8a. The light-emitting parts 3 are attached to the housing 8 (planar ends 804) via the light-emitting part holes 809s. Similarly to FIG. 34A, the substrates 2 are affixed to the light guide holder 5 in between the planar ends 804.

Note that the light-emitting part holes 809s are not required to be complete holes in which the periphery is closed, and may also be light-emitting parts cut-outs that are inwardly cut out from the outer shape of the planar ends 804 (housing 8). In Embodiment 4, the light-emitting part holes 809s include the case of light-emitting part cut-outs. The light-emitting part holes (light-emitting part cut-outs) 809s are respectively formed in two planar ends 804 at positions with the light guide holder affixing parts 802 therebetween, from among the plurality of planar ends 804 formed along the long edge (lengthwise direction) on the light guide holder side.

Note that in order to simplify the comparison between FIG. 50 and FIG. 56, in FIG. 56, only part of the side faces of the heat transfer bodies 9 are illustrated as contacting the planar ends 804 (light-emitting part holes 809s) of the housing. In actual practice, portions other than the side faces of the heat transfer bodies 9 and the planar ends 804 may contact directly or indirectly to conduct heat, or the heat transfer bodies 9 may not be provided.

In addition to the configuration of the planar member 8a (housing 8) in FIG. 50 or FIG. 56, the planar ends 804 contacted by the light-emitting parts 3 may be extended in the lengthwise direction (towards the space on the outer side of the screw holes 805 with respect to the light guide 4), and bent to form L-shaped or U-shaped heatsinks that extend in the widthwise direction, or in the lengthwise direction and the widthwise direction (see Embodiment 1). When extending and bending the planar ends 804 in the lengthwise direction and the widthwise direction, in one case the heatsinks may be made parallel to the planar ends 804, while in another case made parallel to the planar ends 803. In the case of making the heatsinks parallel with the planar ends 803, heatsinks are formed extending in the lengthwise direction facing the sloped faces 801 (reflector support parts 801) on the side opposite the long-edge walls. In other words, heatsinks are formed on the side of the reverse face of the reflective face of the reflector 11.

Heatsinks may also be formed extending towards the bottom face of the housing 8. Also, the extended light guide holder affixing parts 802e or the extended planar ends 804e illustrated in FIG. 25 or FIG. 26 may also be formed as heatsinks on the planar member 8a (housing 8) illustrated in FIG. 50 or FIG. 56. Regarding the heatsinks, the modifications of Embodiment 2 may also be combined, similarly to a light source device according to Embodiment 3.

The light source device according to Embodiment 4 is one that supports the optical filters 6 between the first opening and the second opening of the support parts 7 while maintaining a designated spacing with the light-emitting parts 3. Furthermore, the end faces (light input parts) 4a of the light guide 4 and the light-emitting parts 3 (optical filters 6) do not contact.

In a light source device according to Embodiment 4, the ends of the light guide 4 may also be curved towards the reflector 11. In this case, the curve direction of the light guide 4 is vertically reverse in FIG. 50 and FIG. 56. In this case, the fastening parts 806s and the light-emitting part holes (cut-outs) 809s may be formed in the planar ends 803 (reflector 11 side). In addition, the fastening parts 806s and the light-emitting part holes (cut-outs) 809s may also be formed on other than the planar ends 803 or the planar ends 804. For example, the fastening parts 806s and the light-emitting part cut-outs 809s (light-emitting part holes 809s) may also be formed in a portion of the housing 8 (planar member 8a) bent in the widthwise direction in the same way as the fastening parts 806 formed in a portion of the housing 8 (planar member 8a) bent in the lengthwise direction.

It is also possible to appropriately combine a light source device (reflector support structure) according to Embodiment 4 with a light source device (reflector support structure) according to Embodiment 2, or alternatively, a light source device (reflector support structure) according to Embodiment 3.

This specification claims priority based on Japanese Patent Application No. 2012-024228, filed in the Japan Patent Office on Feb. 7, 2012, including specification, claims, drawings, and abstract, and Japanese Patent Application No. 2012-140063, filed in the Japan Patent Office on Jun. 21, 2012, including specification, claims, drawings, and abstract. The disclosed contents of Japanese Patent Application No. 2012-024228 and Japanese Patent Application No. 2012-140063 are hereby incorporated in entirety by reference.

REFERENCE SIGNS LIST

1: Light-emitting element, 2: Substrate (LED substrate), 3: Light-emitting part, 4: Light guide, 4a: Light input part (end face of light guide 4), 4b: Light output part (side face of light guide 4), 4c: Light scattering pattern, 4d: Projecting part, 5: Light guide holder, 5a: Light guide locking part, 5b: First projecting part, 5c: Second projecting part, 5d: Interlocking hole (for light guide 4), 6: Optical filter, 7: Support part, 8: Housing, 8a: Planar member (pre-bending), 8b: Long hole (for light guide holder 5), 8c: Interlocking hole (for light guide holder 5), 8g: Area, 8s: Planar member (pre-bending), 801: Reflector support part (bent in two locations, sloped face), 801e: Extended reflector support part, 801b: Reflector support part (bent in one location, sloped face), 802: Light guide holder affixing part, 802e: Extended light guide holder affixing part, 803: Planar end (reflector 11 side), 803e: Extended planar end (reflector 11 side), 804: Planar end (light guide holder 5 side), 804e: Extended planar end (light guide holder 5 side), 805: Screw hole, 806: Fastening part, 806s: Fastening part, 807: Reflected light passage hole (rod lens holding part), 808: Integral end, 809: Light-emitting part hole (light-emitting part cut-out), 809s: Light-emitting part cut-out (light-emitting part hole), 9: Heat transfer body, 10: Screw, 11: Reflector (mirror), 31: Light source part, 50: Light guide cover, 51: Screw hole, 52: Pin (engaging part), 53, 54: Pin (projection, restricting part), 55, 56: End holder, 60: Housing, 61: Aperture, 62: Holding hole (interlocking hole, engaging part), 63, 64: Holding hole (long hole, restricting part), 65: Screw hole, 69: Reflector installation face, 91, 93: Light emitter, 92, 94: Light emitter mounting substrate.

The invention claimed is:

1. A light source device comprising:
   a light-emitting part;
   a light guide including in its center a columnar part whose central axis direction is a lengthwise direction, that guides light input into an end face from the light-emitting part in a lengthwise direction of the columnar part, and outputs light from a side face of the columnar part;
   a light guide holder that covers an end of the light guide except for at least part of the end face; and
   a support part, including a through-hole that penetrates from one face to another face formed therein, that holds an end of the light guide holder on a side of a first opening on the one face of the through-hole so as to allow sliding in the lengthwise direction, or the end of the light guide holder stretches in the lengthwise direction inside or above the first opening, and
   the support part supports an optical filter between the first opening and a second opening while maintaining a designated spacing with the light-emitting part, and
   light from the light-emitting part is input into the light guide via the second opening on the other face of the through-hole, or the light-emitting part is disposed in the second opening.

2. The light source device according to claim 1, wherein the support part supports the optical filter outside a range over which the end face of the light guide moves due to sliding or stretching of the end of the light guide holder.

3. The light source device according to claim 1, further comprising:
   a housing extending in the lengthwise direction, into which the light guide holder is placed;
   wherein, at opposing faces at which the light guide holder and the housing abut, a restricting part that allows movement of the light guide holder in the lengthwise direction but restricts movement in a direction orthogonal to the lengthwise direction is formed.

4. The light source device according to claim 3, wherein an engaging part that restricts arbitrary planar movement in the opposing face direction of the light guide holder is formed on the opposing faces at which the light guide holder and the housing abut, on a side opposite the light-emitting part with respect to the restricting part.

5. The light source device according to claim 3, wherein the light-emitting part is fastened, either directly or via a heat transfer body, to a portion of the housing that is curved in the lengthwise direction.

6. The light source device according to claim 3, wherein the end of the light guide curves towards the housing, and the light-emitting part is fastened, either directly or via a heat transfer body, to the housing.

7. The light source device according to claim 3, wherein the end of the light guide curves towards the housing, and the light-emitting part is attached via a light-emitting part hole or a light-emitting part cut-out formed in the housing.

8. The light source device according to claim 3, wherein the end of the light guide curves towards the housing, and the light-emitting part is fastened, either directly or via a heat transfer body, to a portion of the housing that is curved in a direction intersecting the lengthwise direction.

9. The light source device according to claim 3, wherein the end of the light guide curves towards the housing, and the light-emitting part is attached via a light-emitting part hole or a light-emitting part cut-out formed in a portion of the housing that is curved in a direction intersecting the lengthwise direction.

10. The light source device according to claim 1, wherein the light guide holder covers the light guide throughout the columnar part, except for at least a side face from which the light guide outputs light.

11. The light source device according to claim 1, wherein the through-hole of the support part includes a first hollow part, a second hollow part, and a third hollow part whose diameter successively decreases proceeding from the first opening to the second opening, and
the optical filter is supported inside the second hollow part.

12. The light source device according to claim 11, wherein the support part slidably holds the end of the light guide holder inside the first hollow part, or
the end of the light guide holder stretches in the lengthwise direction inside the first hollow part or above the first hollow part.

13. The light source device according to claim 11, wherein the end of the light guide is curved, and
the first hollow part and the second hollow part are formed in orientations such that the central axes of the respective diameters intersect.

14. The light source device according to claim 1, wherein the through-hole of the support part includes a first hollow part and a second hollow part whose diameter successively increases proceeding from the first opening to the second opening, and
the optical filter is supported inside the second hollow part.

15. The light source device according to claim 1, wherein the end of the light guide is curved.

16. The light source device according to claim 1, wherein the light guide holder includes a pushing face part that faces opposite an edge of the first opening, and
the pushing face part restricts a sliding range of the light guide holder.

* * * * *